INVENTORS
Jacob S. Kamborian
Allen C. Harriman
Geoffrey T. Jones
Karl F. Vornberger BY Albert Gordon ATT'Y

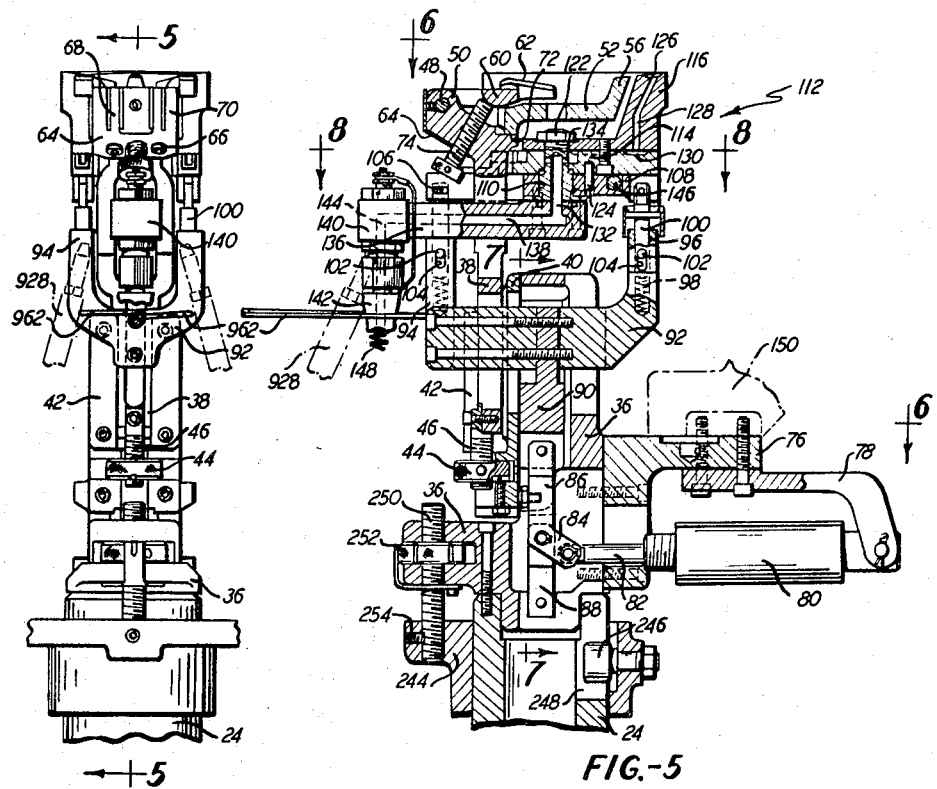

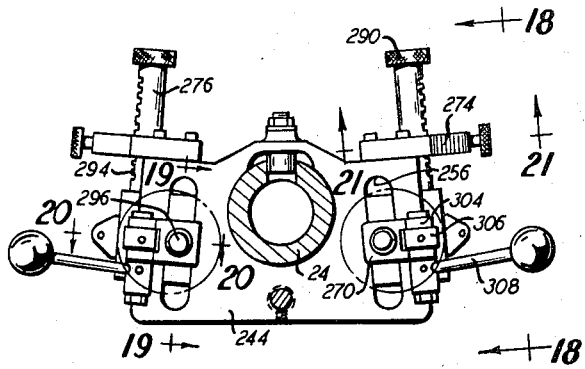
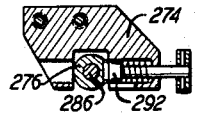
FIG.-17  FIG.-21
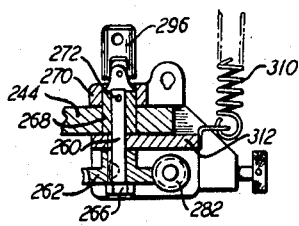
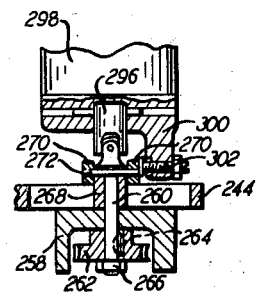
FIG.-20  FIG.-19
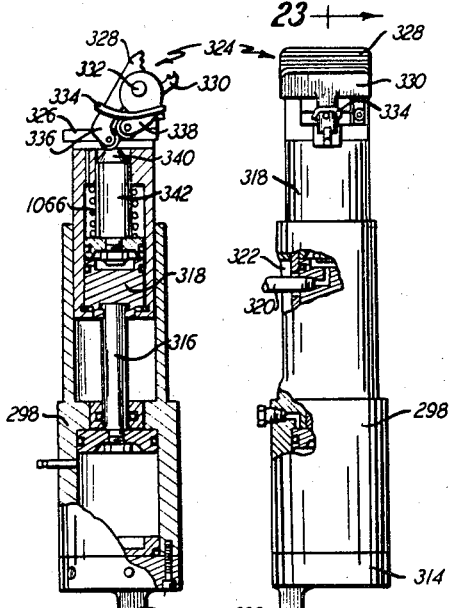
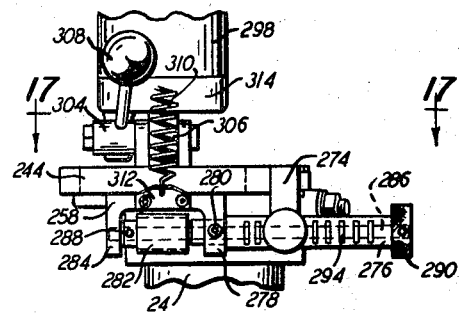
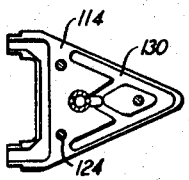
FIG.-23  FIG.-22  FIG.-18  FIG.-8

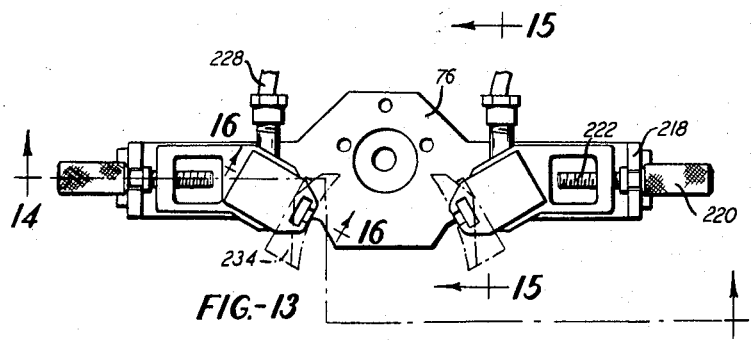
FIG.-13
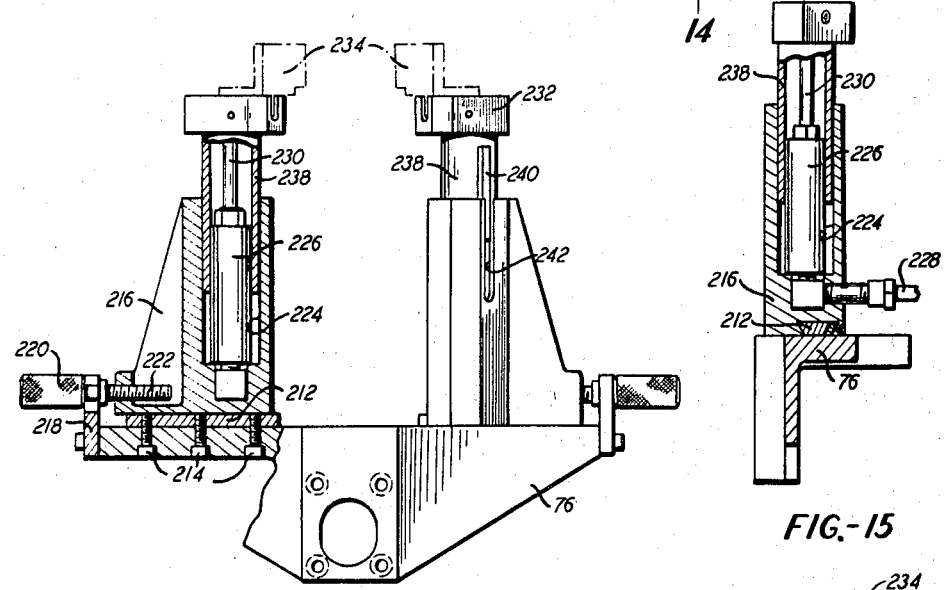
FIG.-14
FIG.-15
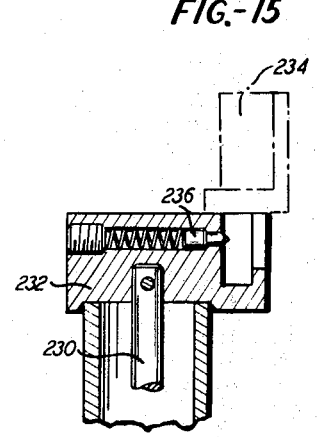
FIG.-16

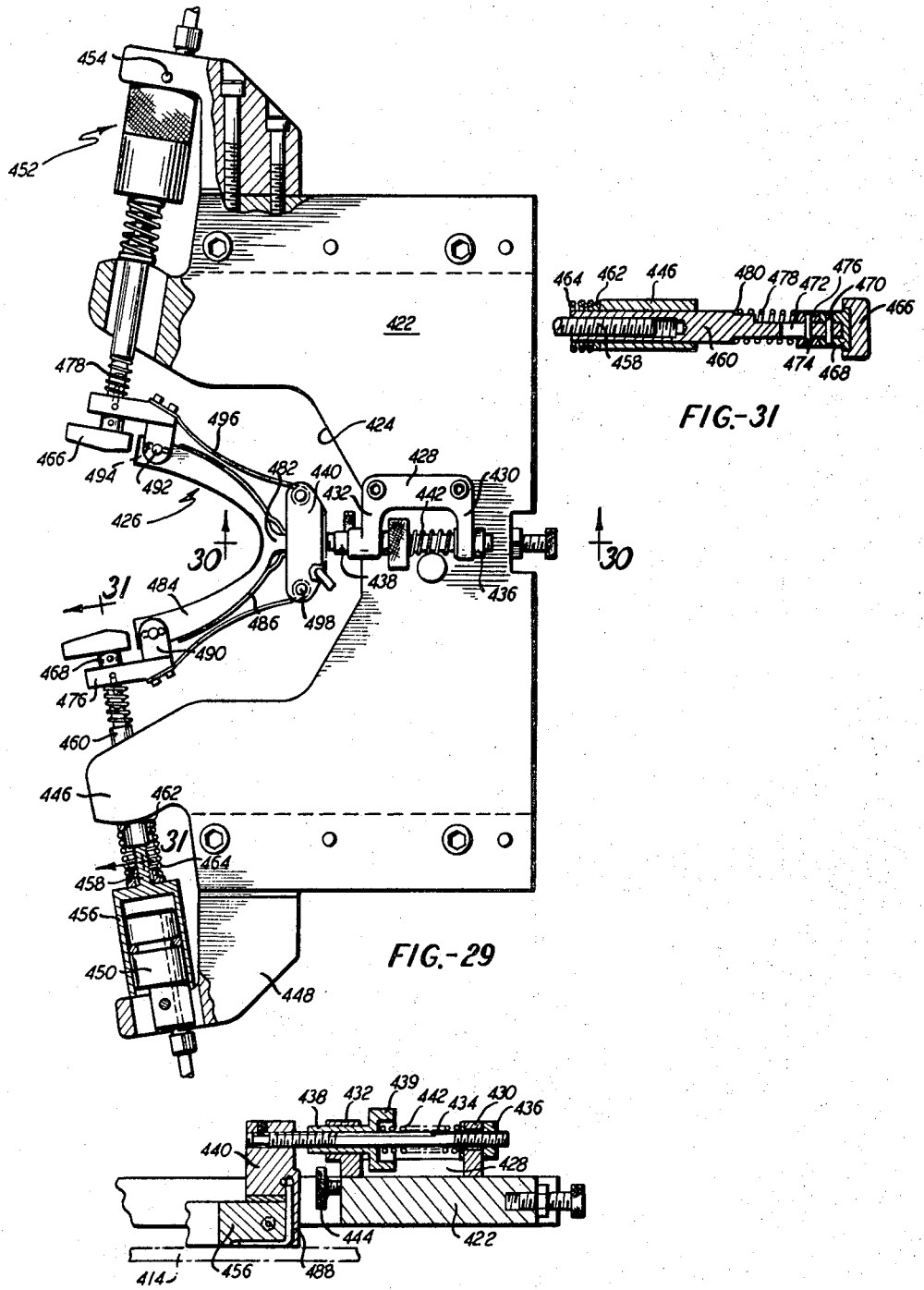

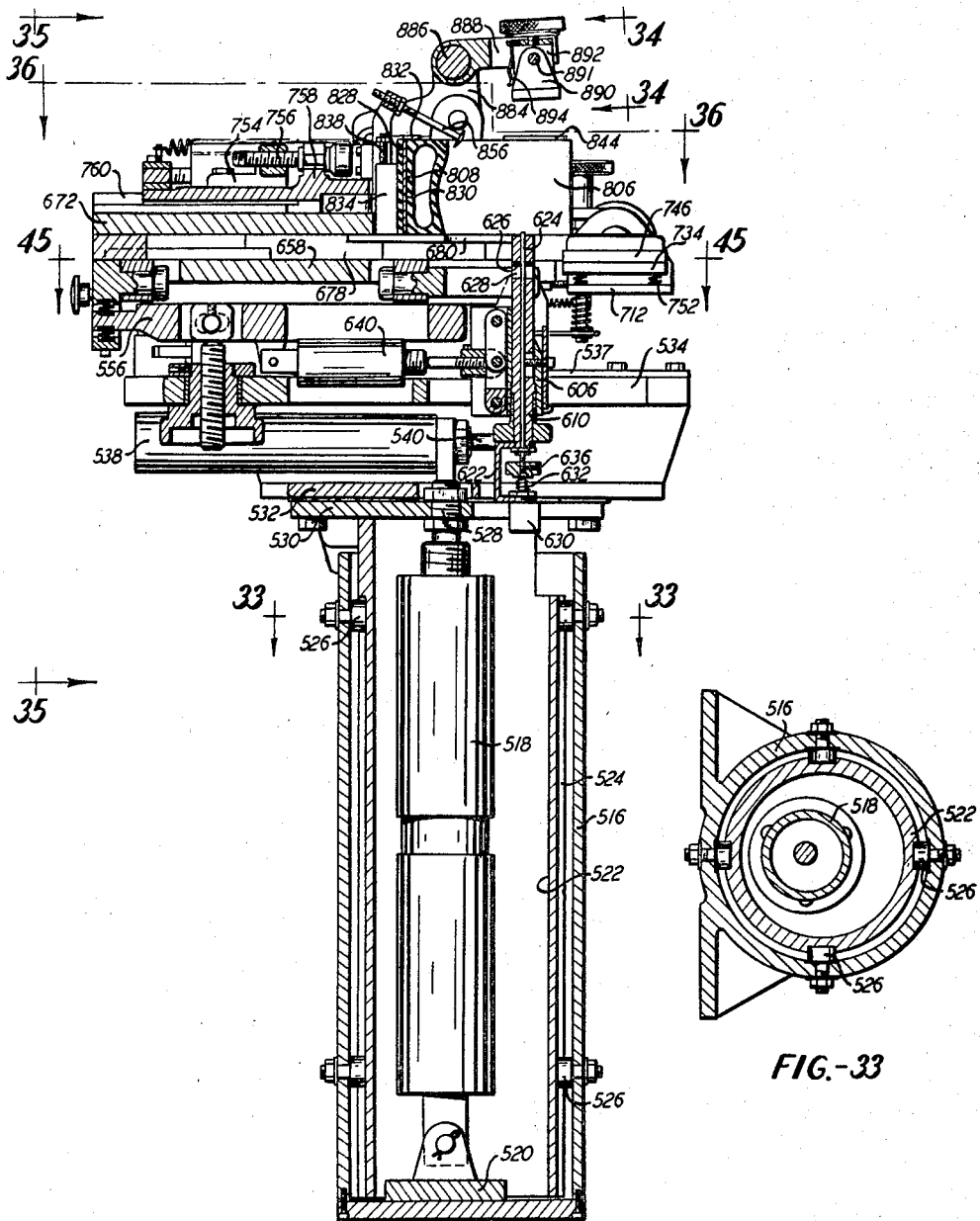
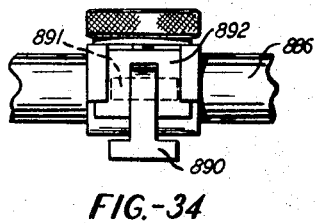
FIG.-32
FIG.-33
FIG.-34

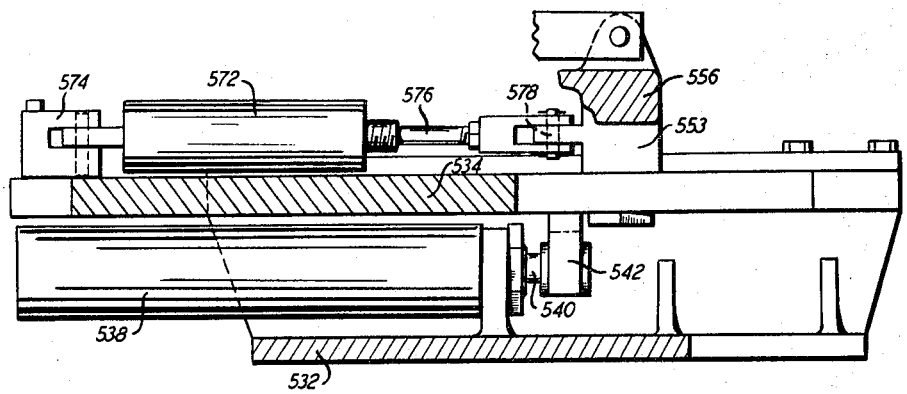
FIG.-49
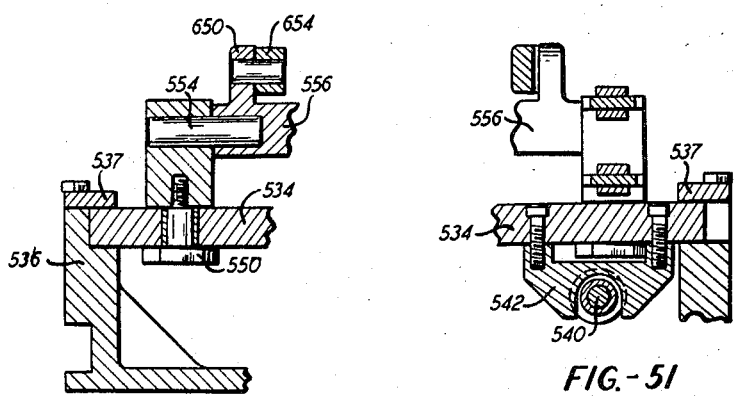
FIG.-52
FIG.-51
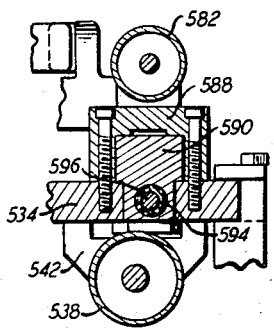
FIG.-50

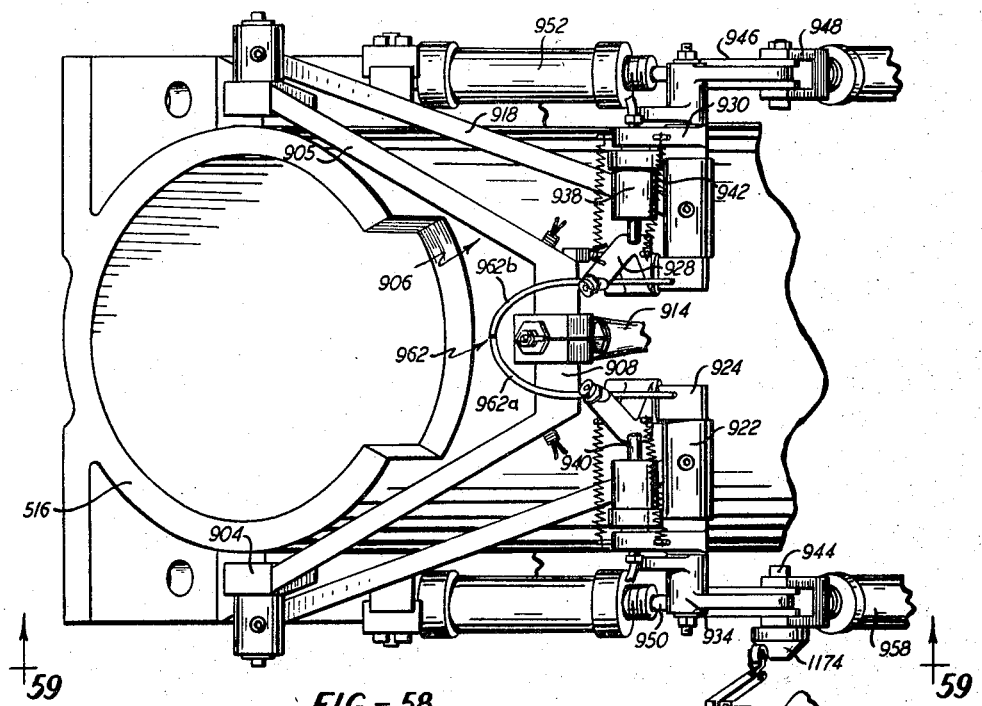
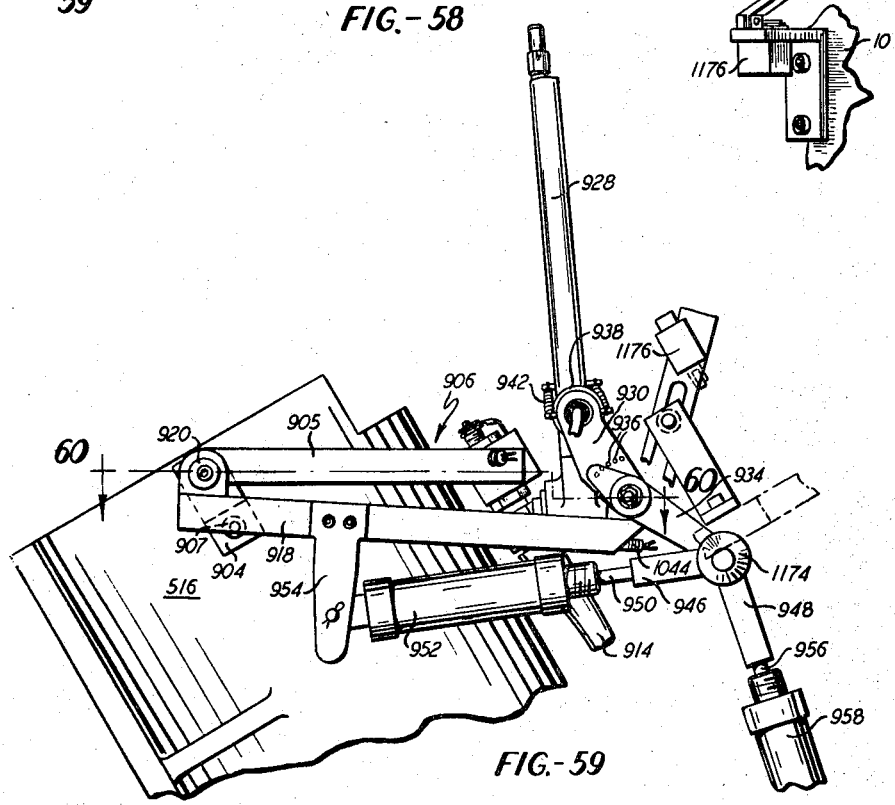
FIG.-58
FIG.-59

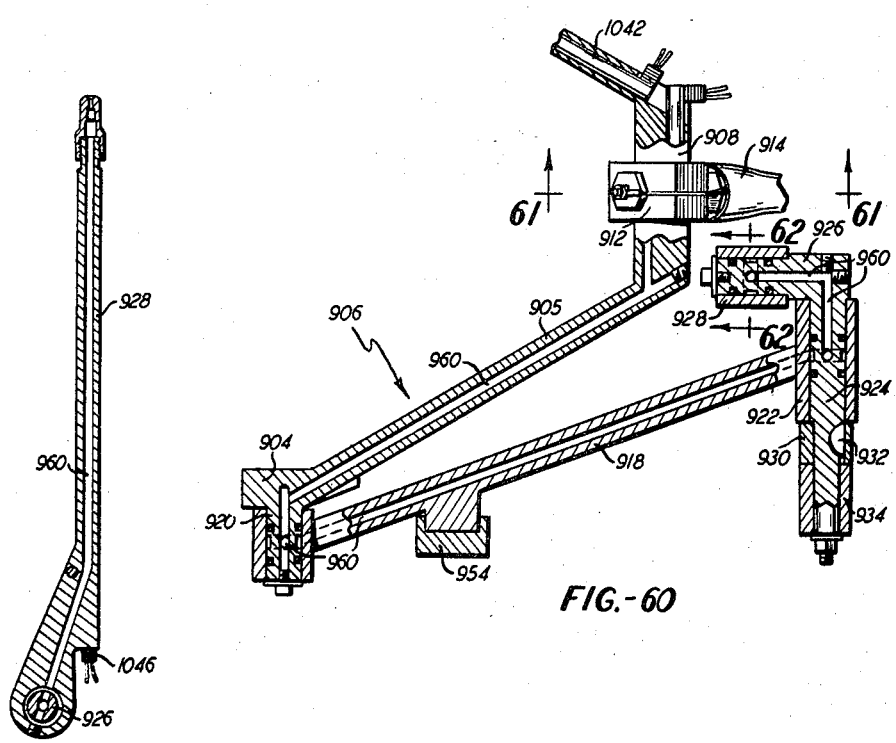
FIG.-60
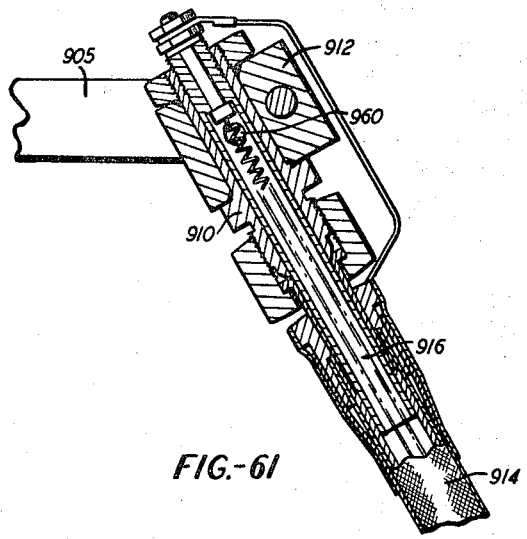
FIG.-62
FIG.-61

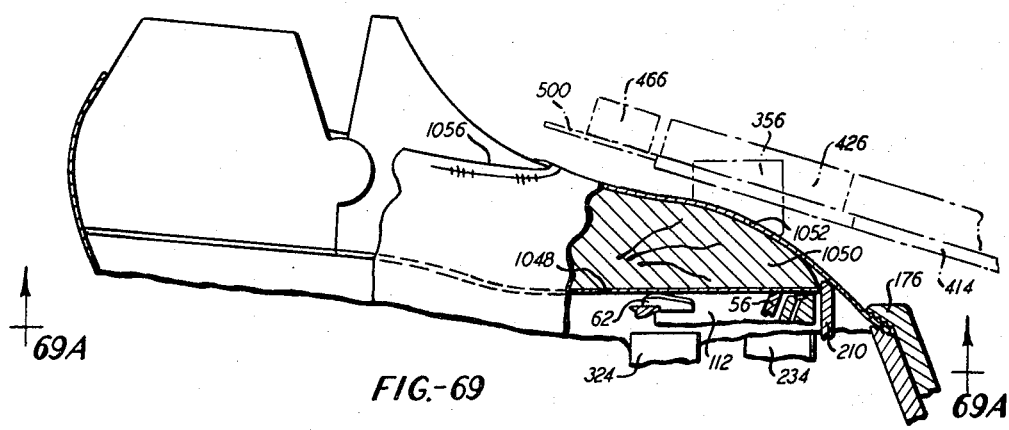
FIG.-69
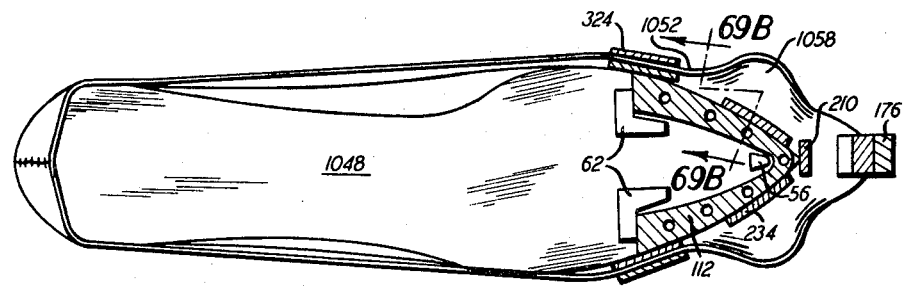
FIG.-69A
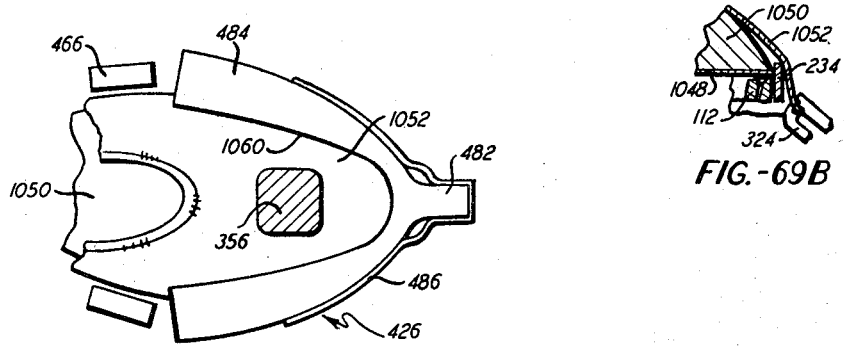
FIG.-70
FIG.-69B

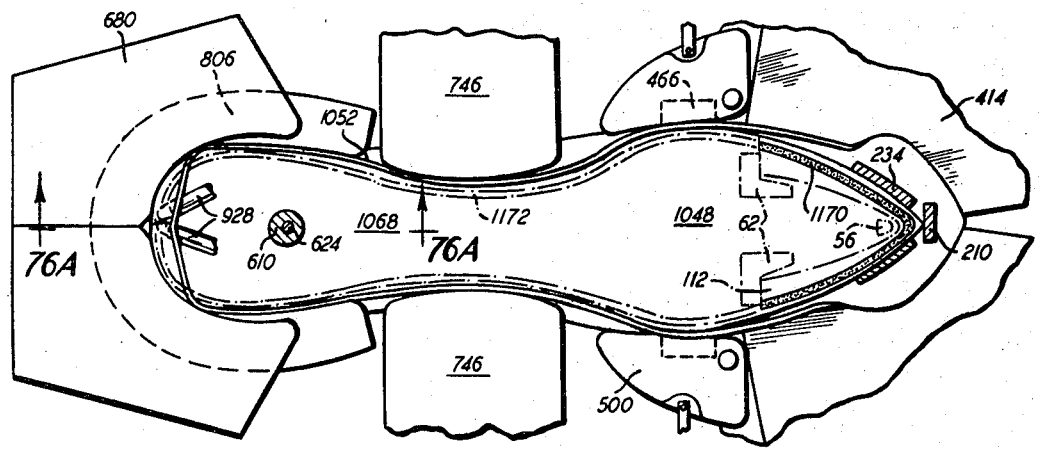
FIG.-76
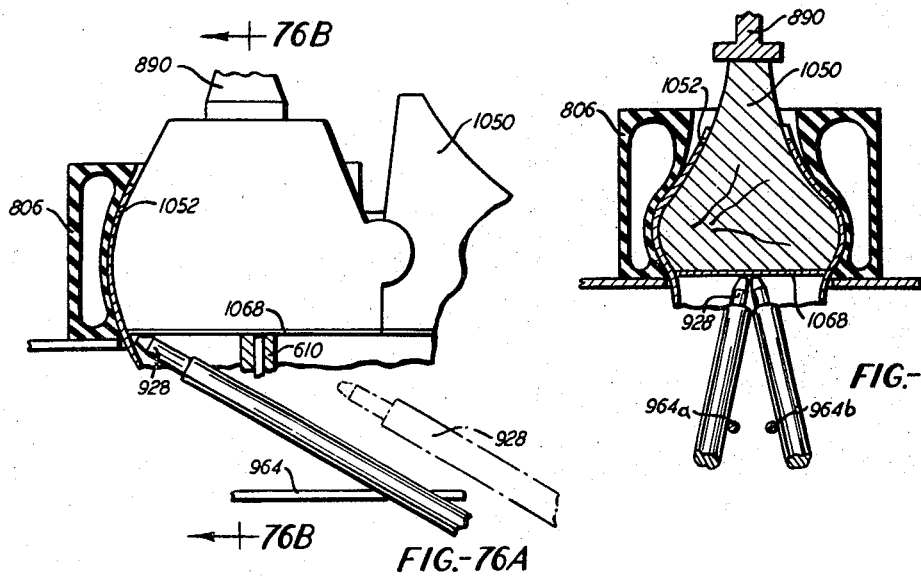
FIG.-76A
FIG.-76B

United States Patent Office 3,422,474
Patented Jan. 21, 1969

3,422,474
METHOD AND APPARATUS FOR USE IN LASTING SHOES
Jacob S. Kamborian, Boston, Allen C. Harriman, Brockton, Geoffrey T. Jones, Walpole, and Karl F. Vornberger, Tewksbury, Mass., assignors to Jacob S. Kamborian, Boston, Mass.
Filed Feb. 18, 1966, Ser. No. 528,430
U.S. Cl. 12—145                     157 Claims
Int. Cl. A43d 25/02; A43d 21/08

ABSTRACT OF THE DISCLOSURE

There is disclosed herein a machine for applying cement to the periphery of an insole that is located on a last bottom and for wiping the entire margin of an upper mounted on the last against the insole to thereby adhesively secure the entire upper margin to the insole.

---

This invention relates to the lasting of shoes by supporting a shoe assembly that comprises a last having an upper mounted thereon and an insole located on its bottom and wiping the margin of the upper against the insole.

One aspect of the invention is concerned with the wiping of the heel portion of the shoe assembly while the forepart of the shoe assembly is supported in a predetermined location. The heel portion of the shoe assembly will extend forwardly away from this predetermined location, and the location of the heel portion of the shoe assembly will depend on the size and style of the shoe and whether it is a left or right shoe. The invention includes a heel section that incorporates heel wiping means. The heel section is initially maintained forwardly of the heel portion of the shoe assembly and is movable through a compound movement to bring the heel wiping means into a wiping position in registry with the heel portion of the insole wherein the heel wiping means is in position to wipe the heel portion of the upper margin against the insole.

Another aspect of the invention is concerned with a lasting apparatus that includes wiping means for wiping a selected portion of the margin of the upper against the corresponding portion of the insole. The wiping means are so constructed as to move in a wiping stroke in a plane substantially parallel to the plane of said insole portion. Means are provided to enable the wiping means to have limited universal movement during its wiping stroke to thereby enable the wiping means to conform precisely to the plane of said insole portion during its wiping stroke.

Another aspect of the invention relates to an arrangement for adjusting the plane of the wiping means so that it can lie in a plane substantially parallel to the plane of said insole portion.

In the illustrative embodiment of the invention, the heel portions are the selected portions of the upper and insole. Another aspect of the invention relates to an arrangement for adjusting the position of the wiping means so that it will be symmetrically disposed with respect to the heel portion of the shoe assembly.

A further aspect of the invention is concerned with the wiping of the shank portions of the upper margin against the insole and relates to a shank wiper structure that enables it to conform to the plane of the shank portion of the insole during the wiping movement of the shank wiper.

A further aspect of the invention relates to the construction of a wiper mount that enables a wiper to move heightwise during its wiping movement to thereby stretch the upper about the last prior to wiping the margin of the upper against the insole.

In the accompanying drawings:

FIGURE 1 is a side elevation of a machine for practicing the invention;
FIGURE 2 is a vertical section of a portion of the machine including a toe post on which a support for the shoe assembly is mounted;
FIGURE 3 is a view taken on the line 3—3 of FIGURE 2;
FIGURE 4 is a front elevation of a portion of the machine showing an arrangement for supporting the shoe assembly;
FIGURE 5 is a view taken on the line 5—5 of FIGURE 4;
FIGURE 6 is a view taken on the line 6—6 of FIGURE 5;
FIGURE 7 is a view taken on the line 7—7 of FIGURE 5;
FIGURE 8 is a view taken on the line 8—8 of FIGURE 5;
FIGURE 9 is an elevation, partly in section, of a front pincers and a front retarder;
FIGURE 10 is a view taken on the line 10—10 of FIGURE 9;
FIGURE 11 is a view taken on the line 11—11 of FIGURE 9;
FIGURE 12 is a side elevation of an arrangement for stretching the toe and forepart portions of the upper about the last;
FIGURE 13 is a plan view of side retarders;
FIGURE 14 is a view taken on the line 14—14 of FIGURE 13;
FIGURE 15 is a view taken on the line 15—15 of FIGURE 13;
FIGURE 16 is a view taken on the line 16—16 of FIGURE 13;
FIGURE 17 is a plan view of a side pincers mounting taken on the line 17—17 of 18;
FIGURE 18 is a view taken on the line 18—18 of FIGURE 17;
FIGURE 19 is a view taken on the line 19—19 of FIGURE 17;
FIGURE 20 is a view taken on the line 20—20 of FIGURE 17;
FIGURE 21 is a view taken on the line 21—21 of FIGURE 17;
FIGURE 22 is an elevation of a side pincers;
FIGURES 23 is a view taken on the line 23—23 of FIGURE 22;
FIGURE 24 is a side elevation of a portion of the machine carrying toe wipers and ball wipers taken on the line 24—24 of FIGURE 28;
FIGURE 25 is a view taken on the line 25—25 of FIGURE 24;
FIGURE 26 is a view taken on the line 26—26 of FIGURE 25;
FIGURE 27 is a view taken on the line 27—27 of FIGURE 25;
FIGURE 28 is a view taken on the line 28—28 of FIGURE 25;
FIGURE 29 is a plan view of a shoe conforming yoke and bumper arrangement;

FIGURE 30 is a view taken on the line 30—30 of FIGURE 29;

FIGURE 31 is a view taken on the line 31—31 of FIGURE 29;

FIGURE 32 is a vertical section of a heel section of the machine;

FIGURE 33 is a view taken on the line 33—33 of FIGURE 32;

FIGURE 34 is a view taken on the line 34—34 of FIGURE 32;

FIGURE 49 is a view taken on the line 49—49 of FIGURE 47;

FIGURE 50 is a view taken on the line 50—50 of FIGURE 47;

FIGURE 51 is a view taken on the line 51—51 of FIGURE 47;

FIGURE 52 is a view taken on the line 52—52 of FIGURE 47;

FIGURE 58 is a plan view of a nozzle mounting arrangement;

FIGURE 59 is a view taken on the line 59—59 of FIGURE 58;

FIGURE 60 is a view taken on the line 60—60 of FIGURE 59;

FIGURE 61 is a view taken on the line 61—61 of FIGURE 60;

FIGURE 62 is a view taken on the line 62—62 of FIGURE 60;

FIGURE 64 is a view taken on the line 64—64 of FIGURE 63;

FIGURE 69 is a representation of the shoe assembly as it appears in the machine after the upper has been stretched about the last by front and side pincers;

FIGURE 69A is a view taken on the line 69A—69A of FIGURE 69;

FIGURE 69B is a view taken on the line 69B—69B of FIGURE 69A;

FIGURE 70 is a representation of the shoe assembly as it appears in the machine when the shoe conforming yoke is forced downwardly of the shoe assembly;

FIGURE 76 is a representation of the shoe assembly as it appears in the machine when cement is about to be applied to the heel and shank portions of the insole;

FIGURE 76A is a view taken on the line 76A—76A of of FIGURE 76A;

FIGURE 76B is a view taken on the line 76B—76B of FIGURE 76A;

Figure 1:
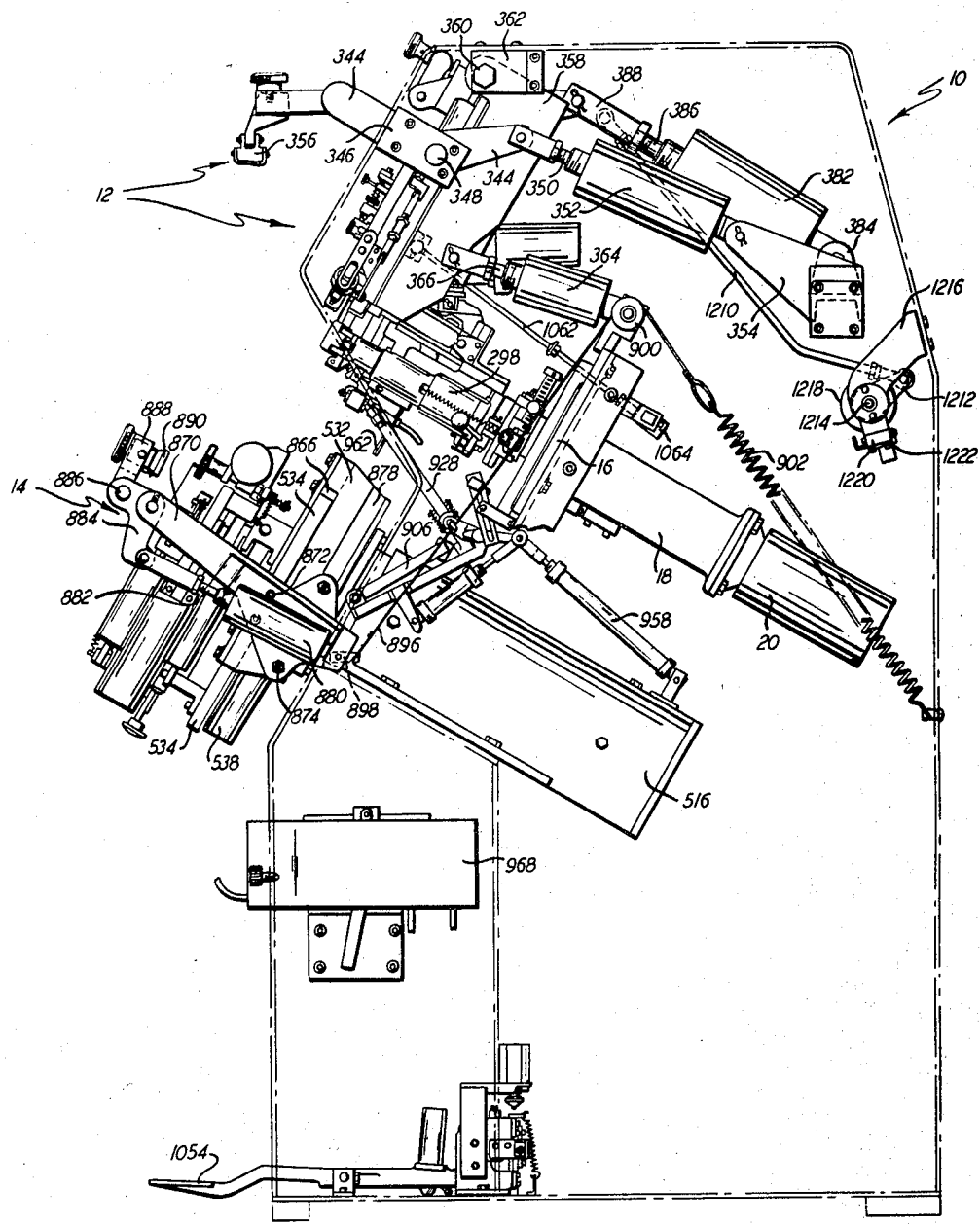

As seen in FIGURE 1, the machine includes a frame 10 in which are mounted a toe section 12 for pulling over the upper on the last and for wiping the toe, forepart and ball portions of the upper margin against the insole and a heel section 14 for wiping the heel and shank portions of the upper margin against the insole. The frame incorporates a base 16 that has a sleeve 18 extending downwardly therefrom. For convenience of operation, the machine is inclined downwardly in a direction extending from the toe section 12 towards the heel section 14. However, parts extending in the direction of the plate 16 will hereafter be referred to as extending horizontally and parts extending in the direction of the sleeve 18 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

Figures 2, 3:
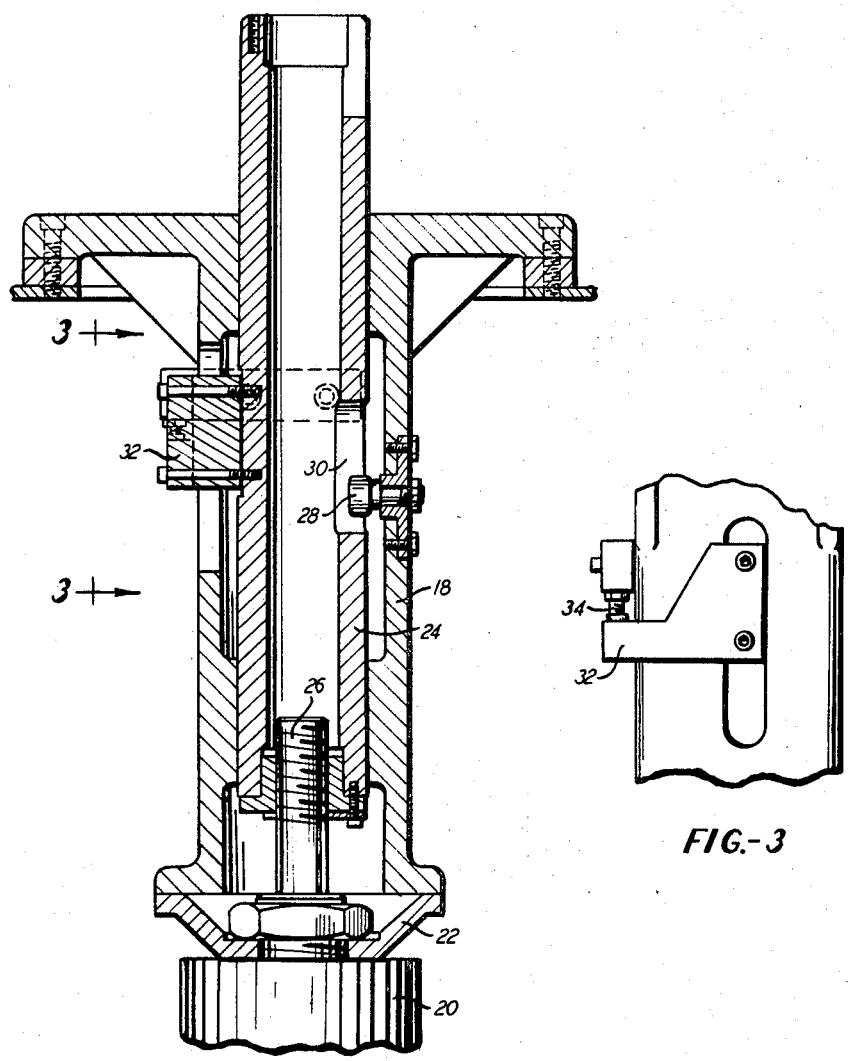

The toe section 12, which in many respects is similar to the toe pulling over and wiping mechanism disclosed in pending application Ser. No. 472,525, filed July 16, 1965, includes an air operated motor 20 (FIGURE 2) that is secured to a cap 22 at the bottom of the sleeve 18, and a toe post 24 is secured to the piston rod 26 of the motor 20 to extend vertically and be slidable within the sleeve 18. A roller 28, bolted to the sleeve 18, is received within a vertical slot 30 in the post 24 to preclude rotation of the post about the axis of the sleeve. A lug 32 (FIGURE 3), bolted to the post 24, is in vertical alignment with a stud 34 that is secured to the sleeve 18 to thereby limit the extent that the motor 20 may raise the post 24 and the parts carried thereby.

A toe post extension 36 (FIGURES 4 and 5), is secured to the upper end of the post 24. A bar 38, which serves as an insole rest mount, is slidably mounted for vertical movement between a bearing plate 40 and gibs 42 that are secured to the post extension 36. A nut 44, rotatably mounted in the post extension 36, is in threaded engagement with a screw 46 that is fastened to the bar 38 whereby rotation of the nut effects vertical adjustment of the bar and the below described insole rests mounted on the bar. A pivot pin 48, located at the top of the bar 38, extends through a prong 50 at the top of the bar. A lug 52 extending rearwardly of the pin 48 has forwardly directed legs 54 (see FIGURE 6) that straddle the prong 50 and are pivoted on the pin 48. A toe insole rest 56 extends upwardly of the rear end of the lug 52. A pair of legs 58 are pivoted on the pin 48 outwardly of the legs 54. A cross-beam 60, extending between the legs 58, has a pair of forepart insole rests 62 extending upwardly thereof. A leaf spring 64, secured to the front of the top of the bar 38 by screws 66, has upwardly extending limbs 68 and 70 that respectively bear against the legs 54 and 58 to yieldably urge them clockwise (FIGURE 5) about the pin 48 to thereby yieldably urge the insole rests 56 and 62 downwardly. A ledge 72 on the bar 38 bearing against the lug 52 limits the downward movement of the insole rest 56. A bolt 74, threaded into the bar 38 and bearing against the cross-beam 60, limits the downward movement of the insole rests 62.

A rearwardly extending ledge 76 of the post extension 36 has a hanger 78 depending therefrom. An air operated motor 80 is pivoted to the hanger 78. The piston rod 82 of the motor 80 is pivoted to a link 84, and the link 84 is pivoted to a pair of toggle links 86 and 88 (see FIGURES 5 and 7). The link 88 extends downwardly of the link 84 and is pivoted to the post extension 36 while the link 86 extends upwardly of the link 84 and is pivoted to a slide 90 that is guided for vertical movement by the post 36 and the bearing plate 40. A mount 92 is secured to the slide 90 and has a pair of front prongs 94 and a rear prong 96 extending upwardly thereof. Upwardly extending compression springs 98 are seated in each of the prongs 94, 96. Each of the springs 98 bears against a rod 100 to yieldably urge the rods upwardly. Pins 102 in the rods 100 ride in slots 104 in the prongs 94, 96 and normally bear against the tops of the slot to limit the extent of upward movement of the rods 100.

The pins 102 are connected by way of pin and slot connection 106 (FIGURE 5) to a bracket 108. A ferrule 110 extends through and is secured to the bracket 108 and extends through an applicator-support 112 that rests on the bracket 108. The applicator-support 112 comprises a base section 114 that lies beneath the lug 52 and an upwardly extending and forked extruding and support section 116 that has a pair of legs 118 diverging forwardly and downwardly from an apex 120. The extruding section 116 lies outwardly of the lug 52 and insole rest 56. The section 116, which has a configuration corresponding to the margin of the toe portion of the insole of the shot to be lasted, is secured to the bracket 108 by a nut 122 threaded onto the ferrule 110 and by aligning pins 124. A groove 126 is provided in the top of the extruding-support section 116 and a plurality of holes 128 intersect the groove 126 and extend downwardly therefrom. The holes 128 intersect channels 130 (FIGURE 8) in the top of the base section 114. The ferrule 110 has holes 132 and 134 therein that are in communication with the channels 130. A strut 136, secured to the undersurface of the bracket 108, has a passage 138 therein that is in communication with the hole 132. An adapter 140 on the forward end of the strut 136 has a hollow, flexible conduit 142 secured thereto. A passage 144 in the adapter 140 provides communication between the passage 138 and the condut 142. An electrc heating element 146 in the bracket 108 is provided to heat the applicator-support 112. The conduit 142 is made of a tube that is thermally and electrically insulative and has an electric resistor wire 148 running therethrough that is connected to a source of electrical energy.

Figure 9:
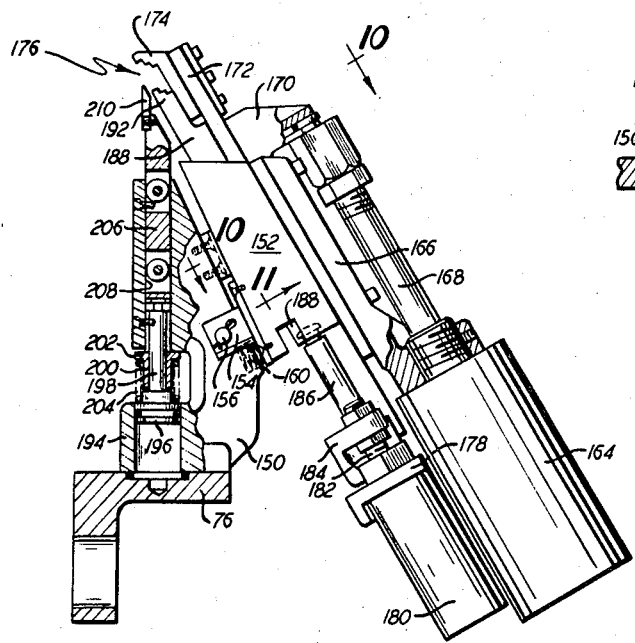
Figure 10:
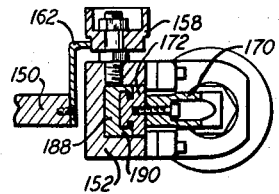
Figure 11:
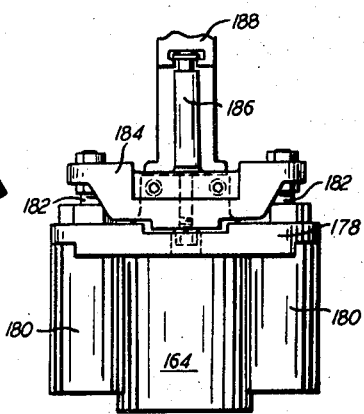
Figure 12:
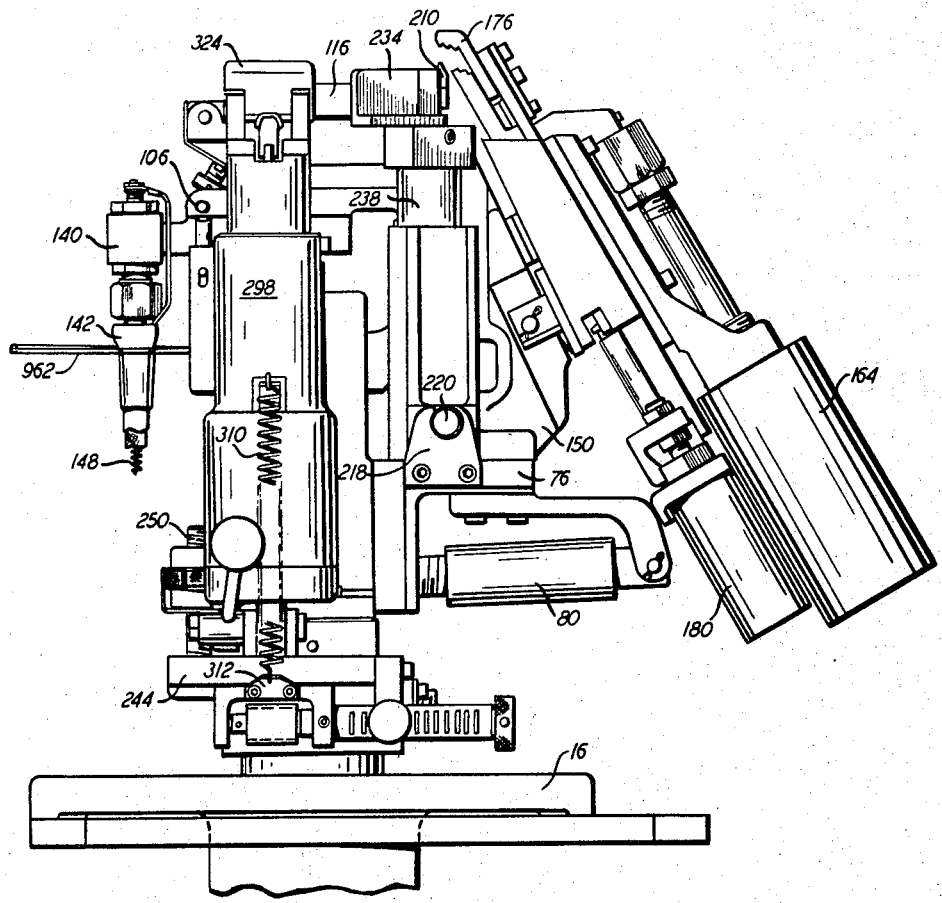
Figure 24:
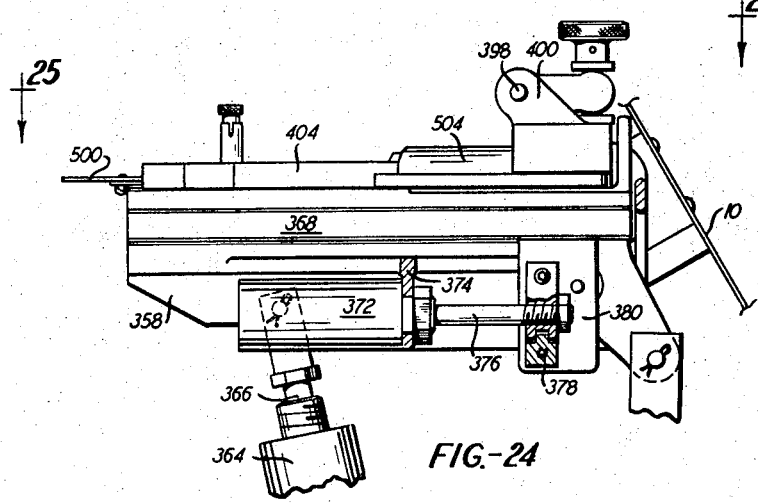

Referring to FIGURES 9, 10 and 11, a housing 150 is secured to and extends upwardly of the ledge 76. A bracket 152, located rearwardly of the housing 150, has an extension 154 that is pivoted on a pin 156 extending outwardly of the housing 150. A rotary cam 158 is eccentrically mounted on the bracket 152. A compression spring 160 interposed between the bracket 152 and the housing 150 serves to swing the bracket about the axis of the pin 156 and cause the cam 158 to bear against a stop element 162 that is secured to the housing 150. An air operated motor 164 is secured to a block 166 that is secured to the bracket 152. The motor 164 has a piston rod 168 extending upwardly and forwardly thereof. A block 170 is secured to the piston rod 168, and a bar 172 is rigidly connected to the block 170. The bar 172 is slidably mounted in a guideway in the bracket 152. The upper jaw 174 of the front pincers 176 is secured to the upper end of the bar 172. The lower end of the bar 172 is secured to a bracket 178 on which a pair of air operated motors 180 are mounted. The piston rods 182 of the motor 180 are connected to a hanger 184, and a pin 186 is secured to the hanger and extends upwardly thereof. The pin 186 is connected to a bar 188 that is slidable in ways 190 formed in the bar 172. The lower jaw 192 of the pincers 176 is mounted on the upper end of the bar 188. Above the ledge 76, the housing 150 is formed into a cylinder 194 in which a piston 196 is vertically movable. A piston rod 198, extending upwardly of the piston 196, is slidable in a bushing 200 that in turn is slidably mounted on the piston rod 198. A shoulder 202 is provided at the upper end of the bushing 200 and bears against the housing 150. A compression spring 204, interposed between the shoulder 202 and the piston 196, yieldably seats the shoulder against the bottom of the housing 150 and yieldably urges the piston downwardly against the force of the pressurized air that is normally in the cylinder 194. A bar 206, connected to and extending upwardly of the rod 198, is slidable in a vertical guideway 208 formed at the front end of the housing 150 above the cylinder 194, and a front retarder blade 210 is affixed to the top of the bar 206. The pincers 176 and the retarder blade 210 are both positioned rearwardly of the applicator-support 112 and the insole rests 56, 62.

Referring to FIGURES 12–16, a gib 212 is bolted to the ledge 76 forwardly of the housing 150 on each side of the applicator-support 112, the extruding section 116 and the insole rests 56, 62 by means of headed bolts 214. A column 216 is slidably mounted on each gib 212 for inward and outward movement. Struts 218 are secured to the ledge 76 outwardly of each column 216. A knob 220, rotatably mounted in each strut 218, has an inwardly directed screw 222 secured thereto that is threaded to a column 216, whereby the position of each column on its gib 212 may be adjusted by rotating its associated knob 220. A cavity 224 is provided in each column 216 and an upwardly extending air actuated motor 226 is mounted in each cavity. A line 228 is connected to the bottom of each motor 226 to thereby enable pressurized air to force the piston rods 230 of the motors 226 upwardly. Each of the piston rods 230 is pinned to a block 232 and a side retarder blade 234 is secured to each block 232 to extend upwardly thereof by a spring pressed detent 236. A sleeve 238 is welded to each block 232. Each sleeve 238 extends downwardly of a block 232 into a cavity 224 between a motor 226 and a column 216. A spline 240, secured to each sleeve 238, extends into a vertical groove 242 provided in each of the columns 216 whereby the blocks 232 and retarder blades 234 are precluded from movement about the vertical axes of the sleeves 238 during their vertical movement in response to actuations of the motors 226.

A base 244 (FIGURES 5 and 12) is slidably mounted on the toe post 24 below the toe post extension 36 and above the plate 16 by way of a roller 246 secured to the base and extending into a vertically extending slot 248 in toe post extension 36, is threaded into a nut 252 that is the post. A bolt 250, extending through a flange on the rotatably mounted in the flange. The bottom of the bolt 250 is threaded into the base 244 and is locked thereto by a set screw 254. Thus rotation of the nut 252 causes vertical adjustment of the base 244 on the post 24.

Referring to FIGURES 17–21, the base 244 has a pair of rearwardly convergent slots 256 extending therethrough on opposite sides of the post 24. A U-shaped block 258 is located below the base 244 straddling each slot 256. A pin 260 extends through each block 258 and slot 256. A worm gear 262 is keyed to each pin 260 to rotate therewith by a key 264, and each worm gear 262 is interposed between a block 258 and a nut 266 threaded onto the bottom of each pin 260. A sleeve 268, extending through each slot 256, embraces each pin 260 with the bottoms of the sleeves lying on the blocks 258. A stop plate 270 is located above the base 244 to straddle each slot 256 on opposite sides of each pin 260 and sleeve 268. A cross-pin 272 extends through each associated plate 270, sleeve 268 and pin 260 to connect these members for movement in unison about the axes of the pins 260. A flange 274 extends downwardly of the plate 244 forwardly of each slot 256. A hollow stud 276 is located within a cut-out in each flange 274 and extends rearwardly thereof through a downwardly directed leg 278 of its associated block 258 where it is secured to the leg 278 by a stud 280. A worm 282, that is in mesh with its associated worm gear 262, is located between each block leg 278 and another downwardly extending block leg 284 with the forward end of each worm bearing against the rear end of a stud 276 and the rear end of each worm bearing against a block leg 284. A rod 286 extends through each stud 276 and worm 282 with the rear end of each rod rotatable in a block leg 284. The rods 286 are pinned to the worms 282 by studs 288 to rotate in unison therewith. A knob 290 is pinned to each rod 286. A spring-pressed detent 292 is mounted in each flange 274 and is yieldably urged towards a selected one of a plurality of teeth 294 formed in the studs 276 to thereby lock the studs in position. A universal joint 296 is connected, as by welding, to the upper end of each pin 260 and sleeve 268 and an air actuated motor 298, which acts as a side pincers carrier, is connected to and extends upwardly of the top of each universal joint 296. A lug 300 extending downwardly of each motor 298 has a stop member in the form of a set screw 302 thereon that is adapted to bear against its associated stop plate 270. A shaft 304, rotatably mounted in each stop plate 270, has an eccentric cam 306 and a handle 308 secured thereto. A tension spring 310 extending between each motor 298 and a bracket 312 secured to the base 244 (see FIGURE 12) serves to yieldably urge the base 314 of each motor 298 against a cam 306.

Referring to FIGURES 22 and 23, the piston rod 316 of each motor 298 has a spring return air actuated motor 318 connected thereto that is slidably mounted in the motor 298. The inlet pipe 320 of each motor 318 rides on a slot 322 formed in each motor 298 to preclude rotation of the motors 318 with respect to the motors 298. A side pincers 324 is mounted on a bracket 326 that is affixed to the top of each motor 318. Each pincers 324 comprises an upper jaw 328 and a lower jaw 330 that are swingable about a pin 332 mounted in the bracket 326. Elastic bands 334 extending about the jaws 328 and 330 serve to yieldably urge the jaws to open position. The jaws 328 and 330 respectively have downwardly extending legs 336 and 338 having rollers thereon that are positioned above a cone-shaped cam 340 formed at the top of the piston rod 342 of each motor 318.

As shown in FIGURE 1, a bell crank lever 344, located on one side of the machine, is pivoted to a bracket 346 that is secured to the frame 10 for swinging movement about the axis of a pin 348. The lever 344 includes a downwardly and rearwardly extending arm that is pivoted to the piston rod 350 of an air actuated motor 352. The motor 352 is pivotally mounted on a bracket 354 that is secured to the frame 10. The parts 344, 346, 348, 350, 352 and 354 are duplicated on the other side of the machine. Each of the levers 344 has an upwardly and forwardly extending arm, and secured between these arms is a toe hold-down 356.

Figure 25:
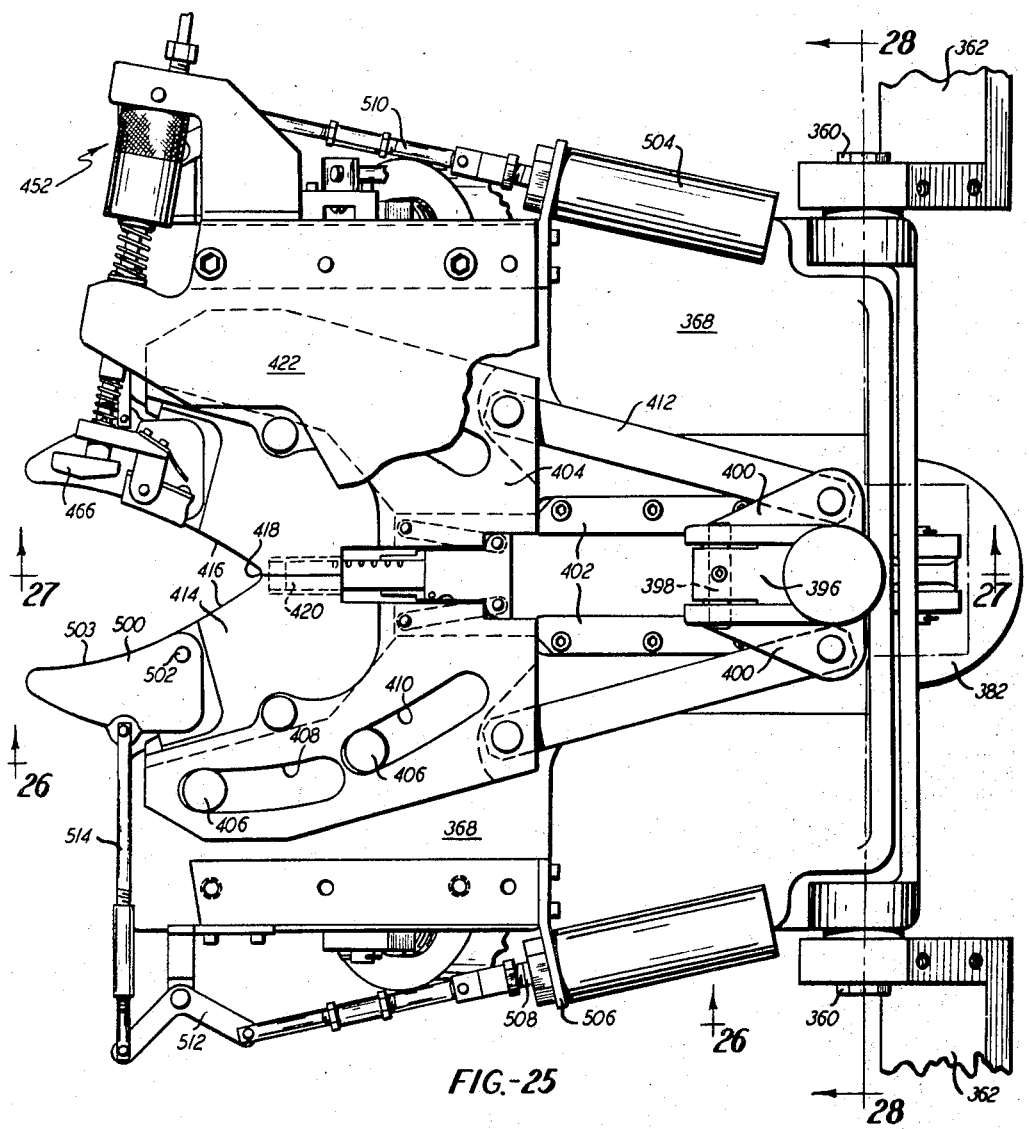
Figure 26:
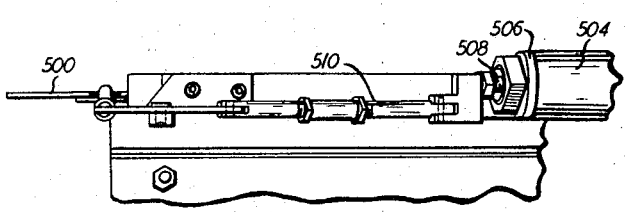
Figures 27, 28:
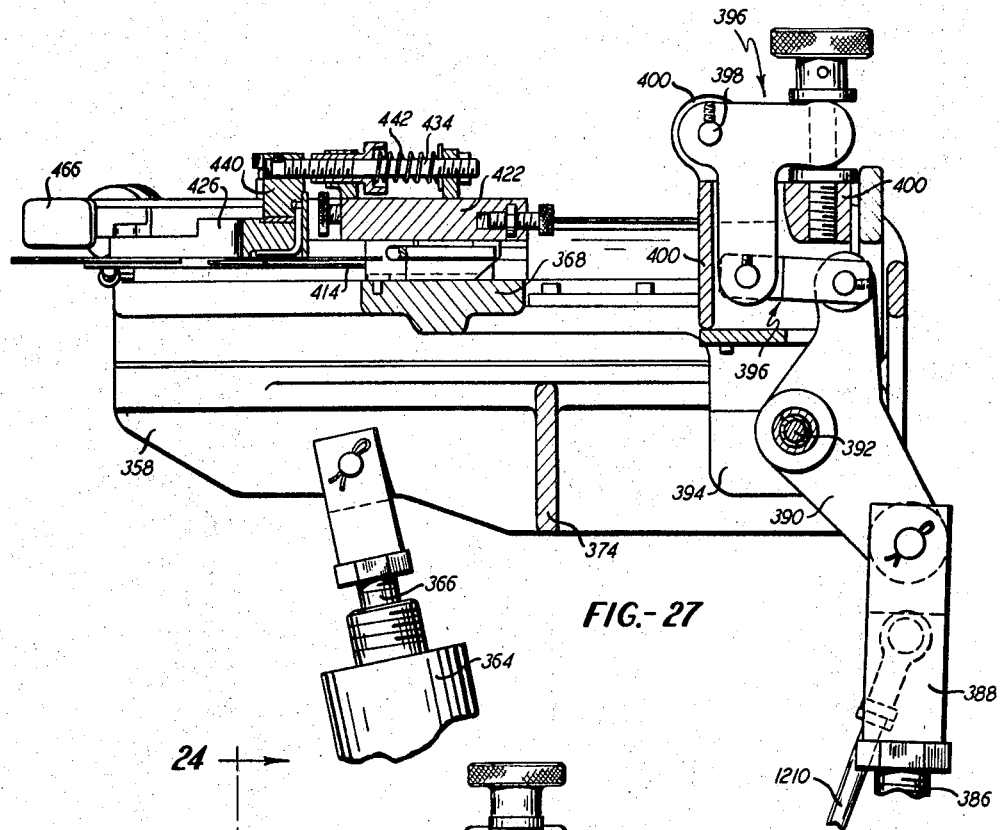

Referring to FIGURES 1 and 24–28, a head 358 is located rearwardly of the applicator-support 112 and front pincers 176. A pair of pins 360, extending laterally from the head 358, are pivoted in brackets 362 that are fastened to the frame 10. A pair of fluid actuated motors 364, that are pivoted to the base 16, have piston rods 366 that are pivoted to the head 358 whereby the motors 364 can be actuated to swing the head upwardly and downwardly about the axes of the pins 360. A slide plate 368 is slidably mounted for forward and rearward movement in the head 358 on gibs 370 (FIGURE 28). An air actuated motor 372 (FIGURE 24) is secured to a rib 374 of the head 358, and the piston rod 376 of the motor 372 is secured to a block 378. The block 378, in turn, is secured to a hanger 380 that depends from the slide plate 368 so that the motor 372 can be actuated to move the slide plate 368 forwardly and rearwardly in the head 358.

An air actuated motor 382, that is pivoted to a bracket 384 secured to the frame 10, has an upwardly extending piston rod 386 (FIGURES 1, 27 and 28). The piston rod 386 is secured to a clevis 388, and the clevis is pivoted to the lower end of a bell crank 390 that is pivoted on a pin 392. The pin 392 is secured to and extends between the hanger 380 and an additional hanger 394 that depends from the slide plate 368. The upper end of the bell crank 390 is pivoted to a linkage 396. A pin 398, that is secured to and extends laterally from the linkage 396, is mounted at its ends to a housing 400. The housing 400 is slidably mounted for forward and rearward movement in gibs 402 formed in the slide plate 368. A pair of symmetrically disposed wiper cams 404 are slidably supported on the forward end of the slide plate 368. The slide plate 368 has pins 406 upstanding therefrom that extend into slots or cam tracks 408 and 410 formed in the wiper cams 404. Forwardly diverging links 412 are pivotally connected at their rear ends to the housing 400 and at their forward ends to the wiper cams 404. Toe wipers 414 are connected to and extend forwardly of the wiper cams 404. The wipers, as is conventional, are flat plates having edges 416 that diverge forwardly from a vertex 418 (FIGURE 25). A knife 420 is slidably guided in the wipers to operate in the manner disclosed more fully in the aforementioned application Ser. No. 472,525.

Referring to FIGURES 29–31, a cover block 422 is secured to the slide plates 368 and extends above the wiper cams 404 (see also FIGURES 25, 27 and 28). The block 422 has a cut-out 424 at its forward end to accommodate a flexible shoe conforming pad or yoke 426. A U-shaped bracket 428, having a rear leg 430 and a front leg 432, is bolted to the block 422. A stud 434 extending through the legs has a stop nut 436 threaded thereon rearwardly of the leg 430. A sleeve, that is formed as a nut 438, is threaded on the stud 434 and is slidably guided in the front leg 432. The forward end of the stud 434 is threaded into and secured to a yoke mounting bracket 440. The rearward end of the nut 438 is formed into a cup 439 that receives a compression spring 442 which is coiled about the stud 434 and extends between the cup 439 and the leg 430. A stop screw 444 is threaded into the block 422 under the stud 434 and rearwardly of the bracket 440. The block 422 is formed into inner flanges 446 at the forward end of the cut-out 424 and outer flanges 448 that are bolted to the block. The piston 450 of an air actuated motor 452 is pivotally secured to each flange 448 by a pin 454 to extend inwardly thereof and a cylinder 456 is slidable on each piston 450. Each cylinder 456 has a screw 458 extending inwardly thereof that is threaded into a bar 460, the bars 460 being slidably mounted in the inner flanges 446. A sleeve 462 is slidably mounted on each bar 460 to bear against the exterior of an inner flange 446, and compression spring 464 interposed between the sleeves 462 and the cylinders 456 serve to yieldably urge the cylinders and the bars 460 outwardly with the cylinders abutting against the outer flanges 448. A rubber bumper 466 is mounted on a mount 468 that in turn is pivotally secured to the inner end of each bar 460 by a pin 470. Slots 472, formed on the bars 460 outwardly of the bumpers 466 and pins 470, receive pins 474 that are secured to brackets 476. Compression springs 478, interposed between shoulders 480 on the bars 460 and the brackets 476, serve to yieldably urge the brackets 476 inwardly with the pins 474 engaging the inner ends of the slots 472.

The yoke 426 is of substantially U-shaped and has a bight 482 and a pair of legs 484 extending forwardly of the bight on opposite sides of the bight. The yoke is made of a flexible, deformable material such as Teflon and has a pair of bowed springs 486 extending exteriorly of each yoke leg from the bight forwardly thereof. The bight 482 of the yoke is received in a socket 488 in the bracket 440. An inwardly extending support arm 490 on each bracket 476 has a downward extending pin 492 that is inserted into a slot 494 in each yoke leg 484. Each bracket 476 has a spring arm 496 secured thereto and extending rearwardly thereof that is entwined at its rear end on a pin 498 located in the mounting bracket 440. The yoke 426 is located in the machine directly above the toe wipers 414.

Referring to FIGURES 25 and 26, a ball wiper 500 is pivoted to each toe wiper 414 on a pin 502 to extend forwardly of the wiper 414. Each ball wiper has an inner surface 503 that extends forwardly of the surface 416 of its associated toe wiper 414. An air actuated motor 504 is secured on each side of the plate 368 to a flange 506 extending laterally of the plate. The piston rod 508 of each motor 504 is pivoted to a link 510. Each link 510 is pivoted to the rear of a bell crank lever 512, each bell crank lever 512 being pivoted intermediate its ends to the plate 368. The front of each bell crank lever 512 is pivoted to a link 514, and each link 514 extends inwardly of its associated bell crank lever 512 and is pivoted to a ball wiper 500. Thus, actuation of the motors 504 cause inward and outward swinging movement of the ball wipers 500 with respect to the toe wipers 414 about the axes of the pins 502.

The heel section 14 is shown in FIGURES 32–57.

Figure 35:
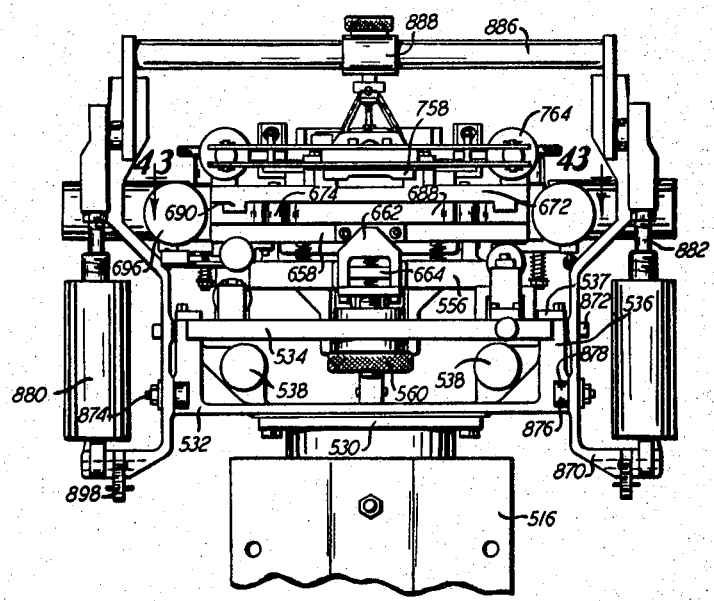
FIGURE 35 is a view taken on the line 35—35 of FIGURE 32.
Figure 57:
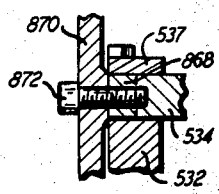
FIGURE 57 is a view taken on the line 57—57 of FIGURE 47.
Figure 36:
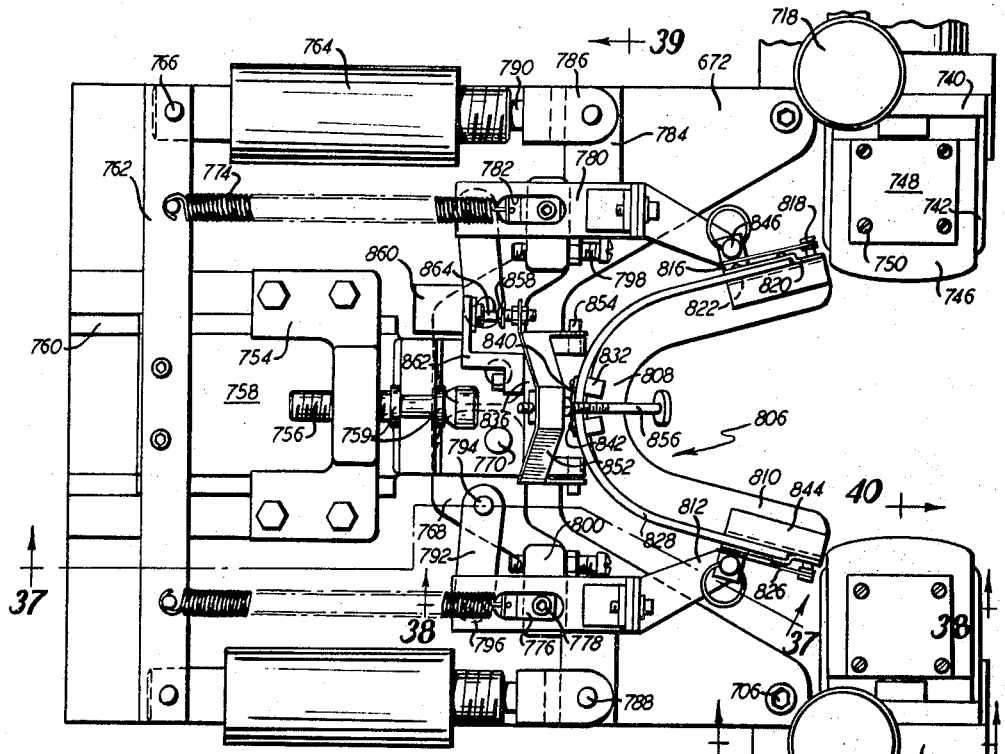
FIGURE 36 is a view taken on the line 36—36 of FIGURE 32.
Figure 37:
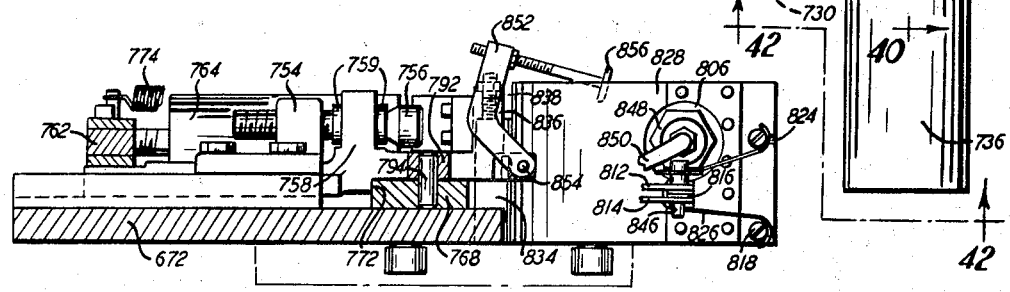
FIGURE 37 is a view taken on the line 37—37 of FIGURE 36.
Figure 38:
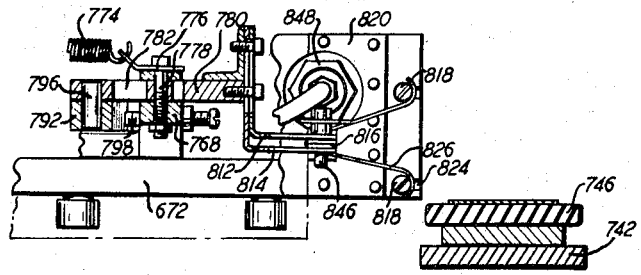
FIGURE 38 is a view taken on the line 38—38 of FIGURE 36.
Figure 39:
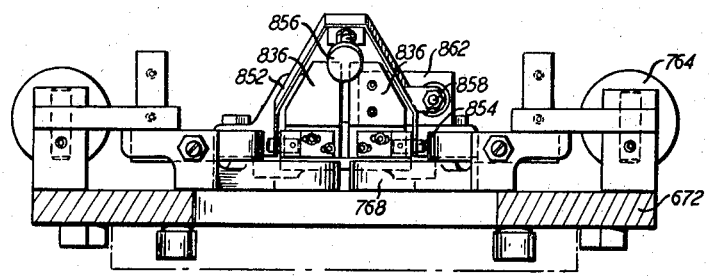
FIGURE 39 is a view taken on the line 39—39 of FIGURE 36.
Figure 42:
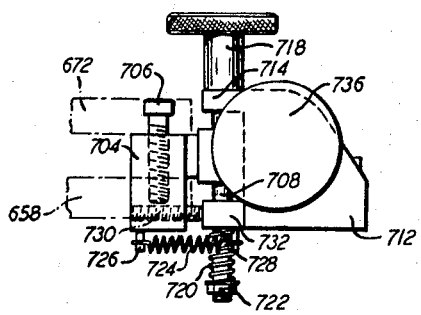
FIGURE 42 is a view taken on the line 42—42 of FIGURE 36.
Figure 41:
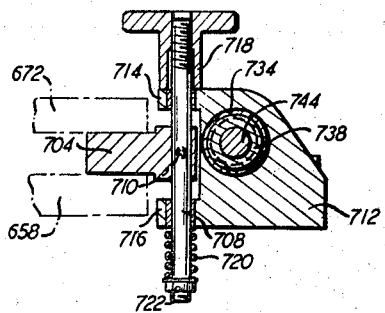
FIGURE 41 is a view taken on the line 41—41 of FIGURE 36.
Figure 40:
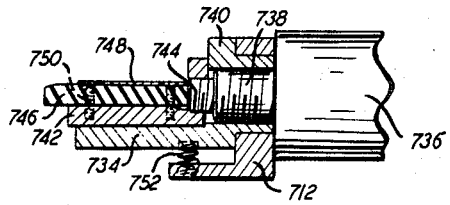
FIGURE 40 is a view taken on the line 40—40 of FIGURE 36.

Referring to FIGURES 32, 33 and 35, a vertically extending hollow housing 516 is secured to the frame 10 forwardly of the toe section 12. A fluid actuated motor 518 is pivoted to and extends upwardly of a clevis 520 that is bolted to the bottom of the housing 516. A sleeve 522, located within the housing 516, is slidably guided for vertical movement by way of a plurality of tracks 524 in the sleeve that receive rolls 526. The rolls 526 are secured to the housing 516 and extend inwardly thereof. The piston rod 528 of the motor 518 is secured to a plate 530, and a heel head 532 is bolted to the plate 530.

A slide plate or primary plate 534 is slidably mounted for forward and rearward movement in the heel head 532 between gibs 536 and plates 537 bolted to the heel head 532 (FIGURES 35 and 52). A pair of fluid actuated motors 538 are secured to the heel head 532 (FIGURES 32, 35 and 49–51). The piston rods 540 of the motors 538 are each secured to a hanger 542 that depends from the slide plate 534, whereby the plate 534 may be moved forwardly and rearwardly by actuation of the motors 538.

Figure 53:
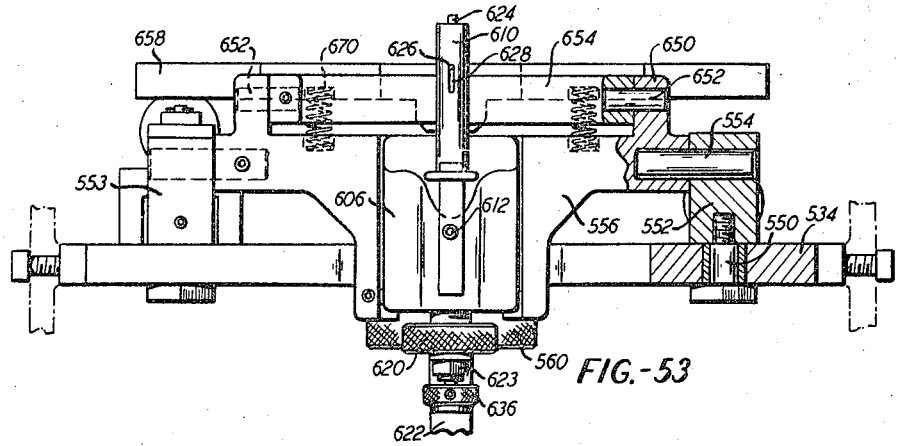
FIGURE 53 is a view taken on the line 53—53 of FIGURE 46.
Figure 54:
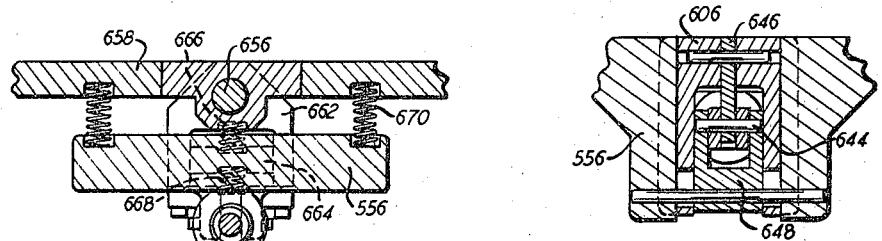
FIGURE 54 is a view taken on the line 54—54 of FIGURE 45.
Figure 56:
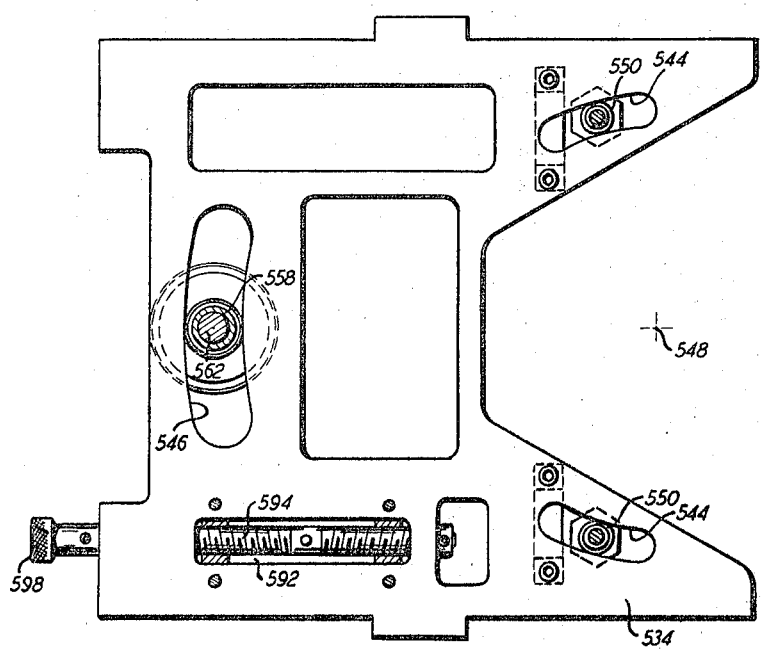
FIGURE 56 is a view taken on the line 56—56 of FIGURE 46.
Figure 63:
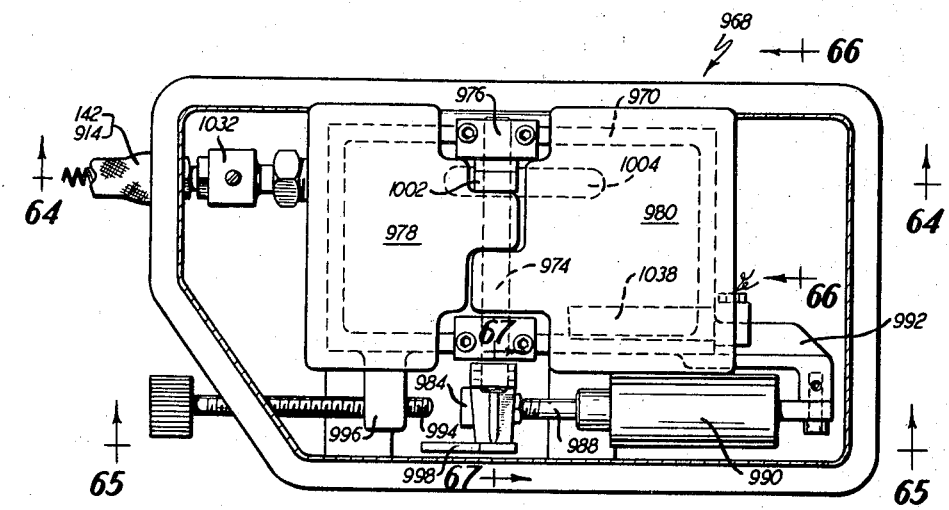
FIGURE 63 is a plan view of a cement pot.
Figure 65:
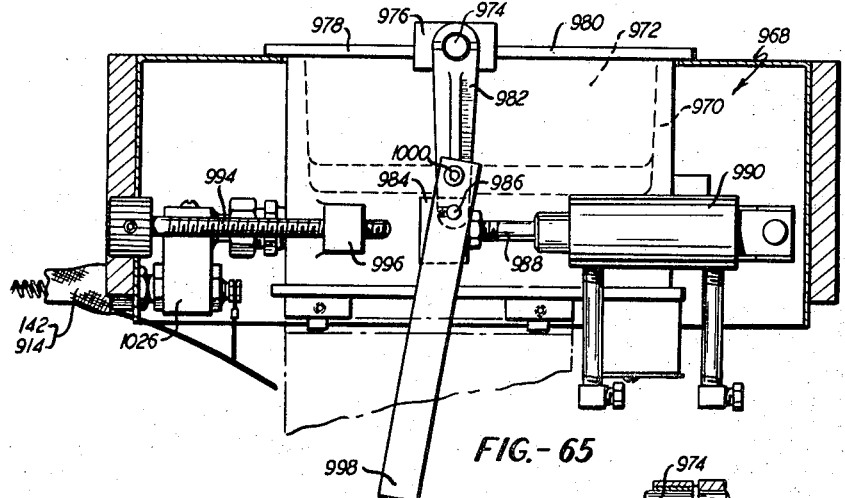
FIGURE 65 is a view taken on the line 65—65 of FIGURE 63.
Figure 66:
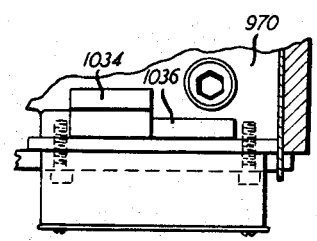
FIGURE 66 is a view taken on the line 66—66 of FIGURE 63.
Figure 67:
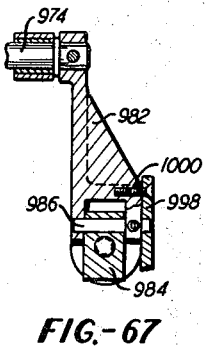
FIGURE 67 is a view taken on the line 67—67 of FIGURE 63.

As shown in FIGURE 56, the slide plate 534 has extending therethrough a pair of curved side slots 544 and a curved front slot 546, the center of curvature of all of the slots coinciding at a single point indicated by the number 548 that is located rearwardly of the slide plate. A guide roll 550 is received in each slot 544 (FIGURES 52, 53 and 56). The rolls 550 depend from lugs 552 and 553, the lugs being located immediately above the slide plate 534. Each lug 552 and 553 has an inwardly extending pin 554 mounted therein. The rear end of an adjustment plate 556 extends between and is pivoted on the pins 554. A guide roll 558 (FIGURE 46) is received in the slot 546. The lower portion of the roll 558, below the slide plate 534, is formed into a knob 560. A bolt 562, that is threaded into the roll 558, has a cap 564 at its upper end. A pin 566 is secured to the cap 564 and extends laterally thereof. The ends of the pin 566 are slidably received in elongated slots 568 in the front of the adjustment plate 556. The cap 564 is received within a cut-out 570 in the adjustment plate 556 with the sides of the cap bearing against walls of the cut-out so that the cap and the bolt 562 cannot rotate about the axis of the bolt. Therefore, rotation of the knob 560 will cause the bolt 562 and the cap 564 to move vertically and through the pin and slot connection 566, 568 cause the adjustment plate 556 to swing about the axes of the pins 554.

The primary or slide plate 534 and the adjustment plate 556 comprises a slide arrangement or primary arrangement.

Figure 47:
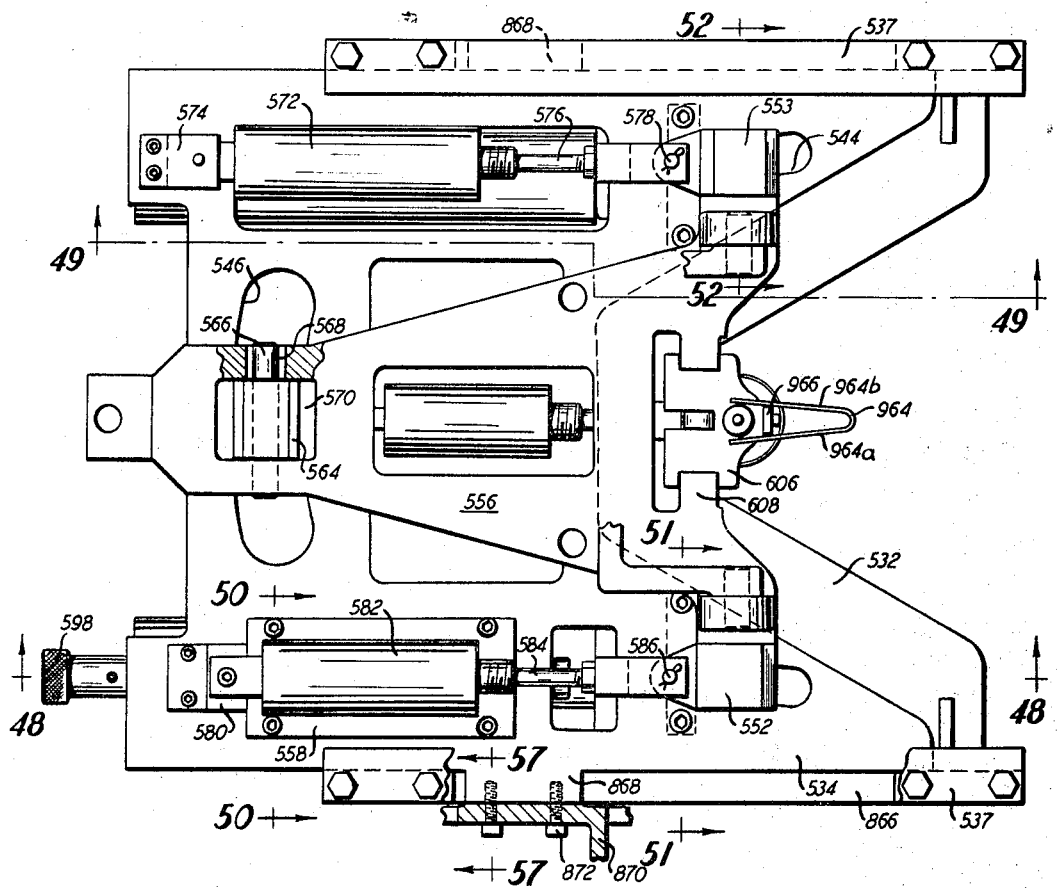
FIGURE 47 is a view taken on the line 47—47 of FIGURE 46.
Figure 48:
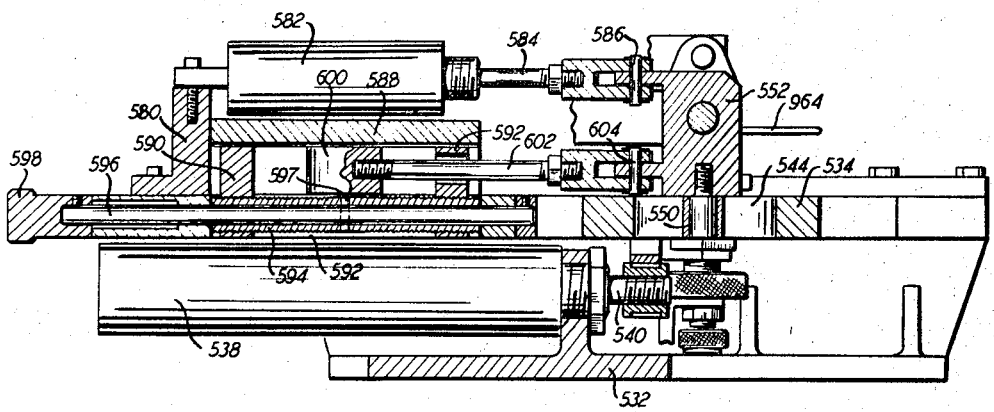
FIGURE 48 is a view taken on the line 48—48 of FIGURE 47.

As shown in FIGURES 47 and 49, an air actuated motor 572 is pivoted to a clevis 574 that is bolted to the slide plate 534, the motor 572 being located forwardly of the lug 553. The piston rod 576 of the motor 572 is pivoted to the lug 553 by way of a pivot pin 578. A bracket 580 (FIGURES 47 and 48) is bolted to slide plate 534 forwardly of the lug 552. An air actuated motor 582 is pivoted to the bracket 580. The piston rod 584 of the motor 582 is pivoted to the lug 552 by way of a pivot pin 586. A housing 588 is bolted to the slide plate 534 rearwardly of the bracket 580 (FIGURES 47, 48 and 50). The interior of the housing is hollow and receives a rear stop element 590 and a front stop element 592. The stop elements are slidably mounted in the housing for forward and rearward movement and have lower portions that extend into a track 592 formed in the slide plate 534. A screw 594 is received in the track 592 and is nonrotatably mounted on a shaft 596 by a pin 597. The shaft 596 is rotatably mounted in the slide plate 534 and has a knob 598 at its front end. The screw 594 has left and right threads thereon, one of the threads being screwed into the stop element 590 and the other of the threads being screwed into the stop element 592, whereby the stop elements may be simultaneously moved towards or away from each other by rotating the knob 598. A plunger 600 is slidably received in the housing 588 between the stop elements 590 and 592. The plunger 600 has a rod 602 secured thereto that extends rearwardly through an opening in the stop element 592. The rod 602 is pivotally connected to the lug 552 by a pivot pin 604.

Referring to FIGURES 32, 45–47 and 53, a heel rest housing 606 is slidably mounting for heightwise movement in gibs 608 formed at the rear of the adjustment plate 556. A heel rest 610 is slidably mounted in the housing 606 for heightwise movement and is prevented from rotating within the housing by a screw 612 that is threaded into the housing and extends into a heightwise extending slot 614 in the heel rest. A screw 616 is threaded into the housing 606 and bears against a shoulder 618 formed on the heel rest 610. A knob 620 is formed at the bottom of the screw 616 whereby rotation of this knob will effect the raising and lowering of the heel rest 610 and the parts carried by the heel rest. A U-shaped beam 622 is secured to the bottom of the heel rest 610 by way of a nut 623 that is threaded onto the heel rest and clamps the upper flange of the beam 622 against the knob 620. A height sensing pin 624 is slidably mounted in the heel rest 610 for heightwise movement. A pin 626, secured to and extending radially of the sensing pin 624, is slidable in a slot 628 formed in the heel rest 610 to enable the sensing pin to have limited non-rotatable movement in the heel rest. A valve 630 is secured to the lower flange of the beam 622 and has valve stem 632 extending upwardly thereof. A compression spring 634 is entwined about the valve stem 632 and bears against a knob 636 that is secured to the bottom of the sensing pin 624. A nut 638 is threaded onto the sensing pin 624 below the nut 623 and is adapted to bear against the nut 623 to limit the extent that the sensing pin is raised in the heel rest 610 under the influence of the spring 634. By adjusting the position of the nut 638 on the sensing pin 624, the heightwise position to which the sensing pin is raised by the spring 634 may be changed.

Figure 46:
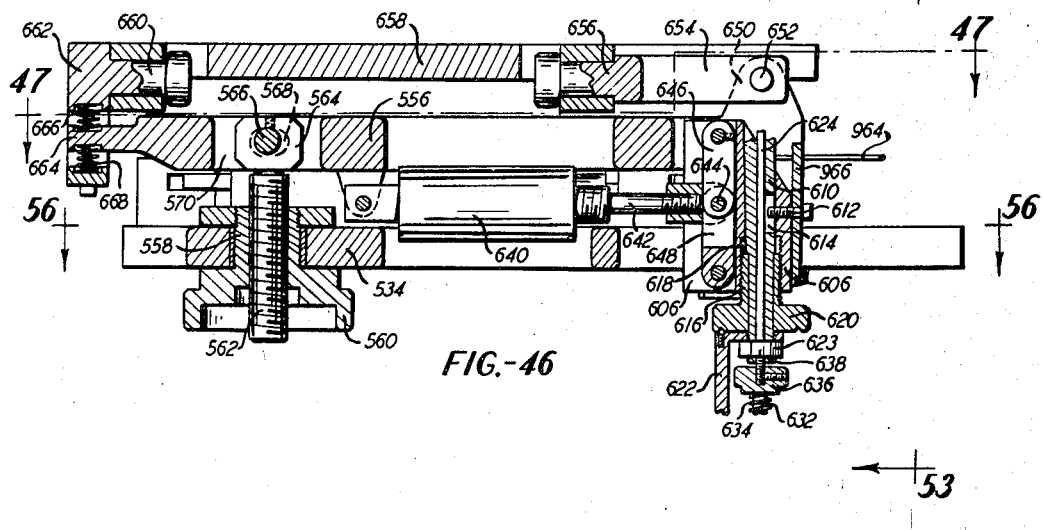
FIGURE 46 is a view taken on the line 46—46 of FIGURE 45.
Figure 55:
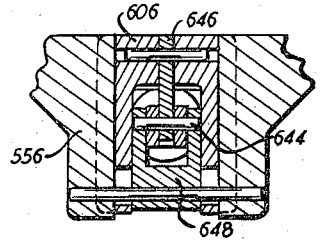
FIGURE 55 is a view taken on the line 55—55 of FIGURE 45.

Referring to FIGURES 46 and 55, an air actuated motor 640 is pivoted to the adjustment plate 556. The piston rod 642 of the motor 640 is pivotally connected by way of a pin 644 to the bottom of a toggle link 646 and the top of a toggle link 648. The top of the toggle link 646 is pivoted to the heel rest housing 606 and the bottom of the toggle link 648 is pivoted to the adjustment plate 556. Thus, actuation of the motor 640 acts to raise and lower the heel rest 610 and the sensing pin 624 with respect to the adjustment plate 556.

Referring to FIGURES 45, 46, 53 and 54, a pair of upstanding lugs 650 are formed on the adjustment plate 556 above the pins 554, and a pin 652 extends inwardly of each lug 650. A brace 654 is pivoted on and extends between the pins 652. A pin 656 extends forwardly from the center of the brace 654 and the rear of a backup plate 658 is pivoted on the pin 656. The front of the back-up plate 658 is pivoted on a pin 660 that extends rearwardly from a strap 662. A nose 664 on the front of the adjustment plate 556 extends into an opening in the strap 662. A compression spring 666 extends between the nose 664 and the top of the strap 662 and a compression spring 668 extends between the nose 664 and the bottom of the strap 662. A pair of compression springs 670 are interposed between the adjustment plate 556 and the back-up plate 658 on opposite sides of the pin 656. Thus the back-up plate is floatingly mounted by virtue of the springs 666, 668 and 670. Due to the back-up plate 658 being mounted for movement about the transverse axes of the pins 652 and the longitudinal axes of the pins 656 and 660, it may have universal movement on this floating mounting.

The adjustment plate 556 and the back-up plate 658 comprise a back-up arrangement.

Figures 43, 44:
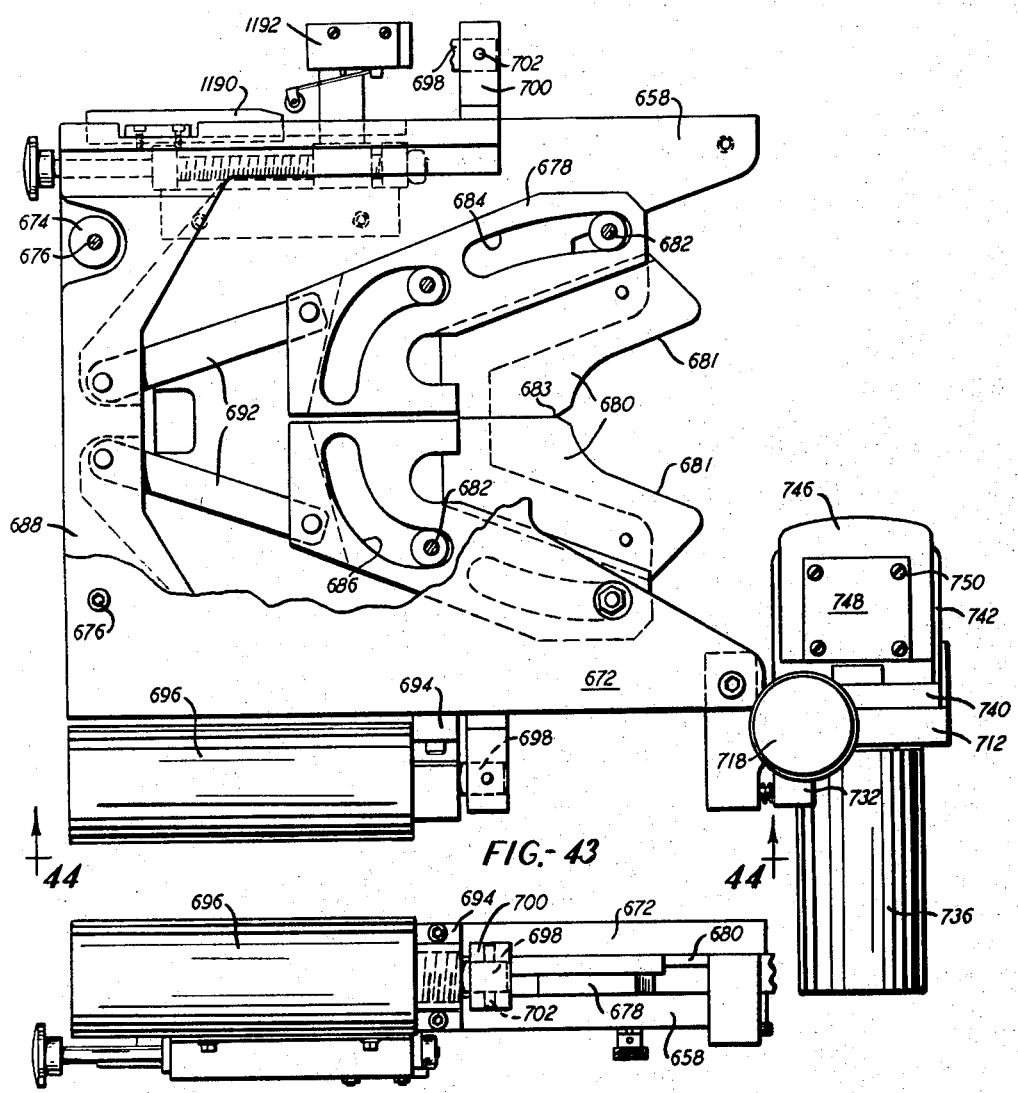
FIGURE 43 is a view taken on the line 43—43 of FIGURE 35.
FIGURE 44 is a view taken on the line 44—44 of FIGURE 43.

Referring to FIGURES 32, 43 and 44 a cover plate 672 is located spacedly above and is bolted to the back-up plate 658 by means that include the blocks 674 and the bolts 676 shown in FIGURE 43. A pair of symmetrically disposed heel wiper cams 678 are slidably mounted between the back-up plate 658 and the cover plate 672 and heel wipers 680 having rearwardly divergent surfaces 681 that diverge rearwardly from a vertex 683 are attached to the cams 678. Pins 682, dependent from the cover plate 672, extend into slots or cam tracks 684 and 686 formed in the wiper cams 678. A cam slide 688 is located forwardly of the wiper cams 678 between the back-up plate 658 and the cover plate 672 and is slidably guided for rearward and forward movement on gibs 690 (FIGURE 35) that depend from the cover plate 672. A pair of links 692 are pivoted to and diverge rearwardly from the cam slide 688 with the rear ends of these links each being pivoted to a wiper cam 678. A bracket 694 straddles and is bolted to the back-up plate 678 and cover plate 672 on each side of the machine. An air actuated motor 696 is secured to each bracket 694, and the piston rod 698 of each motor 696 is pivotally connected to a lug 700 that extends outwardly of the cam slide 688 by a pivot pin 702. The motors 696 can thus effect the movement of the cam side 688 on the gibs 690.

Referring to FIGURES 36, 38 and 40–42, a bracket 704 is rigidly clamped on each side of the machine between the rear portions of the back-up plate 658 and the cover plate 672 by a bolt 706. An upright pin 708 extends through each bracket 704 and is rigidly secured thereto by a set screw 710. A mount 712 is slidably and rotatably mounted on each pin 708 by way of an upper flange 714 and a lower flange 716 that encompasses the pin 708. Each flange 714 bears against a stop nut 718 that is screwed onto the top of each pin 708. Each flange 714 is yieldably urged upwardly against a nut 718 by a compression spring 720 that is interposed between a flange 716 and a nut 722 threaded onto the bottom of each pin 708. A tension spring 724 extends between a pin 726 on each bracket 704 and a pin 728 located on each mount 712 outwardly of its associated pin 708 to thereby yieldably swing the mounts about the pins 708 in such a direction that the inner portions of the mounts are urged rearwardly. A set screw 730, threaded into each bracket 704, serves as an adjustable stop against which lugs 732 on the mounts 712 bear to thereby limit the extent that the mounts 712 are swung about the pins 708 by the springs 724.

Each mount 712 has an inwardly directed circular opening that rotatably receives a wiper support 734. An air actuated motor 736 is secured to each wiper support 734 by a nose 738, each motor being threaded onto a wiper support 734. With this arrangement, each mount 712 is interposed between a flange 740 of a wiper support 734 and the cylinder of a motor 736. A wiper base 742 is threaded onto the piston rod 744 of each motor 736 to extend inwardly of the motor, each wiper base 742 resting on a wiper support 734 so that it may slide on the wiper support. A shank wiper 746, made of a flexible resilient material such as rubber, is supported on each wiper base 742, and a cover plate 748 is supported on each shank wiper 746. Screws 750 serve to secure each assemblage of wiper base 742, wiper 746 and cover plate 748. A pair of compression springs 752 are interposed between each mount 712 and its associated wiper support 734 on opposite sides of the longitudinal center lines of the wipers 746 and motors 736. The shank wipers 746 are located between the heel wipers 680 and the ball wipers 500.

The heel section 14 includes a heel clamping mechanism that has many features in common with the heel clamping mechanism disclosed in pending application Ser. No. 478,185, filed Aug. 9, 1965.

Referring to FIGURES 32 and 36–39, a bracket 754 is bolted to the cover plate 672. A bolt 756 is threaded into the bracket 754. Rearwardly of the bracket 754, the bolt 756 is rotatably mounted in a heel clamp plate 758 with a pair of rings 759 preventing axial movement of the bolt in the clamp plate. The clamp plate 758 and the below described heel clamping mechanism carried thereby may be adjusted forwardly and rearwardly in gibs 760 in the cover plate 672 by manipulation of the bolt 756. Bolted to the front of the clamp plate 758 is a transversely extending bracket 762. An air actuated motor 764 is pivoted to each end of the bracket 762 on pins 766. A pair of arms 768 are pivotally mounted to pins 770 which are secured to the rear end of the clamp plate 758. A shoulder 772 is provided on the clamp plate 758 forwardly of the pins 770 to limit the extent that the arms 768 may pivot in a forward direction. When at rest, the arms 768 are maintained in abutment with the shoulder 772 by means of tension springs 774 which at one end are connected to the bracket 762 and at the other end are connected to clips 776, the clips 776 being rigidly fastened to the outer extremities of the arms 768 by bolts 778. A pair of sliding links 780, having longitudinal slots 782 formed at their midportions, have lateral flanges 784, the flanges 784 being pivoted to clevises 786 by pins 788 and the clevises 786 being rigidly secured to the piston rods 790 of the motors 764. The links 780 are also movably connected to the arms 768 by means of engagement of the slots 782 and the bolts 778 so that activation of the motors 764 to cause their piston rods 790 to move rearwardly will cause the links 780 to have substantially linear rearward motion, being guided by the bolts 778. During the rearward motion of the links 780, the bolts 778 and consequently the arms 768 are rigidly maintained in their forward position by means of the tension springs 774. Another link 792 is pivotally mounted to each of the arms 768 by means of pins 794 which are secured to the arms 768 at their midportions. The other end of each link 792 is pivotally mounted to the front of a link 780 by a pin 796 so that as the motors 764 impart substantially linear rearward motion to the links 780, rotary motion about the pins 794 will be simultaneously imparted to the links 792. A bolt 798 is threaded into a lug 800 of each arm 768 in such a manner that it is in registry with the plane of rotation of the links 792 so that as the links rotate in response to actuation of the motors 764 they will abut the forward ends of the bolts 798 thereby terminating the substantially rearward linear movement of the links 780 and causing the arm 768, the link 780 and the link 792 to become rigid with respect to each other. When such a rigid relationship occurs, further actuation of the motors 764 to cause further rearward motion of the piston rods 790 will cause the arms 768, the links 780 and the links 792 to rotate as rigid units about the pins 770 overcoming the tension of the springs 774, with the motors 764 swinging about the axes of the pins 766.

A heel clamp pad 806, formed from a yieldable material such as rubber, is mounted to the rearward end of the heel clamping mechanism in the manner described below. The pad 806 is a substantially U-shaped member having a bight 808 and a pair of legs 810 extending rearwardly from the bight.

Mounted to and extending rearwardly from each of the links 780 are a pair of vertically spaced plates 812 and 814 which cooperate with lugs 816 that extend from the pad legs 810 between the plates 812, 814. Secured to the outside of each of the pad legs 810 are a pair of vertically spaced studs 818. Exteriorly of each pad leg 810, there is provided an outer plate 820 and an inner plate 822. The plates 820, 822, which have their rearward ends abuttingly secured together and their forward ends horizontally spaced, have horizontal slots 824 formed at their rearward abutting ends for accommodation of the studs 818. The lugs 816 are secured to each of the outer plates 820 and the plates 820, 822 are urged rearwardly against the studs 818 by means of a spring 826 which is fastened to the studs 818 and bent around the lug 816. A band 828, formed from a relatively unyieldable material, is confined at its ends in the space formed between the forward portions of the plates 820 and 822 and is secured to the plates. The band 828 extends about the outer periphery of the clamp pad 806.

A pair of tabs 830 are inserted between the pad 806 and the band 828 on opposite sides of the pad bight 808. Each tab 830 has a shelf 832 overlying the pad 806. A lug 834 (FIGURES 32 and 37) is slidably mounted for forward and rearward movement between a pair of brackets 836 (FIGURE 39) that are attached to the rear end of the clamp plate 758. The lug 834 extends between the heel wipers 680 and a bolt 838 threaded between the brackets 836. The lug 834 has forks 840 (FIGURE 36) that extend exteriorly of the band 828. Rivets 842 secure the forks 840, band 828 and tabs 830 to each other. A shelf 844 is connected to each inner plate to extend inwardly over a pad leg 810. Thus the pad 806 is restrained against heightwise movement between the heel wipers 680 and the shelves 832, 844. The pad legs 810 are secured to the links 780 by way of pins 846 that extend through holes in the plates 812, 814 and the lugs 816.

The heel pad 806 has a hollow interior (FIGURE 32) and a fitting 848 and air line 850 provides communication between a source of compressed air and the interior of the heel pad 806.

As shown in FIGURES 32, 36, 37 and 39, a bail 852 is pivoted to the brackets 836 on pins 854 to extend upwardly of the clamping pad 806. A length sensing pin 856 is mounted in the apex of the bail to extend rearwardly thereof. A valve actuating pin 858 is secured to the bail to extend forwardly thereof. A valve 860 is mounted in a bracket 862 and the bracket 862 is secured to one of the brackets 836. These parts are so constructed that the valve stem 864 of the valve 860 is in alignment with the pin 858. Due to the inclination of the machine, as shown in FIGURE 1, the bail 856 swings forwardly in a counterclockwise direction (FIGURE 37) about the axes of the pins 854 until the pin 858 engages the valve stem 864, the valve stem being urged rearwardly under the influence of the conventional spring within the valve 860.

Referring to FIGURES 1, 32, 34, 35, 47 and 57, a cutout 866 is provided on each side of the heel head 532 to accommodate a lug 868 that projects laterally from each side of the slide plate 534, each lug 868 being slidable within a cut-out 866. A brace 870 is secured to each lug 868 by bolts 872. A pair of pins 874, secured to each brace 870, have rollers 876 mounted thereon inwardly of the braces. The rollers 876 are slidable in tracks 878 formed in the sides of the heel head 532, thereby enabling the braces 870 and the parts carried thereby to be moved rearwardly and forwardly with respect to the heel head 532 in unison with the slide plate 534. A fluid actuated motor 880, pivoted to each brace 870, has an upwardly extending piston rod 882. Each piston rod 882 is pivotally connected to the lower end of a bell crank lever 884. Each bell crank lever 882 is pivoted at its mid-portion to a brace 870. A bar 886 is rigidly connected to and straddles the upper ends of the two bell crank levers 884. A hold-down mount 888 is rigidly connected to the mid-portion of the bar 886 and extends rearwardly thereof. A heel hold-down 890 is pivotally mounted on a pin 891 in a clevis 892 that forms a part of the mount 888. Due to the inclination of the machine (see FIGURE 1), the hold-down is urged by gravity in a clockwise direction as seen in FIGURE 32 about the pin 891 and bears against a leaf spring 894 that is secured to the mount 888.

A cable 896 (FIGURE 1) is attached on each side of the machine to a hanger 898 (FIGURE 35) dependent from each brace 870. Each cable 896 extends rearwardly from a hanger 898 and then about and downwardly of a pulley 900 that is rotatably mounted on the base 16. The ends of the cables remote from the hangers 898 are each connected to a tension spring 902 that is fastened to the frame 10.

Referring to FIGURES 1 and 58–62, a U-shaped frame 906 is provided that comprises a cross-piece 908 and a pair of legs 905 extending forwardly and divergently from the ends of the cross-piece. The frame 906 is rigidly secured to the top of the housing 516 by way of bolts 907 that fasten flanges 904 at the front ends of the legs 905 to the housing. A ferrule 910 is secured in an enlarged portion 912 at the center of the cross-piece 908. A hollow, flexible conduit 914, constructed similarly to the conduit 142, is secured to the ferrule 910. An electric resistor wire 916, connected to a source of electric energy, runs through the conduit 914. A link 918 is pivoted on a hub 920 extending laterally from each of the flanges 904, each of the links 918 extending rearwardly from a hub 920. A sleeve 922 is welded to the rear of each link 918 and a transversely extending bar 924 is rotatably mounted in each sleeve 922. A forwardly directed bar extension 926 that acts as a nozzle support is formed at the inner end of each bar 924 and a nozzle 928 is rotatably mounted on each bar extension 926 for inward and outward swinging movement.

A link 930 is splined to each bar 924 by a key 932 and a link 934 is rotatably mounted on each bar 924. The links 930 and 934 which respectively constitute the front and rear segments of a linkage, are adjustably and rigidly secured to each other by way of a spring-pressed detent (not shown) in each link 934 that is insertable into a selected one of a plurality of holes 936 formed in each link 930. Thus the bars 924, bar extensions 926, links 930 and links 934 are mounted for movement in unison. A spring-return air activated motor 938 is mounted in the upper end of each link 930. The inwardly directed piston rod 940 of each motor 938 is in alignment with a nozzle 928. A pair of tension springs 942, extending between each link 930 and each nozzle 928 serve to resiliently urge the nozzles against the piston rods about the axes of the bar extensions 926. The lower, rear end of each link 934 is pivoted on a pin 944. A pair of clevises 946 and 948 are also pivoted on each pin 944. The clevises 946 extend forwardly of the pins 944 and are each secured to the piston rod 950 of an air actuated motor 952. Each motor 952 is pivoted to a hanger 954 that is secured to and depends from a link 918. The clevises 948 extend downwardly of the pins 944 and are each secured to the piston rod 956 of an air actuated motor 958. Each motor 958 is pivoted to the housing 516. A conduit arrangement 960 extends through the frame 906 and the links 918, bars 924, bar extensions 926 and nozzles 928 to provide communication between the conduit 914 and the nozzles 928.

As shown in FIGURES 4, 5 and 58, a wire 962 is bolted to and extends forwardly of each front prong 94, the wire 962 constituting a back nozzle rest formed of spaced back rest elements 962a and 962b.

Figure 45:
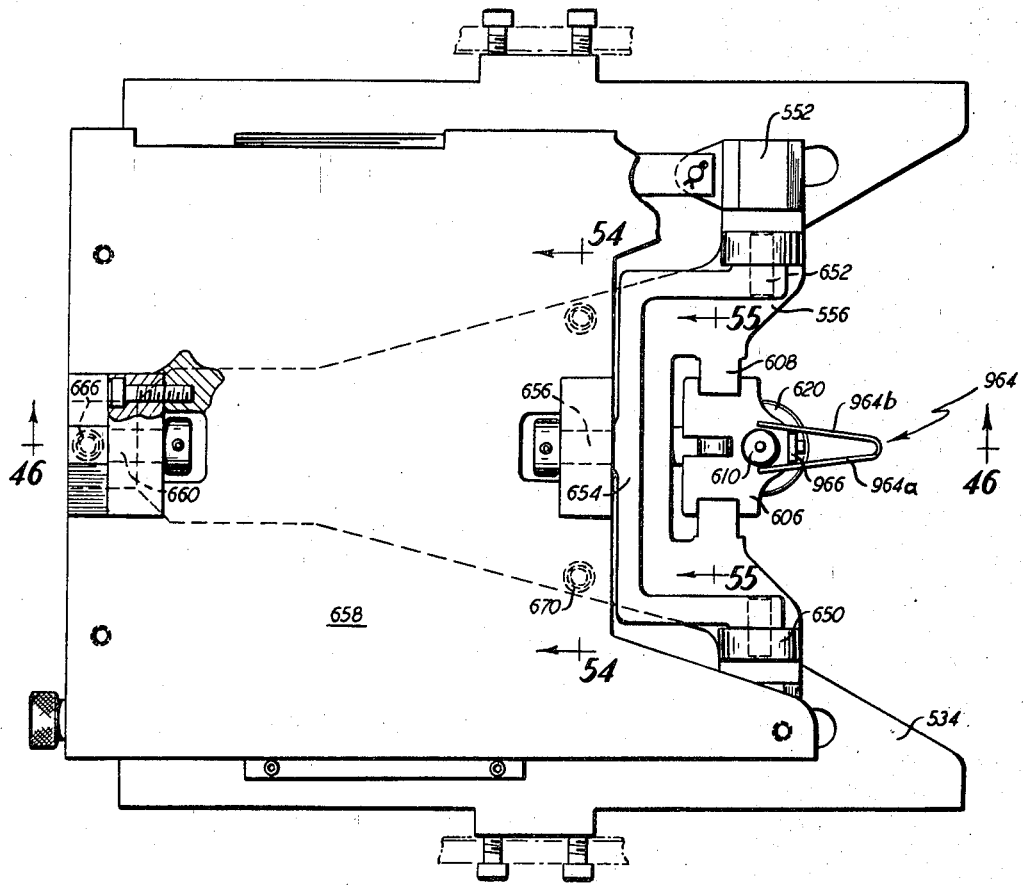
FIGURE 45 is a view taken on the line 45—45 of FIGURE 32.

As shown in FIGURES 45 and 46, a U-shaped wire 964, which constitutes a front nozzle rest formed of spaced front rest elements 964a and 964b, is soldered to a plate 966 that is bolted to the rear of the housing 606 by the screw 612. The wire 694 extends rearwardly of the plate 966.

A cement pot 968 is secured to each side of the machine frame, one of these cement pots being shown in FIGURE 1 and the other cement pot not being shown. One of the cement pots is adapted to supply molten thermoplastic cement to the extruding section 116 of the applicator-support 112 and the other of the cement pots is adapted to supply molten thermoplastic cement to the nozzles 928.

The cement pots 968 are constructed similarly to the cement pot disclosed in the aforementioned application Ser. No. 472,525, filed July 16, 1965. Referring to FIGURES 63–67, each cement pot includes upstanding walls 970 that bound a well 972. A shaft 974, extending transversely over the well, is rotatably mounted in a pair of hangers 976 that are secured to the walls 970. A pair of cover plates 978 and 980 are pivotally mounted on the shaft 974 to overlie the well 972. A lever 982, secured to the shaft 974 to extend downwardly of the exterior of the cement pot, is pivoted to a block 984 by a pin 986. The block 984 is secured to the piston rod 988 of an air actuated motor 990 and the motor 990 is pivoted to a flange 992 that is secured to the cement pot 968. A stop stud 994, that is threaded into a lug 996 of the cement pot, is in alignment with the block 984. A handle 998, that is mounted on the pin 986 and is secured to the lever 982 by a screw 1000, extends downwardly of the block 984. A lever 1002 is pinned to the shaft 974 and extends downwardly thereof into the well 972 through a slot 1004 in the floor of the well. A prong 1006 at the bottom of the lever 1002 extends into a clevis 1008 formed in a plunger 1010 and the plunger is slidably mounted in a bore 1012 located in the cement pot below the well 972. A ferrule 1014 is threaded into a hole in the floor of the well forwardly of the lever 1002. The ferrule has radial passages 1016 that intersect a centrally located small diameter passage 1018. The passage 1018 opens into a large diameter passage 1020, the passage 1020 intersecting the bore 1012. A ball 1022, resting on a pin 1024 extending across the passage 1020, is cooperative with the passage 1018 to act as a valve in the manner described below. An adapter 1026 is threaded into the cement pot at the forward end of the bore 1012. A passage 1028 extending through the adapter is normally blocked by a spring pressed ball valve 1030. A coupling 1032 is secured to the adapter 1028. Electric heating elements 1034 and 1036 (FIGURE 66) are secured to the cement pot 968 and are controlled by a thermostat 1038 (FIGURE 63) that extends beneath the well 972.

The end of the conduit 142 remote from the applicator-support 112 is secured to the coupling 1032 of one of the cement pots 968 and the end of the conduit 914 remote from the nozzles 928 is secured to the coupling 1032 of the other of the cement pots 968.

In the idle condition of the machine: the motor 20 and the insole rests 56, 62 carried thereby are in a raised condition with the lug 32 bearing against the stud 34; the motor 80 is in the FIGURE 5 position so that the applicator-support 112 is in an upper position urged to a level slightly higher than the level of the insole rests 56, 62 by the springs 98; the front pincers 176 are open with the jaw 282 in its uppermost position due to the projection of the piston rod 168 upwardly of the motor 164 and the retraction of the piston rods 182 into the motors 180; pressurized air is entering the cylinder 194 through a line 1040 (FIGURE 6) to raise the piston rod 198 and the front retarder 210 with respect to the housing 150 against the resistance of the spring 204; the side retarders 234 are held in a raised position by pressurized air entering the motors 226 through the lines 228 under relatively low pressure; the motors 298 are held in an outward position against the cams 306 by the springs 310 and are held by gravity in a forward position with the set screws 302 bearing against the stop plates 270 due to the inclination from the vertical of the motors 298 (FIGURE 1); the piston rods 316 of the motors 298 are in an elevated position and the motors 318 are in a lowered position with respect to the piston rods 316 so that the side pincers 324 are in a raised position with their jaws open; the piston rods 350 are retracted into the motors 352 so that the toe hold-down 356 is in a raised position; the piston rods 366 are projected outwardly of the motors 364 so that the head 358 and the parts carried thereby are in a raised position; the piston rod 376 is projected outwardly of the motor 372 so that the slide plate 368 and the parts carried thereby are in a rearward out-of-the-way position; the piston rod 386 is retracted into the motor 382 so that the toe wipers 414 are in their rearward open position; the spring 442 yieldably urges the bight 482 of the yoke 426 forwardly with the nut 436 bearing against the rear bracket leg 430; the yoke legs 484 are yieldably urged inwardly with respect to the bars 460 under the influence of the springs 478; the cylinders 456 of the motors 452 bear against the outer flanges 448 with no pressurized air entering the motors 452, this maintaining the bumpers 466 outward of the inner peripheral wall of the yoke 426; the piston rods 508 are retracted into the motors 504 to maintain the ball wipers 500 in outer positions with respect to the toe wipers 414; the piston rod 528 is retracted into the motor 518 to maintain the heel head 532 and the parts carried thereby in a lowered position; the piston rods 540 are retracted into the motors 538 so that the slide plate 534 and the parts carried thereby are in a forward position; the piston rod 642 is projected outwardly of the motor 640 so that the heel rest 610 and the sensing pin 624 are in an upper position with respect to the adjustment plate 556; the piston rods 698 are retracted into the motors 696 so that the cam slide 688 is in a forward position with respect to the back-up plate 658 and cover plate 672 and the heel wipers 680 are retracted into their forward, open position; the piston rods 744 are retracted into the motors 736 so that the shank wipers 746 are in their outer positions; the piston rods 790 are retracted into the motors 764 to maintain the heel clamp pad legs 810 in their most open position; there is no air entering the heel clamping pad 806 through the air line 850 so that the pad 806 is in a deflated condition; the piston rods 882 are retracted into the motors 880 so that the heel hold-down 890 is in an elevated position; and the piston rods 940 are projected outwardly of the motors 938, the piston rods 950 are retracted into the motors 952 and the piston rods 956 are retracted into the motors 958, whereby the nozzles 928 are in a lowered, rearward position and are resiliently urged against the spaced rest elements 962a and 962b of the back nozzle rest 962 by the piston rods 940 as indicated in FIGURE 58.

Before starting the machine, solid thermoplastic cement is placed in the wells 972 of the two cement pots 968 wherein the cement melts and flows through the passages 1016, 1018 and 1020 into the bores 1012 between the plungers 1010 and the adapters 1026 and into the passages 1028 up to the ball valves 1030. The handles 998 are then manually oscillated to move the plungers 1010 forth and back from the FIGURE 64 position to a forward position determined by the settings of the studs 994. This causes the molten cement in one of the cement pots 968 to be forced through conduit means that comprises the passage 1028, the conduit 142, the passage 138 (FIGURE 5), the holes 132 and 134, the channels 130 (FIGURE 8) and the holes 128 (FIGURE 6) until the molten cement appears at the tops of the holes 128. The cement is kept molten in the conduit means between the cement pot 968 and the holes 128 by suitably located heating devices that include the resistor wire 148 and the heating element 146. The oscillation of the handle 998 for the other of the cement pots 968 causes the molten cement in that pot to be forced through the passage 1028 for that pot, the conduit 914 and the conduit arrangement 960 until the cement arrives at the tops of the nozzles 928. The cement is kept molten between the nozzles 928 and the cement pot 968 associated with the nozzles by suitably located heating devices that include the resistor wire 916, heating elements 1042 in the frame 906 (FIGURE 60), heating elements 1044 in the links 918 (FIGURE 59) and heating elements 1046 in the nozzles 928 (FIGURE 62).

Figure 68:
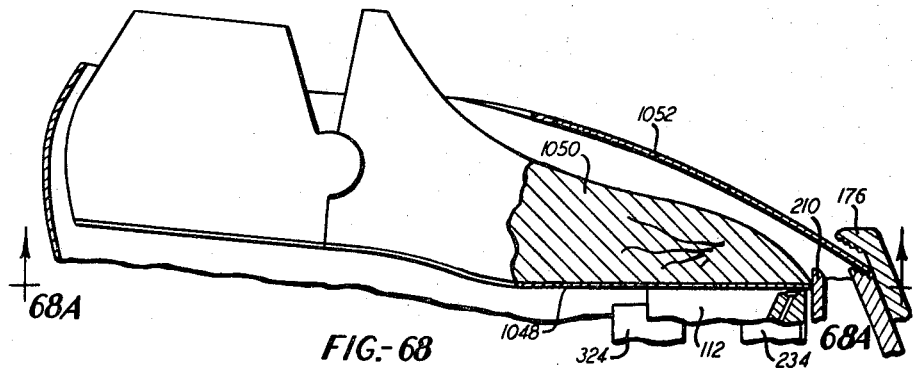
FIGURE 68 is a representation of the shoe assembly as it appears when placed in the machine at the beginning of the machine cycle.
Figure 68A:
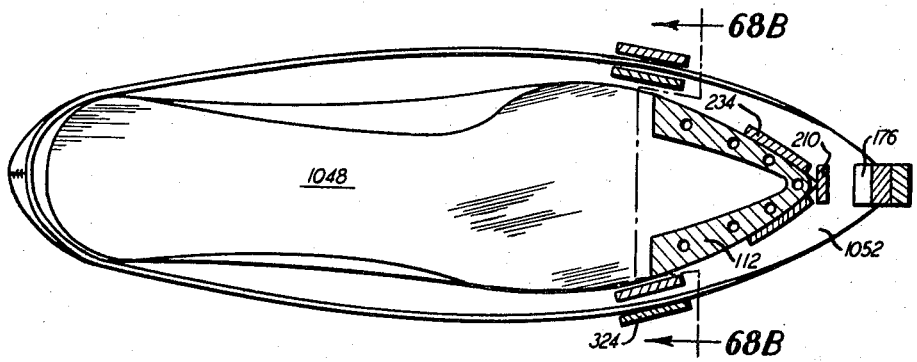
FIGURE 68A is a view taken on the line 68A—68A of FIGURE 68.
Figure 68B:
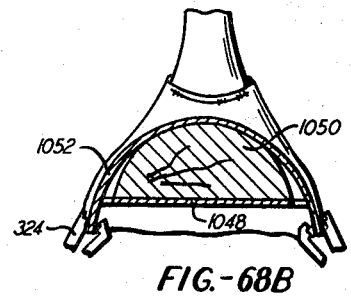
FIGURE 68B is a view taken on the line 68B—68B of FIGURE 68A.

Referring to FIGURES 68, 68A and 68B, a shoe assembly is presented bottom-down to the machine. The shoe assembly comprises a shoe insole 1048 located on the bottom of a last 1050, preferably by being tacked thereto, and a shoe upper 1052 draped loosely over the last. The insole is brought to bear against the top of the applicator-support 112, which at this time is resiliently urged above the level of the insole rests 56, 62 by the springs 98 so that the applicator-support 112 bears against and supports the margin of the toe portion of the insole. The outer periphery of the toe portion of the last is caused to bear against the front retarder 210 and the side retarders 234 so that the retarders act as gauges to accurately locate the shoe assembly in the machine. The toe end of the upper margin is inserted between the open jaws of the front pincers 176 and the forepart portions of the upper margin are inserted between the open jaws of the side pincers 324. The upper is so draped about the last that its margin can extend below the last an amount that corresponds to the width of the lasting margin to be wiped against the insole.

The operator now actuates the control system of the machine by stepping on a platform 1054 (FIGURE 1). The control system causes the motors 180 to be actuated to raise the piston rods 182 and cause the jaws of the pincers 176 to close on the toe end portion of the upper margin. This is followed by an actuation of the motors 318 to raise the cams 342 to lower the jaws 328 and raise the jaws 330 and thereby cause the side pincers 324 to grip the forepart portions of the upper margin.

After this the motors 164 and 298 are actuated to respectively lower the piston rods 168 and 316. The actuation of the motor 164 causes the front pincers 176 to move downwardly and rearwardly away from the last to thereby stretch the toe position of the upper about the last and the actuation of the motors 298 causes the side pincers 324 to stretch the forepart portions of the upper about the last. The machine now comes to a stop with the shoe assembly engaging parts in the position shown in FIGURES 69, 69A and 69B.

Referring to FIGURES 69, 69A and 69B, the aforesaid downward and rearward movement of the front pincers 176 causes the upper 1052 to be pulled and stretched downwardly about the toe end of the last and also in a heel to toe direction with the upper dragging about the front retarder blade 210, the angle of the plane of movement of the front pincers 176 and the initial horizontal distance between the front pincers and the front retarder being determined by the setting of the cam 158. The downward movement of the side pincers 324 causes the forepart of the upper to be stretched tightly about the last 1050 with the upper dragging about the side retarders 234. The universal joints 296 enable the motors 298 and the side pincers 324 carried thereby to swing rearwardly towards the toe of the shoe assembly and inwardly of the shoe assembly during the downward movement of the side pincers. Due to the inclination of the motors 298 from the vertical as shown in FIGURE 1, these motors and the side pincers are normally tilted from the vertical to a position where the set screws 302 engage the stop plates 270, and the set screws ride off the stop plates during the toeward movement of the motors 298 and side pincers 324. These toeward and inward movements are occasioned by the direction of pull of the front pincers 176, and the mounting of the side pincers 324 that permits their toeward and inward movements and prevents the side pincers from fighting against the front pincers during their upper stretching movements. The result of the aforesaid pincers movements is a tight stretching of the upper about the toe and forepart of the last with the topline 1056 (FIGURE 69) of the upper stretched tightly on the last, the heel portion of the upper stretched tightly about the heel end of the last and the shank portions of the upper extending tautly between the heel portion and the forepart portions. During the movement of the pincers 176 and 324, the toe end portion of the upper 1052 is forced about the front retarder 210 (FIGURE 69) and forces the front retarder down to some extent against the yieldable force provided by the pressurized air in the cylinder 194, and the forepart portions of the upper are forced about the side retarders 234 (FIGURE 69B) and force the side retarders down to some extent against the yieldable forces provided by the pressurized air in the motors 226. The front retarder 210, by engaging the toe end of the last, prevents rearward or toeward movement of the shoe assembly during the stretching movement of the front pincers 176, and the side pincers 234, by engaging the sides of the last, prevent lateral movement of the shoe assembly during the stretching movement of the side pincers 324. Since the front pincers 176 and the side pincers 324 are driven in their stretching movements by yieldable forces created by air under pressure, they terminate these movements when the stretching forces are equalized by the resistance to stretching of the upper. The portions of the stretched upper margin between the front and side pincers are outspread into dog ears 1058 (FIGURE 69A).

As stated above, when the shoe assembly was placed in the machine, the applicator-support 112 was resiliently urged above the level of the insole rests 56, 62 by the springs 98, thus causing the insole 1048 to be located above the insole rests. The downward pulling action of the pincers 176 and 324 causes the applicator-support to move downwardly against the forces of the springs 98 until the insole 1048 comes into engagement with the insole rests 56, 62. Due to the fact that the applicator-support is connected by the pin and slot connections 106 to the three prongs 94, 96, the applicator-support is capable of having limited universal tilting movement with respect to a horizontal plane during its downward movement, so that at the end of its downward movement it will conform to and bear snugly against the insole regardless of the fact that the insole bottom does not lie in a true horizontal plane. At the end of the downward movement of the applicator-support 112, the insole is therefore supported at the margin of its toe and forepart portions by the applicator-support and is supported interiorly of its margin by the insole rests 56, 62.

Now the motors 352 are actuated to raise the piston rods 350 and bring the toe hold-down 356 down against the top of the forepart of the shoe assembly, as indicated in phantom in FIGURE 69.

After this the motor 372 is actuated to move the slide plate 368 forwardly in the head 358 from its initial out-of-the-way position to a forward working position. The forward movement of the slide plate 368 brings the toe wipers 414, the ball wipers 500, the yoke 426 and the bumpers 466 to a position where they can act of the shoe assembly as indicated in phantom in FIGURE 69. Then the motors 364 are actuated to swing the head 358 about the axes of the pins 360 to thereby lower the toe wipers 414, the ball wipers 500, the yoke 426 and the bumpers 466 to a position wherein the wipers 414 and 500 are below the level of the bottom of the insole an amount that is approximately equal to the thickness of the margin of the upper 1052. It is desirable, up to this point in the machine cycle, to keep the wipers 414 and 500, the yoke 426 and the bumpers 466 in an out-of-the-way position so as not to interfere with the placement of the shoe assembly in the machine and the operation of the above described pulling over operation involving the stretching of the upper about the toe portion of the last and so that the operator will be able to see if the pulling over operation is being properly performed.

The shoe assembly was initially so placed on the applicator-support 112 that when the yoke 426 was moved to its forward working position the edges of the last 1050 overlapped the inner wall 1060 of the yoke 426 as indicated in FIGURE 70. When the yoke is forced downwardly by the motors 364, the yoke wall 1060 is initially compressed. When the wall can no longer be compressed, the bight 482 of the yoke flexes rearwardly against the pressure exerted by the spring 442 and the yoke legs 484 flex outwardly against the pressures exerted by the springs 486. After this, the support arms 490 and the spring arms 496 swing outwardly about the pins 498 and move the pins 474 outwardly in the slots 472 against the yieldable forces exerted by the springs 478 with the brackets 476 moving away from the mounts 468. The yieldable pressures exerted by the springs 442, 478 and 486 and the spring arms 496 cause the yoke 426 to snugly engage the upper 1052 and cause the upper to snugly conform to the shape of the last 1050 during the descent of the yoke 426. The bearing of the hold-down 356 against the top of the forepart of the shoe assembly during the descent of the yoke 426 prevents the shoe assembly from shifting with respect to the applicator-support 112 and the insole rests 56, 62 at this time.

The parts are so constructed that when the toe wipers 414 are lowered in response to the actuation of the motors 364, they cause the side retarders 234 to press the dog ears 1058 against the bottoms of the toe wipers 414 with the relatively light resilient force afforded by the motors 226. The lowering of the toe wipers 414 also causes the front retarder 210 to press the portion of the upper stretched by the front pincers 176 against the bottoms of the wipers 414 immediately to the rear of the vertex 418 of the wipers under the force exerted by the pressurized air in the cylinder 194. During the final increment of the lowering movement of the toe wipers 414, after the retarders 210 and 234 have pressed the upper margin against the toe wiper bottoms, the upper is further stretched about the last, and when the upper can no longer be stretched the pressed margin portions slip between the toe wiper bottoms and the retarders.

As shown in FIGURE 1, a rod 1062 is swivelled to the head 358 to partake of the downward movement of the head. At or near the end of the descent of the head 358 and at or near the time that the front retarder 210 has forced the upper margin against the bottoms of the toe wipers 414, a cam 1064 at the bottom of the rod 1062 actuates a pair of valves (not shown). The actuation of the valves causes actuation of the motors 180 to open the front pincers 176 to release the toe end portion of the upper margin and the pincers 176 can now be moved downwardly and rearwardly to their lowermost position by the motor 164. This arrangement enables the front pincers 176 to be lowered before it can interfere with the toe wipers 414 and enables the front retarder 210 to engage the upper margin without losing any of the stretch in the upper that had been provided by the front pincers 176.

At about the time of the completion of the descent of the head 358, pressurized air is caused to enter the motors 452 to move the cylinders 456 inwardly of the pistons 450 against the pressures of the springs 464 and 478 to thereby force the inner wall 1060 of the yoke 426 against the toe and forepart of the shoe assembly under higher pressure than had heretofore been exerted by the springs 478 and to force the bumpers 466 inwardly against the foreparts of the upper in regions that are rearward of the yoke 426. The bumpers, in engaging the upper, can swing about the pins 470 to accommodate themselves to the curvature of the last. In addition, at about the time of the completion of the descent of the head 358, pressurized air enters the motors 226 through the lines 228 under higher pressure than had heretofore entered these motors to cause these motors to force the side retarders 234 upwardly under relatively high pressure and thereby press the dog ears 1058 of the upper 1052 against the bottoms of the toe wipers 414 under relatively high pressure.

Now the pressurized air in the motors 318 is vented to atmosphere thereby enabling the springs 1066 (FIGURE 23) of these motors to lower the piston rods 342 so that the jaws of the side pincers 324 may open under the influence of the elastic bands 334 and thus release the forepart portions of the upper margin that had been gripped by the pincers 324. After the pincers 324 release the upper margin they are lowered by further downward movement of the piston rods 316 of the motors 298.

Figure 71B:
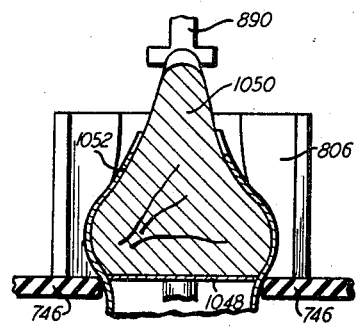
FIGURE 71B is a view taken on the line 71B—71B of FIGURE 71.
Figure 71A:
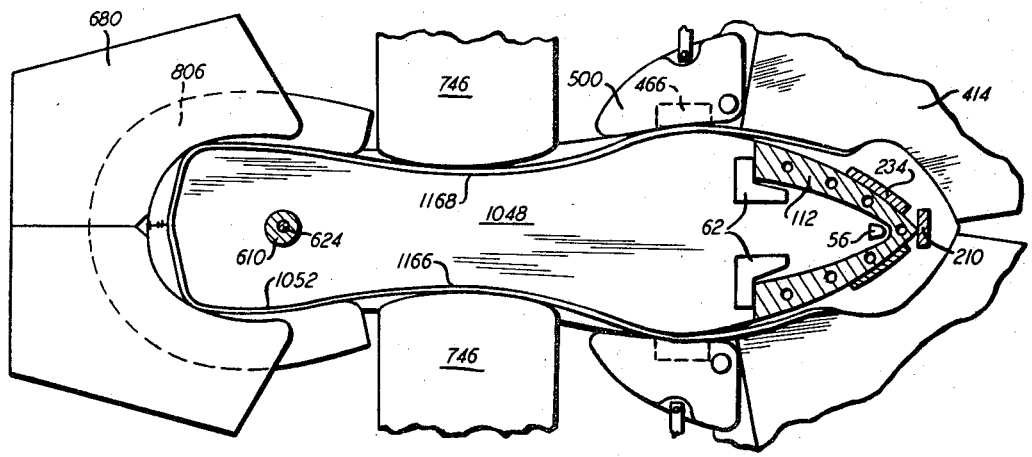
FIGURE 71A is a view taken on the line 71A—71A of FIGURE 71.
Figure 71:
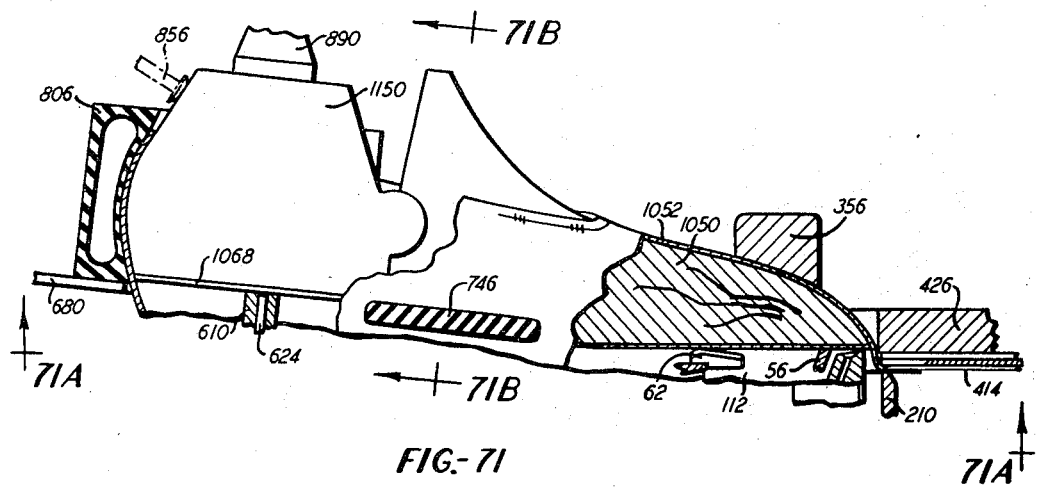
FIGURE 71 is a representation of the shoe assembly as it appears in the machine immediately prior to an application of cement to the insole.

At this time the shoe assembly engaging parts for the toe and forepart portions of the shoe assembly assume the position shown in FIGURES 71, 71A and 71B.

To recapitulate the events taking place at or near the end of the descent of the head 358, the front pincers 176 are caused to release the toe end of the upper margin and be moved downwardly away from the shoe assembly whereupon the toe end portion of the upper margin is pressed against the bottoms of the toe wipers 414 at or near the wiper vertex 418 by the front retarder 210, the inner wall 1060 of the yoke 426 is forced against the toe and forepart of the shoe assembly under higher pressure, the bumpers 466 are forced against the forepart of the upper rearwardly of the yoke 426 and the side retarders 344 force the dog ears 1058 of the upper against the bottoms of the toe wipers 414 under higher pressure than had heretofore been employed. Prior to the lowering of the head 358, the upper was stretched about the last to the desired extent. The upper is maintained in this stretched condition at the completion of the descent of the head 358 preparatory to the below described toe wiping operations by the pressing of the margin of the upper against the bottoms of the toe wipers 414 by the retarders 210 and 234 and by the pressing of the bumpers 466 against the foreparts of the upper. During the descent of the head 358 the pressure of the retarders against the bottoms of the toe wipers must be sufficiently light as to enable the upper margin to slip to some extent between the retarders and the wiper bottoms so that the upper will not be stretched any further. At the completion of the descent of the head 358 the side retarders 234 are pressed against the bottoms of the toe wipers with a greater force to hold the upper margin more firmly against the toe wiper bottoms for the toe wiping operation as described below. The portions of the upper margin stretched about the last by the side pincers 324 are, at the completion of the descent of the head 358, held in place by the bumpers 466. With this arrangement the pincers 176 and 324 are released from the upper margin when the toe wipers 414 are actuated as described below and the pincers will not interfere with the toe wipers, but, nevertheless, the upper is maintained in the stretched condition about the last that had been caused by the pincers 176 and 324.

In lasting the heel portion of the shoe assembly, it is desirable that the heel wipers 680 be disposed in a plane that is substantially parallel to the plane of the bottom of the heel portion 1068 (FIGURE 71) of the insole 1048 and that the heel of the shoe assembly be symmetrically disposed with respect to the center line of the heel wipers 680, the shank wipers 746 and the heel clamp pad 806.

In order to place the heel wipers 680 in the desired plane for the style and shape of shoe that is being held on the applicator-support 112 and the insole rests 56, 62 in the FIGURE 71 position, prior to the start of the machine cycle, the knob 560 was manipulated to swing the adjustment plate 556 together with the heel wipers 680, the shank wipers 746 and the heel clamp pad 806 about the axes of the pins 554 until the heel wipers were placed in the desired plane.

Figure 72:
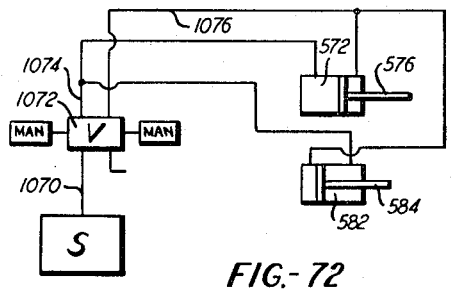
FIGURES 72 through 75 are circuit diagrams of parts of the control circuit of the machine.

FIGURE 72 illustrates the control arrangement for the motors 572 and 582. Pressurized air may enter these motors from a source S and a line 1070 through a manually actuable valve 1072. In a first position of the valve 1072 air passes therethrough and a line 1074 to the motors 572 and 582 so as to project the piston rod 576 rearwardly and outwardly of the motor 572 and to retract the piston rod 584 forwardly and inwardly into the motor 582 (see FIGURE 47). A manual shifting of the valve 1072 to a second position cause pressurized air to pass from this valve through a line 1076 to the motors 572 and 582 to project the piston rod 584 rearwardly and retract the piston rod 576 forwardly. A shifting of the valve 1072 into the first and second positions will respectively cause the adjustment plate 556 together with the heel wipers 680, the shank wipers 746 and the heel clamp pad 806 to swing clockwise and counterclockwise about the point 548 as seen in FIGURES 47 and 56 with the rolls 550 riding in the slots 544 and the roll 558 riding in the slot 546. The engagement of the plunger 600 with the stop elements 590 and 592 (see FIGURE 48) limits the extent of swinging movement of the adjustment plate 556 by the motors 572 and 582. Prior to the start of the machine cycle, the knob 598 was manipulated to move the stops 590 and 592 towards or away from each other to set the limits of swinging movement of the adjustment plate 556 in accordance with the style and shape of the shoe assembly that is to be lasted and the valve 1072 is shifted to swing the adjustment plate 556 together with the heel wipers 680, the shank wipers 746 and the heel clamp pad 806 in one direction or the other about the point 548 depending on whether a left or right shoe is to be lasted.

Figure 73:
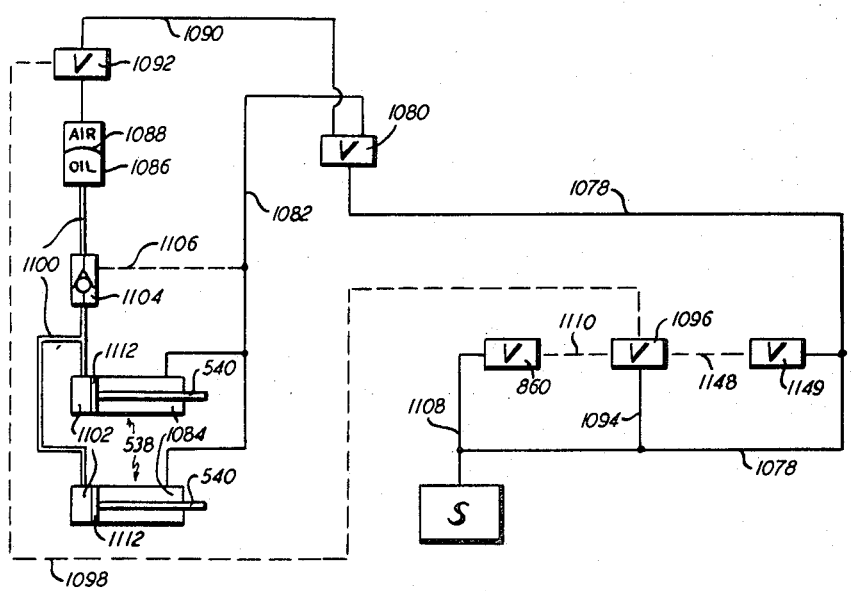

Referring to FIGURE 73, the motors 538 are initially maintained with their piston rods 540 in their retracted positions by pressurized air passing from the source S through a line 1078, a valve 1080 and a line 1082 to the rod ends 1084 of these motors. The control system includes an air-oil tank 1086 which is a conventional item that includes a compartment containing air and a compartment containing substantially incompressible oil, with the two compartments being separated by a flexible diaphragm 1088. An air line 1090 connects the valve 1080 to the air compartment of the tank 1086 with a normally closed valve 1092 interposed in the line 1090. The valve 1092 is initially maintained in an open position by air passing from the line 1078 through a line 1094, a double pilot valve 1096 and a pilot line 1098 to the valve 1092. An oil line 1100 connects the oil compartment of the tank 1086 with the head ends 1102 of the motors 538, and a pilot operated check valve 1104 is interposed in the oil line 1100 between the oil compartment of the tank 1086 and the two head ends 1102. The check valve 1104 is so constructed as to always permit flow of oil through it from the tank 1086 to the motors 538 but to preclude flow of oil through it from the motors 538 to the tank 1086 when the check valve is closed. In the idle condition of the machine the check valve 1104 is kept open by pressurized air passing to it from the line 1082 through a pilot line 1106 so that the movement of the piston rods 540 forwardly (leftwardly in FIGURE 73) by means of the pressurized air in the line 1082 will enable the oil in the head ends 1102 of the motor 538 to flow into the tank 1086 by way of the oil line 1100 and the check valve 1104.

After the completion of the aforesaid operations at the toe and forepart portions of the shoe assembly, the valve 1080 is shifted by the operator to enable the air in the rod ends 1084 of the motors 538 to be vented to atmosphere through the line 1082 and the valve 1080 and to allow pressurized air to flow from the valve 1080 through the line 1090 and the valve 1092 to the air compartment of the tank 1086. The pressurized air flowing into the tank 1086 by way of the line 1090 causes the diaphragm 1088 to flex downwardly and force oil from the tank through the lines 1100 into the head ends 1102 of the motors 538 to thereby move the piston rods 540 rearwardly. This causes rearward movement of the slide plate 534 together with the heel wipers 680, the heel clamp pad 806, the shank wipers 746, the heel rest 610 and the heel hold-down 890. At this time the heel rest moves below the bottom of the shoe assembly. This rearward movement continues until the length sensing pin 856 engages the heel portion of the shoe assembly, as indicated in phantom in FIGURE 71, and swings counterclockwise (FIGURE 37) about the axes of the pins 854 to shift the normally closed valve 860 to open position. The opening of the valve 860 enables pressurized air to pass from the source S through a line 1108, the valve 860 and a pilot line 1110 to the valve 1096 to shift the valve 1096. The shifting of the valve 1096 shuts off the flow of pressurized air through the pilot line 1098 and vents the air in this pilot line to atmosphere through the valve 1096 so that the valve 1092 will shift to its normally closed position and thus stop the flow of pressurized air from the line 1090 into the air compartment of the tank 1086 to thereby stop the flow of oil from the oil compartment of the tank 1086 into the motors 538 and thus stop the rearward movement of the slide plate 534. When the valve 1092 is closed, the pistons 1112 of the motors 538 are cushioned against forward movement by the incompressible oil in the motor head ends 1102 and in the portion of the line 1100 extending between the head ends 1102 and the valve 1104. The pistons 1112 will not continue to move rearwardly when the valve 1092 is closed because the motors 538 are inclined upwardly in their rearward directions as indicated in FIGURE 1. The parts are so constructed that when the slide plate 534 stops its rearward movement the heel wipers 680 and the heel clamp pad 806 are adjacent to, but not in engagement with, the heel portion of the shoe assembly. The springs 902, attached to the cables 896 which in turn are attached to the slide plate 534, act to apply a yieldable rearward force to the rearwardly and upwardly inclined plate 534 and thereby enable the motors 538 to more easily move the slide plate rearwardly although the force applied by the springs 902 is not sufficient to move the slide plate in the absence of oil being applied to the head ends 1102 of the motors 538 through the line 1100.

Figure 74:
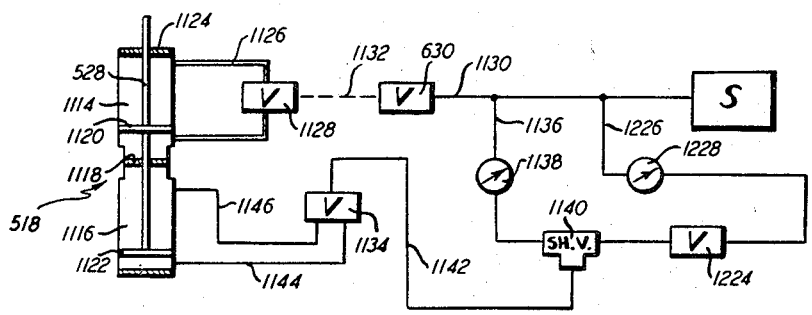

Referring to FIGURE 74, the motor 518 comprises a tandem cylinder having an oil compartment 1114 and an air compartment 1116 separated by a wall 1118. Pistons 1120 and 1122, respectively movable in the compartments 1114 and 116, are mounted on the piston rod 528 of the motor 518. The piston rod 528 is slidable in the wall 1118 and in the rod end wall 1124 at the top of the motor 518.

A conduit 1126 connects the top and bottom of the oil compartment 1114. The compartment 1114 and the conduit 1126 are filled with a substanitally incompressible oil and conventional seals are provided in the walls 1118 and 1124 around the piston rod 528 to prevent leakage of the oil from the compartment 1114.

A normally open pilot operated valve 1128 is interposed in the conduit 1126. An air line 1130 extends from the source S to the normally closed aforementioned valve 630 and a pilot line 1132 extends from the valve 630 to the valve 1128. After the slide plate 534 has completed its rearward movement, a valve 1134 is shifted to enable pressurized air to pass from the source S through the line 1130, a line 1136, a low pressure regulator 1138, a shuttle valve 1140, a line 1142, the valve 1134 and a line 1144 to the bottom of the air compartment 1116 to raise the piston rod 528. The shuttle valve 1140 is a standard commercial item that has two inlet ports and one outlet port and is so constructed that the air emanating from the outlet port has a pressure corresponding to the higher of the pressures of the air entering the inlet ports. Prior to the shifting of the valve 1134, the piston rod 528 had been maintained in its lowered position by pressurized air passing from the valve 1134 through a line 1146 to the top of the air compartment 1116. During the rise of the piston rod 528, the oil above the piston 1120 moves from the top to the botom of the oil compartment 1114 by way of the conduit 1126 and the open valve 1128. The rising piston rod 528 carries with it the heel head 532, the heel rest 610, the height sensing pin 624, the heel wipers 680, the heel clamp pad 806, the shank wipers 746 and the heel hold-down 890 until the heel rest 610 engages the heel portion of the insole 1068, as indicated in FIGURES 71 and 71A, whereupon the insole forces the height sensing pin 624 downwardly against the force of the spring 634 (FIGURE 46) to open the valve 630 (FIGURE 32). The opening of the valve 630 causes pressurized air to pass from the line 1130, the valve 630 and the pilot line 1132 to close the valve 1128. Closure of the valve 1128 blocks the conduit 1126 so that the incompressible oil above the piston 1120 in the oil compartment 1114 can no longer move from the top to the bottom of the oil compartment. Therefore, the incompressible oil above the piston 1120 prevents a further rise of the piston 528 and the parts carried thereby at a position that is determined by the engagement of the height sensing pin 624 with the insole. During the rise of the piston rod 528 there is no interference by the heel wipers 680 and the heel clamp pad 806 with the heel portion of the shoe assembly due to the heel wipers and the heel clamp pad not being in engagement with the heel portion of the shoe assembly at the completion of the rearword movement of the slide plate 543. During the rise of the piston rod 528 the length sensing pin 856 moves upwardly of the shoe assembly so that the valve 860 closes. However, this does not cause the movement of the slide plate 534 from its rearward position as the valve 1096 remains in the position to which it had been shifted by the air in the line 1110 until air enters it from its other pilot line 1148 at a subsequent time in the machine cycle by the momentary shifting of a valve 1149. The parts are so constructed that when the piston rod 528 terminates its upward movement the tops of the heel wipers 680 are approximately level with the bottom of the heel portion 1068 of the insole 1048, preferably being spaced below the insole an amount that corresponds to the thickness of the margin of the heel portion of the upper 1052.

From the foregoing it can be seen that by means of the coaction of the length sensing pin 856 and height sensing pin 624 with the shoe assembly, the heel section 14 is located in proper position for the below described heel and shank lasting operation regardless of the size and shape of the shoe assembly. At this time the heel rest 610, the heel wipers 680, and the heel clamp pad 806 assume the positions shown in FIGURES 71 and 71A with respect to the shoe assembly, with the shank wipers 746 being outward of the position shown in these figures.

Now the motors 764 are actuated to move their piston rods 790 rearwardly. This causes the links 780 to first have substantially linear rearward motion and then rotary motion about the axes of the pins 770, as described above. Due to the connections described above between the links 780 and the pad legs 810 and the slidable mounting of the lug 834 between the brackets 836, the linear movement of the links 780 causes the bight 808 of the pad 806 to move rearwardly into engagement with the heel and extremity of the shoe assembly and the legs 810 of the pad 806 engage the upper along the sides of the last to push the engaged portions of the upper rearwardly from the heel end of the shoe assembly in the direction of the toe end of the shoe assembly. During the rotary motion of the links 780 the pad legs 810 are moved inwardly to cause the pad 806 to engage the upper and press it tightly against the heel portion of the last.

After this, pressurized air is admitted through the line 850 into the hollow interior of the heel pad 806 to cause the inner peripheral wall of the pad to expand inwardly against the shoe assembly and thus augment the holding and clamping action of the upper against the last by the pad 806.

Now the motors 880 are actuated to raise the piston rods 882 and thus lower the heel hold-down 890 against the top of the cone 1150 (FIGURE 71) of the last with the hold-down 890 swinging clockwise (FIGURE 32) about the pin 891 against the force of the spring 894 until it bears squarely against the cone 1150.

Figure 75:
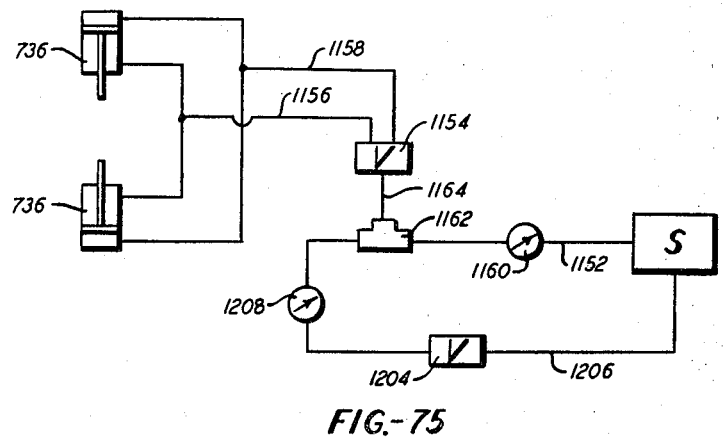

Referring to FIGURE 75, the shank wipers 746 are initially maintained in their outer positions by the motors 736 by pressurized air passing from the source S through a line 1152, a low pressure regulator 1160, a shuttle valve 1162, a line 1164, a 4 way double pilot operated valve 1154 and a line 1156 to the motors 736. At this time in the machine cycle the valve 1154 is shifted to enable the line 1156 to vent to atmosphere through this valve and to enable pressurized air to pass from the valve 1154 through a line 1158 to the motors 736 to cause these motors to move the shank wipers 746 inwardly towards the shoe assembly under relatively low pressure. The tops of the shank wipers 746 are located, at this time, a small amount above the level of the bottom of the insole 1048 and their path of movement had been adjusted by manipulation of the set screws 730 so that they move inwardly opposite the inwardly curved reentrant portions 1166 and 1168 (FIGURE 71A) of the last to force the shank portions of the upper margin inwardly into these reentrant portions until the upper hugs the reentrant portions with the upper margin depending downwardly of the insole 1048 immediately adjacent the outer periphery of the insole as indicated in FIGURE 71B. The pressure of the air entering the motors 736 at this time is so regulated by the regulator 1160 that when the shank wipers 746 reach the FIGURE 71B position the resistance offered by the shoe assembly causes the shank wipers to cease their inward movements.

The parts at this time assume the position shown in the FIGURES 71, 71A and 71B with the portion of the upper margin that extends between the applicator-support 112 and the heel end extremity of the shoe assembly bearing against the bottom of the sides of the last immediately adjacent the outer periphery of the insole 1048 and extending downwardly of the insole due to the stretching of the upper about the last in a heel to toe direction that was performed by the toe section 12, the pressing of the heel portion of the upper against the last by the heel pad 806 and the forcing of the upper into the reentrant portions 1166 and 1168 by the shank wipers 746. While the parts are in this position, cement is applied to substantially the entire periphery of the margin of the insole 1048 in the manner described below preparatory to wiping the entire margin of the upper against the insole and attaching the wiped margin to the insole by means of the cement.

To apply the cement to the toe and forepart portion of the margin of the insole 1048, at this time the motor 990 of the cement pot 969 associated with the applicator-support 112 is actuated to move its plunger 1010 forwardly an amount determined by the position of its stud 994 with respect to its block 984 and thereby extrude a predetermined amount of molten cement through the holes 128 and groove 126 of the applicator-support 112 against the bottom of the margin of the toe and forepart portion of the insole 1048 that is equal to the volume of cement that is displaced by its plunger 1010 during its forward movement. The pressures generated during the forward movement of this plunger 1010 unseats its associated valve 1030 to allow the cement to pass from its associated bore 1012 through its associated adapter 1026 to the applicator-support 112 and also forces its associated ball 1022 upwardly from its associated pin 1024 against its associated ferrule 1014 to block the associated passage 1018 and thus cut off the flow of cement from the associated well 972 into the bore 1012. Subsequently in the machine cycle the motor 990 of this cement pot 968 is actuated to move its plunger 1010 rearwardly and thereby enable its valve 1030 to be reseated and the passage 1020 to reopen. The cement thus deposited on the insole 1048 takes the form of a ribbon 1170 shown in FIGURE 76.

At about the same time as the cement ribbon 1170 is applied to the insole 1048, the nozzles 928 are manipulated so as to bear against and deposit molten cement against the margins of the insole in the regions extending heelwardly of the cement ribbon 1170. This is done by concomitantly actuating the motors 952 and 958 to cause their respective piston rods 950 and 956 to project outwardly of the motors and cause the nozzles 928 to move forwardly and upwardly with the piston rods 940 of the motors 938 urging the nozzles inwardly. During this movement the nozzles depart from the back nozzle rest 962 and come into engagement with the spaced rest elements 964a and 964b (FIGURE 76B) of the front nozzle rest 964 and move into the angle formed by the margin of the upper 1052 and the insole portion 1068 at the heel end of the shoe assembly at an acute angle to the plane of the bottom of the insole as indicated by the phantom and solid line representations of the nozzles in FIGURE 76A. The resilient force afforded by the pressurized air in the motors 952 and 958 enables the nozzles to cease their upward movement upon engaging the insole 1048 and to cease their forward movement upon engaging the heel end extremity of the upper margin. The front nozzle rest 964 is so constructed that at the completion of the movement of the nozzles 928 they are bearing against the front nozzle rest under the yieldable forces of the piston rods 940 with the nozzle tops located contiguous to each other, but not crossing each other, and bearing into the corner of the upper margin and insole at the heel end extremity of the shoe assembly, as indicated in FIGURES 76, 76A and 76B.

Now the motors 952 are actuated to retract the piston rods 950 into these motors while the piston rods 956 continue to be urged upwardly out of the motors 958. At the same time the pressurized air is vented from the motors 938 to retract their piston rods 940 and enable the springs 942 to yieldably urge the nozzles 928 outwardly about the bar extensions 926. At the same time the motor 990 for the cement pot 968 associated with the nozzles 928 is actuated to move the plunger 1010 for this cement pot forwardly and thereby causes molten cement to be extruded through the nozzles in the manner described above in connection with the application of the cement ribbon 1170 to the insole 1048. This results in the nozzles 928 moving rearwardly along the margin of the insole from the heel end extremity of the shoe assembly with the springs 942 causing the nozzles to bear against the margin of the upper that extends downwardly of the insole adjacent the peripheral edge of the insole due to the effects created by the heel clamp pad 806 and the shank wipers 746 as described above. During this rearward movement molten cement is extruded from the nozzles onto the peripheral edges of the insole.

The rearward movement of the nozzles is terminated when they engage the applicator-support 112. The machine control is so coordinated that at this time the block 984 of the cement pot 968 associated with the nozzles 928 engages its associated stud 994 to terminate the extrusion of cement from the nozzles, the motors 958 are actuated to retract the piston rods 956 into these motors to lower the nozzles and pressurized air is returned to the motors 938 to cause their piston rods 940 to again force the nozzles inwardly against the forces applied by the springs 942. The nozzles therefore return to their original position bearing against the front nozzle rest 962. At a subsequent time in the machine cycle the plunger 1010 for the cement pot 968 associated with the nozzles 928 is returned to its original position by its motor 970.

The effect of these movements of the nozzles 928 and the extrusion of the cement therethrough is to apply a ribbon of cement 1172 (FIGURE 76) to the periphery of the insole 1048 that extends from the heel end extremity along both sides of the insole and meets the cement ribbon 1170.

Figure 77:
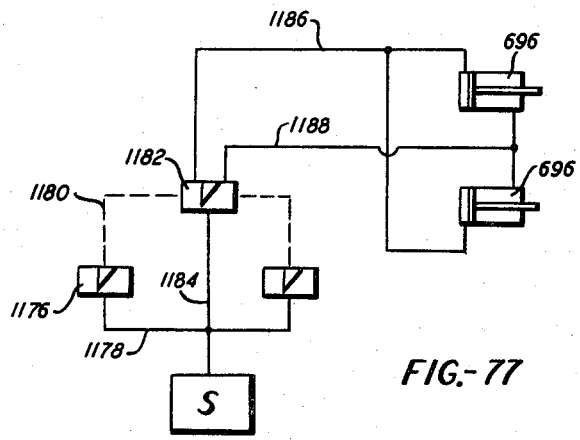
FIGURES 77 and 78 are circuit diagrams of parts of the control circuit of the machine.

During the return of the nozzles 928 to their original positions, a cam 1174 (FIGURES 58 and 59) on the pin 944 intersects and momentarily opens a valve 1176 that is mounted on the machine frame 10. Referring to FIGURE 77, the opening of the valve 1176 enables pressurized air to pass from the source S through a line 1178, the valve 1176 and a pilot line 1180 to shift a valve 1182. The shifting of the valve 1182 enables pressurized air to pass from the source S through a line 1184, the valve 1182 and a line 1186 to the motors 696 to actuate these motors to move the cam slide 688 rearwardly. Prior to the shifting of the valve 1182, the motors 696 had been maintained in their original position by pressurized air passing to them from the valve 1182 through a line 1188. The rearward movement of the cam slide 688 causes the heel wipers 680 to move rearwardly and inwardly through their wiping stroke and wipe the upper margin at the heel portion of the shoe assembly against the insole. The cam tracks 684 and 686 are so constructed as to cause the rearward movement of the cam slide 688 to move the heel wipers 680 in a path substantially the same as that disclosed in pending application Ser. No. 478,185, filed Aug. 9, 1965. Initially the wipers 680 have both a rearward translatory motion and an inward swinging motion about the vertex 683. As the wiping operation progresses the rearward translatory motion is decreased until it is finally terminated with the inward swinging motion of the wipers 680 continuing after the rearward translatory motion has ceased. These wiper motions are such that the initial translatory motion causes the wiper surfaces 681 to cross under the last in directions that are substantially at right angles to the periphery of the last.

Figure 78:
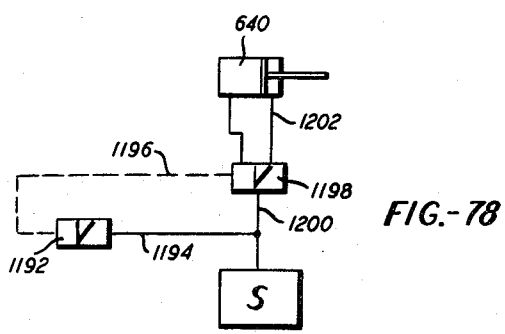

Partway through the heel wiping stroke and after the heel wipers 680 have passed under the insole 1048, a cam 1190 that is secured to the cam slide 688 intersects and opens a valve 1192 that is adjustably mounted on the back-up plate 658 (see FIGURE 43). Referring to FIGURE 78, the opening of the valve 1192 enables pressurized air to pass from the source S through a line 1194, the valve 1192 and a pilot line 1196 to shift a valve 1198. The shifting of the valve 1198 enables pressurized air to pass from the source S through a line 1200, the valve 1198 and a line 1202 to the motor 640 to cause the piston rod 642 to be retracted into the motor 640 so that the toggle links 646 and 648 are so moved as to lower the heel rest 610 and the height sensing pin 624 from the heel insole portion 1068. The movement of the sensing pin 624 away from the insole 1048 enables the spring 634 to raise this sensing pin to its original position so that the valve 630 can reclose. Closure of the valve 630 enables the air in the pilot line 1132 (FIGURE 74) to vent to atmosphere through this valve and enables the valve 1128 to reopen so that the oil in the oil compartment 1114 can again move through the conduit 1126 and an upwardly directed force can again be applied to the piston rod 528 by the pressurized air in the line 1144. Therefore, by the time the heel wiping stroke has been completed, the heel rest 610 has been lowered out of the path of the oncoming heel wipers 680, the heel portion of the shoe assembly is supported on its bottom solely by the heel wipers, and the heel wipers are applying an upwardly directed force to the heel portion of the shoe assembly to hold it between the heel wipers and the heel hold-down 890.

Figure 79:
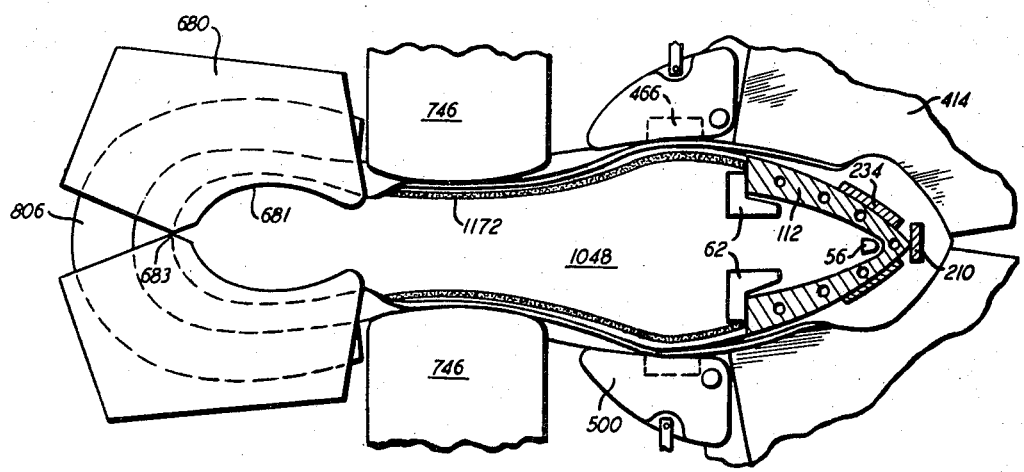
FIGURES 79 through 81 are representations of the shoe assembly as it appears in the machine at different stages of the wiping operation.

At the completion of the heel wiping stroke, the heel portion of the margin of the upper 1052 has been wiped against the insole 1048 in the region of the heel seat of the shoe assembly and has been attached thereto by the cement ribbon 1172 as indicated in FIGURE 79.

Due to the floating mounting of the back-up plate 658 by the springs 666, 668 and 670 that causes the back-up plate to be yieldably urged upwardly and to have limited universal movement on the adjustment plate 556, the heel wipers which are slidably mounted on the back-up plate may yield as they move beneath the bottom of the heel seat portion of the shoe assembly. Thus, if the upper surfaces of the heel wipers are not coplanar with the bottom of the heel seat portion of the shoe assembly, the heel wipers will during their wiping stroke shift against the forces of the springs 666, 668 and 670 until they assume this coplanar relationship.

Figure 80:
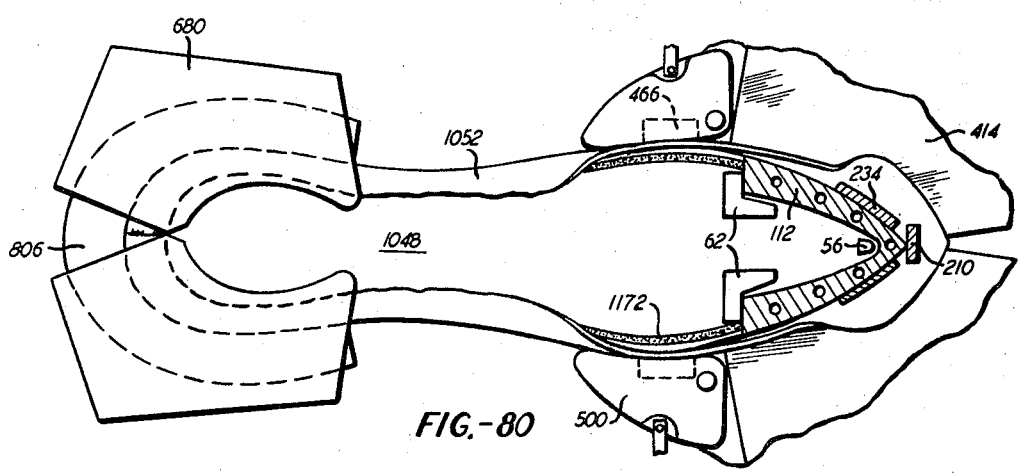

As aforesaid, the shank wipers 746 had been forced inwardly under relatively light pressure against the shank portions of the shoe assembly to the FIGURE 71B position with the tops of the shank wipers above the level of the bottom of the insole 1048. After the completion of the wiping stroke of the heel wipers 680, a valve 1204 (FIGURE 75) is shifted to enable pressurized air to pass from the source S through a line 1206, the valve 1204, a high pressure regulator 1208, the shuttle valve 1162, the line 1164, the valve 1154 and the line 1158 to the motors 736 to thereby force the shank wipers 746 inwardly in shank wiping strokes under higher pressure than had heretofore been provided by way of the low pressure regulator 1160. As the shank wipers commence their inward movement they are forced downwardly against the pressures of the springs 720 until their tops are at a level below the bottom of the insole 1048 that corresponds to the thickness of the margin of the upper 1052, to thereby downwipe the upper 1052 and stretch it downwardly of the last in the area of the reentrant portions 1166 and 1168 (FIGURE 71A). This downwiping effect is augmented by the resilient and flexible construction of the shank wipers. After this the shank wipers move inwardly under the insole to wipe the stretched upper margin engaged by them against the bottom of the insole. During this wiper movement, the shank portions of the upper margin that are engaged are bonded to the insole by way of the cement ribbon 1172 and the springs 720 enable the shank wipers to apply an upwardly directed bedding pressure to ensure that the wiped-in upper margin is flattened against the insole. The springs 752 provide a floating mounting for the shank wipers 746 so that the wiper supports 734 can oscillate within the mounts 712 during the inward movement of the shank wipers to thus ensure a coplanarity between the tops of the shank wipers and the bottom of the insole portions they pass beneath during the inward working stroke of the shank wipers. After the shank wipers 746 have remained in their inner positions a sufficient length of time to ensure that the portions of the upper margin engaged thereby are securely bonded to the insole, the valve 1154 (FIGURE 75) is shifted to its original position to enable pressurized air to again pass through the line 1156 to the motors 736 to cause these motors to return the shank wipers 746 to their original outer positions out of engagement with the shoe assembly. At this time the parts assume the position shown in FIGURE 80.

Now the motor 382 is actuated to raise its piston rod 386 and, through the clevis 388, bell crank 390 and linkage 396, move the housing 400 forwardly in the gibs 402 to thereby enable the links 412 to move the wiper cams 400 and the toe wipers 414 carried thereby with respect to the slide plate 368 in a toe wiper stroke to wipe the toe and forepart portions of the upper margin against the insole with the pins 406 riding in the cam tracks 408 and 410 in a path determined by the configuration of the cam tracks. The configuration of the cam tracks is such that the toe wipers 414 are first swung toward each other about the vertex 418. This is followed by a compound movement comprising a concomitant forward translatory movement of the toe wipers and an inward swinging movement of the toe wipers about the vertex. This is followed, at the conclusion of the wiper stroke, by a forward translation of the toe wipers without swinging movement. The machine was so set up that at the beginning of the toe wiper stroke the divergent wiper surfaces 416 were spaced close to the sides of the toe and forepart portion of the shoe assembly thereby enabling the toe wipers to move only a short distance in their wiping stroke before engaging the upper. The concomitant forward translation and inward swinging of the toe wipers causes them to engage the toe and forepart portions of the upper margin while the upper is stretched tightly about the last to wipe or fold the upper margin against the insole 1048 and bond it thereto by means of the ribbon of cement 1170 on the insole. During the compound movement, there is a greater inward swinging movement of the toe wipers than a forward translation so as to enable the wiper surfaces 416 to move inwardly of the last edge a greater distance along the sides of the last than the distance traversed by the vertex 418 along the extreme toe end of the last. After the surfaces 416 have crossed over the last sides a sufficient amount to fold the upper margin against the insole, the final exclusively translatory movement causes the vertex 418 to move across the toe end of the last to wipe the toe end of the upper margin against the insole. It has been found that this sequence of movements, especially in sharp or pointed toe shoes, ensures that the extreme toe end of the upper where the greatest stresses are created is firmly wiped against the insole.

As disclosed more fully in the aforementioned application Ser. No. 472,525 the knife 420 is projected forwardly of the wiper surfaces 416 to cut into the pleated material gathered by the toe wipers 414 at the toe end of the shoe assembly by the inward movement of the toe wipers to relieve the stress therein.

As the clevis 388 (FIGURE 27) is raised during the wiping stroke of the toe wipers 414, a rod 1210 (FIGURES 1 and 27), that is pivoted at its top to this clevis, is raised. The lower end of the rod 1210 is pivoted to a sleeve 1212. The sleeve 1212 is secured to a shaft 1214 that is pivotally mounted in hangers 1216 secured to the frame 10. A group of cams 1218 is secured to the shaft 1214 to rotate therewith. Each cam in the group 1218 is registerable with a valve in a group of valves 1220, these valves being mounted on a strap 1222 secured to the hangers 1216. The raising of the rod 1210 causes the cam group 1218 to rotate so that cam lobes on the cam peripheries will sequentially engage and actuate the valves in the valve group 1220, in a manner similar to that disclosed in the aforementioned application Ser. No. 472,525.

The coaction of the cam group 1218 with the valve group 1220 during the wiping stroke of the toe wipers 414 will first actuate the motor 80 to retract its piston rod 82 to thereby lower the applicator-support 112 out of the path of the toe wipers. Then the flow of pressurized air to the motors 226 is shut off so as to terminate the application of pressure by the side retarders 234 against the bottoms of the toe wipers 414 and, at the same time, the flow of pressurized air that had heretofore flowed to the cylinder 194 is shut-off so that the spring 204 can lower the front retarder 210 away from the bottoms of the toe wipers 414. Then the motor 20 is actuated to lower its piston rod 26 and thereby lower the insole rests 56, 62 out of the path of the oncoming toe wipers. Then pressurized air enters the motor 352 under greater pressure than had heretofore been applied to force the toe hold-down 356 downwardly against the forepart of the shoe assembly under greater pressure than had heretofore been applied. In addition, a heretofore closed valve 1224 (FIGURE 74) is caused to be opened so that pressurized air can pass from the source S through a line 1226, a high pressure regulator 1228, the valve 1224, the shuttle valve 1140, the line 1142, the valve 1134 and the line 1144 to the motor 518 to force the piston rod 528 together with the heel wipers 680 upwardly under higher pressure than had heretofore been provided by the pressurized air passing through the low pressure regulator 1138.

During the above described movement of the toe wipers 414 through its wiping stroke the ball wipers 500 moved along with the toe wipers without having any significant relative movement with respect to the toe wipers. At the completion of the toe wiper stroke, the toe wipers 414 had engaged and wiped in the toe and forepart portions of the upper margin up to the regions of the balls 1230 and 1232 (FIGURE 81) of the shoe assembly where the last reaches its maximum width, leaving unwiped regions in the shoe assembly between the toe wipers and the portions of the upper that had previously been wiped by the shank wipers 746, and the forwardmost portions of the ball wipers are located outwardly of the shoe assembly ball areas 1230 and 1232. During the toe wiper stroke the component of forward translation of the toe wipers had pushed the wiped upper margins forwardly so as to create pleats in the unwiped upper margin in the regions immediately in front of the toe wipers in the ball areas 1230 and 1232. After the completion of the toe wiper stroke the motors 504 are actuated to move their piston rods 510 forwardly and thereby swing the ball wipers 500 inwardly about the pins 502 in directions that are substantially radial to the curvature of the last to cause the surfaces 503 of the ball wipers 500 to wipe in the pleated upper margin in the ball areas 1230 and 1232 and cause it to be cementatiously attached to the insole. The ball wipers, during their inward movement, overlap the shank portions of the upper margin that had previously been wiped against the insole by the shank wipers 746, and it was to prevent interference between the ball wipers and shank wipers that the shank wipers had been moved outwardly away from the shoe assembly after completing their wiping operation.

Figure 81:
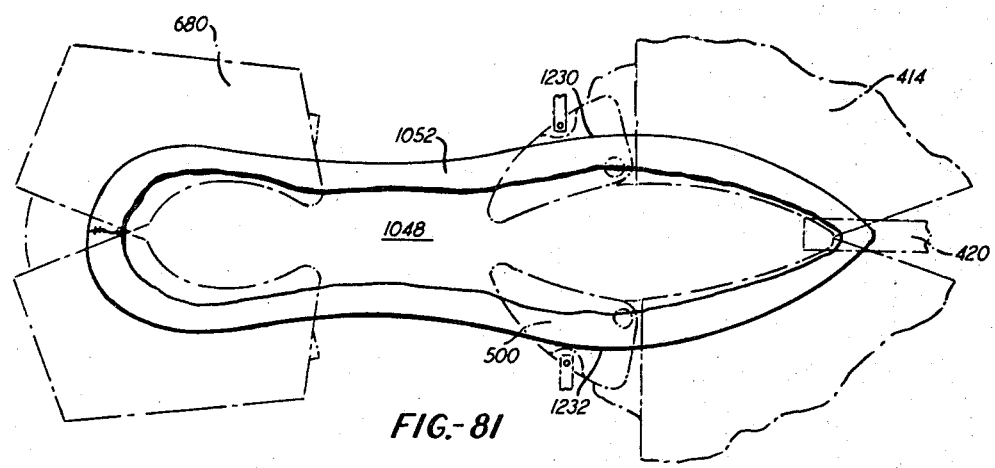

The wiping of the entire shoe assembly is now completed and the parts assume the position shown in FIGURE 81.

Recapitulating the events that take place during and after the toe wiping stroke, the applicator-support 112 is first lowered out of the path of the oncoming toe wipers. After this, the pressures applied by the front retarder 210 and the side retarders 234 forcing the upper margin against the bottoms of the toe wipers 414 is relieved, the timing being such that this takes place after the toe wipers have crossed under the insole and have started to wipe the upper margin against the insole so that the stretching of the upper about the last that had been maintained by the retarders is taken over by the toe wipers with the result that the streching of the upper about the last is maintained during the toe wiper stroke. This is aided by the fact that the yoke 426 and the bumpers 466 are being forced against the shoe assembly under relatively high pressure. This is followed by the lowering of the insole rests 56, 62 out of the path of the oncoming toe wipers so that the toe end of the shoe assembly is supported on its bottom toe end by the toe wipers thus enabling the toe hold-down 356 to press the shoe assembly downwardly directly against the toe wipers and provide an overwiping pressure. Toward the end of the toe wiper stroke the toe hold-down 356 is forced downwardly under relatively heavy pressure. In addition, during the toe wiper stroke, the heel wipers 680 are forced upwardly under relatively heavy bedding pressure against the resistance offered by the heel hold-down 890. The effect of these bedding pressures is to iron the wiped margin portions against the insole and enable the cement ribbons 1170 and 1172 to effectively bond the wiped upper margins to the insole. After the toe wipers 414 have concluded the wiping movement, the ball wipers 500 are swung inwardly to wipe against the insole, the upper margin in the region of the balls 1230 and 1232 between the portions that had been wiped by the toe wipers 414 and the shank wipers 746. After the lapse of a time period sufficient for the ironing operation of the toe and heel wipers to be effective, the machine parts are returned to their idle poistions and the shoe is released.

To summarize the operations during a machine cycle, the shoe assembly is placed bottom-down on the applicator-support 112 with the last 1050 bearing against the retarders 210 and 234, the toe end of the upper margin between the open jaws of the front pincers 176 and the forepart portions of the upper margin between the open jaws of the side pincers 324. The front pincers 176 are closed on the toe end portions of the upper margin and the side pincers 324 are closed on the forepart portions of the upper margin. After this the front pincers 176 are moved downwardly and rearwardly away from the last and the side pincers 324 are moved downwardly with respect to the last with the upper margin dragging about the retarders 210 and 234 to force the applicator-support 112 downwardly until the insole 1048 bears against the insole rests 56 and 62. The stretching action of the pincers 176 and 374 causes the upper to be stretched tightly about the last in a heel to toe direction with the toe and forepart portion of the upper stretched downwardly about the toe and forepart portion of the last, the topline 1056 (FIGURE 69) of the upper stretched tightly on the last, the heel portion of the upper stretched tightly about the heel end of the last and the shank portion of the upper extending tautly between the heel portion and the forepart portions. The stretching action of the pincers 176 and 374 also causes the forepart portions of the upper margin to be outspread into dog ears 1058 (FIGURE 69A). After this the toe hold-down 356 is brought down against the top of the forepart of the shoe assembly under relatively light pressure to hold the shoe assembly against the applicator-support 112 and the insole rests 56 and 62. Now the slide plate 368, together with the toe wipers 414, the ball wipers 500, the yoke 426 and the bumpers 466, are moved forwardly from their out-of-the-way position to a working position. Then the head 358 is swung downwardly to a level that brings the tops of the toe wipers to a level that is slightly below the bottom of the toe and forepart portion of the insole. During the descent of the head 358, the toe end of the shoe assembly is forced through the yoke 426, the toe end portion of the upper margin is pressed against the bottoms of the toe wipers 414 by the front retarder 210 and the dog ears 1058 of the upper margin are pressed against the toe wiper bottoms by the side retarders 234. Near the end of the descent of the head 358, the front pincers 176 release the upper margin and move downwardly away from the toe wipers so that the toe end portion of the upper margin is maintained in its stretched condition solely by its being pressed against the toe wiper bottoms by the front retarder 210, the yoke 426 is forced against the shoe assembly under greater pressure than had heretofore been applied, the bumpers 466 are forced against the forepart of the upper rearwardly of the yoke 426, the side retarders 234 are forced against the dog ears 1058 under greater pressure than had heretofore been applied and the side pincers 324 are released from the upper margin and moved downwardly away from the shoe assembly. After this the slide plate 534, together with the heel wipers 680, the heel clamp pad 806, the shank wipers 746, the heel rest 610 and the heel hold-down 890 are moved rearwardly until the length sensing pin 856 engages the heel portion of the shoe assembly at which time the heel wipers 680 and the heel clamp pad 806 are adjacent to but not in engagement with the heel portion of the shoe assembly and the heel rest 610 is spacedly below the heel portion of the shoe assembly. Then the heel head 528, together with the heel rest 610, the heel wipers 680, the heel clamp pad 806, the shank wipers 746 and the heel hold-down 890 are raised until the height sensing pin 624, mounted in the heel rest 610, engages the heel portion of the insole to bring the tops of the heel wipers approximately level with the heel portion of the insole and the shank wipers 746 to a level that is above the level of the bottom of the insole. After this the heel pad 806 is brought against the heel portion of the shoe assembly and is inflated to clamp the heel portion of the upper against the last. This is followed by a lowering of the heel hold-down 890 against the last to clamp the heel portion of the shoe assembly between the insole rest 610 and the heel hold-down. Now the shank wipers 746 are moved inwardly under relatively light pressure to bear against the shank portions of the shoe assembly and force the shank portions of the upper margin inwardly against the shank portions of the last. At this time the ribbon of cement 1170 is applied through the applicator-support 112 against the margin of the toe and forepart portion of the insole 1048. At about the same time that the cement ribbon 1170 is applied, the nozzles 928 are caused to move along and extrude the cement ribbon 1172 against the margin of the insole portion that extends from the heel end of the insole to the applicator-support 112. This is followed by the wiping stroke of the heel wipers 680 to wipe the heel portion of the upper margin against the insole and attach the wiped margin portion to the insole by means of the cement ribbon 1172. During the heel wiper stroke, and after the heel wipers have passed under the insole, the heel rest 610 is lowered from the insole so as to get out of the way of the heel wipers and the heel wipers are forced upwardly under relatively light pressure to hold the heel portion of the shoe assembly between the heel wipers 680 and the heel hold-down 890. Now the shank wipers 746 are moved inwardly under relatively heavy pressure to downwipe the shank portions of the upper margin and then inwipe the shank portions of the upper margin against the insole and attach the wiped portions to the insole by means of the cement ribbon 1172, after which the shank wipers are moved outwardly away from the shoe assembly. This is followed by the movement of the toe wipers 414 through their wiping stroke to wipe the toe and forepart portions of the upper margin against the insole and bond it thereto by means of the cement that had been deposited on the insole. During the toe wiper stroke the applicator-support 112 is lowered out of the path of the oncoming toe wipers, the pressure applied by the retarders 210 and 234 forcing the upper margin against the toe wiper bottoms is relieved and the insole rests 56 and 62 are lowered out of the path of the oncoming toe wipers so that the toe end of the shoe assembly is supported on its bottom solely by the toe wipers with the toe hold-down 356 pressing the toe end of the shoe assembly downwardly directly against the toe wipers to provide an overwiping pressure. By the end of the toe wiper stroke the toe hold-down 356 has been forced downwardly under relatively heavier pressure and the heel wipers 680 have been forced upwardly under relatively heavy pressure to iron the wiped upper margin portions against the insole and bond the margin portions to the insole by means of the cement ribbons. At the conclusion of the toe wiper stroke, the ball wipers 500 are swung inwardly to wipe the upper margin at the balls of the shoe, between the previously wiped forepart and shank portions, inwardly against the insole and bond the wiped portions to the insole by means of the cement ribbon 1172. After this the machine parts are returned to their idle positions and the shoe is released.

It should be understood that the present disclosure is for the purpose of illustration only and that this invention includes all modifications and equivalents that fall within the scope of the appended claims.

Terms in the claims indicating positions and paths of movement such as "downwardly" and "rearwardly" have been employed primarily to define the relative positions and paths of movements of the parts and should be construed accordingly so that organizations which have equivalent relative positions and functional relationships between the parts as are defined in the claims are considered to fall within the scope of the claims regardless of whether the parts literally have the defined positions and paths of movements.

We claim:

1. A method of lasting comprising: supporting bottom-down a shoe assembly, that comprises a last having an insole located on its bottom and an upper mounted thereon with at least the heel portion of the upper margin extending downwardly of the insole, in such a manner that the forepart of the shoe assembly lies in a predetermined location and the heel portion of the shoe assembly bottom extends forwardly of said forepart portion and substantially lies in a particular plane that is dependent on the size and style of the shoe assembly; providing a heel section that is located forwardly of the shoe assembly, said heel section incorporating heel wiping means adapted to lie in a plane that is substantially parallel to said particular plane; initially maintaining the heel wiping means in a retracted position; initially maintaining the heel section in a forward position wherein the heel wiping means is remote from and out of registry with the heel portion of the insole; moving the heel section from its forward position through a compound movement having a first component of movement that has a rearward direction and a second component of movement that has a heightwise direction to a wiping position wherien the heel wiping means is adjacent to the heel portion of the shoe assembly with the heel wiping means in registry with the heel portion of the insole while the heel wiping means is maintained in a plane substantially parallel to said particular plane; and thereafter moving the heel wiping means in a heel wiping stroke from its retracted position into an advanced position in a substantialy planar path parallel to said particular plane to wipe the heel portion of the upper margin aginst the insole.

2. The method as defined in claim 1 further comprising: causing toe wiping means to move through a toe wiping stroke in which it wipes the toe and forepart portion of the upper margin against the insole.

3. The method as defined in claim 2 further comprising: stretching the upper about the last, prior to any of said wiping strokes in such a manner that the upper is pulled in a heel to toe direction to stretch the upper about the heel of the last and is also pulled downwardly about the forepart of the last to stretch the upper about the forepart and toe of the last.

4. The method as defined in claim 1 further comprising: adjusting the planar position of the heel wiping means in the heel section, prior to moving the heel section in said compound movement, to cause the heel wiping means to lie in the plane substantially parallel to said particular plane.

5. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom lies in a predetermined location and the heel portion of the shoe assembly bottom extends forwardly of said forepart portion and substantially lies in a particular plane that is dependent on the size and style of the shoe assembly; a heel section located forwardly of the support arrangement, said heel section incorporating heel wiping means adapted to lie in a plane that is substantialy parallel to said particular plane; means mounting the heel wiping means in the heel section for substantially planar movement in a plane substantially parallel to said particular plane between a retracted position and an advanced position; means for initially maintaining the heel wiping means in its retracted position; means mounting the heel section for compound movement having a first component of movement that has a rearward direction and a second component of movement that has a heightwise direction; means for initially maintaining the heel section in a forward position wherein the heel wiping means is remote from and out of registry with the heel portion of the insole; means for moving the heel section from its forward position through said compound movement to a wiping position wherein the heel wiping means is adjacent to the heel portion of the shoe assembly with the heel wiping means in registry with the heel portion of the insole while the heel wiping means is maintained in a plane substantially parallel to said particular plane; and means for thereafter moving the heel wiping means from its retracted to its advanced position through a heel wiping stroke to wipe the heel portion of the upper margin against the insole.

6. The apparatus as defined in claim 5 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

7. The apparatus as defined in claim 6 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

8. The apparatus as defined in claim 5 further comprising: powered means moving the heel section through said compound movement; sensing means mounted on the heel section so constructed as to be intersected by the shoe assembly during said compound movement; and control means responsive to the intersection of the sensing means with the shoe assembly to cause the powered means to stop the compound movement with the heel wiping means in said wiping position.

9. The apparatus as defined in claim 5 further comprising: means for adjusting the planar position of the heel wiping means in the heel section so as to cause the heel wiping means to lie in a plane substantially parallel to said particular plane.

10. The apparatus as defined in claim 5: wherein said heel section comprises a heel head mounted for heightwise movement and a slide plate movably mounted in the heel head for forward and rearward movement; wherein the heel wiping means is mounted to the slide plate for movement through said heel wiping stroke; and further comprising: means for moving the heel head together with the slide plate and heel wiping means heightwise, and means for moving the slide plate together with the heel wiping means rearwardly with respect to the heel head, to thereby provide said compound movement.

11. The apparatus as defined in claim 10 further comprising: means mounting the heel wiping means to the slide plate for swinging movement about an axis that is transverse to said direction of forward and rearward movement; and means for adjusting the position of the heel wiping means about said axis to thereby cause the heel wiping means to lie in a plane substantially parallel to said particular plane.

12. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; heel wiping means adapted to lie in a plane that is substantially parallel to said particular plane; means mounting the heel wiping means to the slide plate for substantially planar movement in a plane substantially parallel to said particular plane between a retracted position and an advanced position; means for initially maintaining the heel wiping means in its retracted position; a rearwardly directed length sensing member mounted to the slide plate and located above the heel wiping means; an upwardly directed height sensing member mounted to the slide plate and located rearwardly of the length sensing member; means for initially maintaining the heel head in a lowered position and the slide plate in a forward position so that the heel wiping means is in a remote position, out of registry with the heel portion of the insole, that is forward of and lower than the heel portion of the insole; first powered means for moving the slide plate, in unision with the heel wiping means, rearwardly from its forward position with the height sensing member moving beneath the heel portion of the shoe assembly; first control means responsive to the intersection of the length sensing member with the heel portion of the shoe assembly to cause the first powered means to terminate the rearward movement of the slide plate and the heel wiping means; second powered means for applying an upwardly directed force to the heel head in unison with the slide plate and the heel wiping means; means for actuating said second powered means subsequent to the termination of the rearward movement of the slide plate and the heel wiping means to cause the heel head and the heel wiping means to move upwardly from said lowered position; second control means actuable in response to the intersection of the height sensing member with the bottom of the shoe assembly to cause the second powered means to terminate the application of the upwardly directed force to thereby stop the upward movement of the heel head and the heel wiping means; said length sensing member and said height sensing member being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means from its retracted position to its advanced position through a heel wiping stroke to wipe the heel portion of the upper margin against the insole.

13. The apparatus as defined in claim 12 further comprising: means mounting the heel wiping means to the slide plate for swinging movement about an axis that is transverse to said direction of forward and rearward movement; and means for adjusting the position of the heel wiping means about said axis to thereby cause the heel wiping means to lie in a plane substantially parallel to said particular plane.

14. The apparatus as defined in claim 12 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

15. The apparatus as defined in claim 14 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

16. The apparatus as defined in claim 12 wherein the height sensing member is constituted as a heightwise extending pin; and further comprising: a heel rest mounted to the slide plate for movement therewith; means mounting the height sensing pin for heightwise movement in the heel rest; spring means for yieldably urging the height sensing pin upwardly of the heel rest to a position wherein the top of the height sensing pin is above the top of the heel rest; and wherein the application of said upwardly directed force to the heel head causes the height sensing pin upon its engagement with the insole to move downwardly with respect to the heel rest against the force of the spring means with the heel rest bearing against the heel portion of the insole; and wherein the second control means is so constructed as to be actuated in response to said downward movement of the height sensing pin with respect to the heel rest; whereby the heel rest is enabled to support the heel portion of the shoe assembly during the heel wiping stroke.

17. The apparatus as defined in claim 16 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest and the height sensing pin for heightwise movement with respect to the slide plate; means for initially maintaining the heel rest and the height sensing pin in an upper position with respect to the slide plate in which position the height sensing pin is caused to move into engagement with the insole and the heel rest is caused to bear against the insole; means, operative after the heel wiping means has commenced its heel wiping stroke and has moved under the insole, to lower the heel rest and height sensing pin from the insole thereby causing the spring means to again urge the height sensing pin upwardly of the heel rest; and means responsive to the urging of the height sensing pin upwardly of the heel rest to cause the second control means to resume the application of the upwardly directed force to the heel head, slide plate and heel wiping means so that the heel portion of the shoe assembly is held between the heel hold-down and the heel wiping means.

18. The apparatus as defined in claim 17 further comprising: brace means connected to the slide plate to partake of the rearward and forward movement of the slide plate; means mounting the heel hold-down for heightwise movement with respect to the brace means; means initially maintaining the heel hold-down in an upper position with respect to the brace means; and wherein the heel hold-down is caused to bear against the top of the heel portion of the shoe assembly by the provision of means for lowering the heel hold-down with respect to the brace means.

19. The apparatus as defined in claim 12 further comprising: a heel clamping pad mounted to the slide plate above the heel wiping means; means for initially maintaining the pad in an open position so located as not to engage the heel portion of the shoe assembly during the upward movement of the heel head; and means, operative after the upward movement of the heel head has stopped and prior to the heel wiping stroke, to cause the pad to close on and bear against the heel portion of the shoe assembly.

20. A lasting apparatus as defined in claim 12 wherein said length sensing member constitutes a rearwardly directed pin; further comprising: means mounting the length sensing pin to the slide plate for forward and rearward movement with respect to the slide plate; yieldable means urging the length sensing pin rearwardly with respect to the slide plate; and a control member, that is actuable in response to forward movement of the length sensing pin against the force of the yieldable means in response to engagement of the length sensing pin with the heel portion of the shoe assembly, for actuating said first control means.

21. The apparatus as defined in claim 12 further comprising: an upwardly directed heel rest located rearwardly of the heeel wiping means in its retracted position and mounted to the slide plate for movement therewith, said heel rest being so constructed and arranged as to bear against the heel portion of the insole upon termination of said upwardly directed force and thereby support the heel portion of the shoe assembly during the heel wiping stroke.

22. The apparatus as defined in claim 21 further comprising: a heel hold-down located above the shoe assembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the slide plate; means for initially maintaining the heel rest in an upper position with respect to the slide plate in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heeel head, slide plate and heel wiping means so that the heel portion of the shoe assembly is held between the heel hold-down and the heel wiping means.

23. The apparatus as defined in claim 22 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

24. The apparatus as defined in claim 12 wherein the means mounting the heel wiping means to the slide plate is so constructed as to provide for limited universal movement of the heel wiping means with respect to the slide plate so as to enable the heel wiping means during the heel wiping stroke to conform precisely to the plane of the heel portion of the shoe assembly bottom.

25. The apparatus as defined in claim 24 wherein the means mounting the heel wiping means to the slide plate comprises: means mounting the heel wiping means for movement about two axes that are at right angles to each other and that extend in directions that are substantially parallel to the plane of the heel wiping means.

26. The apparatus as defined in claim 12 wherein the means mounting the heel wiping means to the slide plate comprises means enabling the heel wiping means to be swung transversely about an upright axis that is transverse to the plane of the heel wiping means to thereby adjust the zone of movement of the heel wiping means during the heel wiping stroke.

27. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; heel wiping means adapted to lie in a plane that is substantially parallel to said particular plane; means mounting the heel wiping means to the slide plate for substantially planar movement in a plane substantially parallel to said particular plane between a retracted position and an advanced position; means for initially maintaining the heel wiping means in its retracted position; means for initially maintaining the heel head in a lowered position and the slide plate in a forward position so that the heel wiping means is in a remote position out of registry with the heel portion of the insole that is forward of and lower than the heel portion of the insole; first powered means for moving the slide plate, in unison with the heel wiping means, rearwardly from its forward position; first control means to cause the first powered means to terminate the rearward movement of the slide plate and heel wiping means; second powered means for applying an upwardly directed force to the heel head in unison with the slide plate and heel wiping means; means for actuating said second powered means subsequent to the termination of the rearward movement of the slide plate and heel wiping means to cause the heel head and heel wiping means to move upwardly from said lowered position; second control means to cause the second powered means to terminate the application of the upwardly directed force to thereby stop the upward movement of the heel head and heel wiping means; said first and second control means being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means from its retracted position to its advanced position through a heel wiping stroke to wipe the heel portion of the upper margin against the insole.

28. The apparatus as defined in claim 27 further comprising: means mounting the heel wiping means to the slide plate for swinging movement about an axis that is transverse to said direction of forward and rearward movement; and means for adjusting the position of the heel wiping means about said axis to thereby cause the heel wiping means to lie in a plane substantially parallel to said particular plane.

29. The apparatus as defined in claim 27 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

30. The apparatus as defined in claim 29 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

31. The apparatus as defined in claim 27 further comprising: an upwardly directed heel rest located rearwardly of the heel wiping means in its retracted position and mounted to the slide plate for movement therewith, said heel rest being so constructed and arranged as to bear against the heel portion of the insole upon termination of said upwardly directed force and thereby support the heel portion of the shoe assembly during the heel wiping stroke.

32. The apparatus as defined in claim 31 further comprising: a heel hold-down located above the shoe assembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the slide plate; means for initially maintaining the heel rest in an upper position with respect to the slide plate in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, slide plate and heel wiping means so that the heel portion of the shoe assembly is held between the heel hold-down and the heel wiping means.

33. The apparatus as defined in claim 32 further comprising: brace means connected to the slide plate to partake of the rearward and upward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

34. The apparatus as defined in claim 27 wherein the means mounting the heel wiping means to the slide plate is so constructed as to provide for limited universal movement of the heel wiping means with respect to the slide plate so as to enable the heel wiping means during the heel wiping stroke to conform precisely to the plane of the heel portion of the shoe assembly bottom.

35. The apparatus as defined in claim 34 wherein the means mounting the heel wiping means to the slide plate comprises means mounting the heel wiping means for movement about two axes that are at right angles to each other and that extend in directions that are substantially parallel to the plane of the heel wiping means.

36. The apparatus as defined in claim 27 wherein the means mounting the heel wiping means to the slide plate comprises means enabling the heel wiping means to be swung transversely about an upright axis that is at right angles to the plane of the heel wiping means to thereby adjust the zone of movement of the heel wiping means during the heel wiping stroke.

37. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide arrangement movably mounted in the heel head for forward and rearward movement; a back-up plate located above the slide arrangement; means mounting the back-up plate to the slide arrangement so as to provide for limited universal movement of the back-up plate with respect to the slide arrangement and so as to partake of the forward and rearward movement of the slide arrangement; heel wiping means adapted to lie in a plane that is substantially parallel to said particular plane; means mounting the heel wiping means to the back-up plate for substantially planar movement in a plane substantially parallel to said particular plane between a retracted position and an advanced position; means for initially maintaining the heel wiping means in its retracted position; a rearwardly directed length sensing member mounted to the back-up plate and located above the heel wiping means; an upwardly directed height sensing member mounted to the slide arrangement and located rearwardly of the length sensing member; means for initially maintaining the heel head in a lowered position and the slide arrangement together with the back-up plate in a forward position so that the heel wiping means is in a remote position, out of registry with the heel portion of the insole, that is forward of and lower than the heel portion of the insole; first powered means for moving the slide arrangement in unison with the back-up plate and the heel wiping means, rearwardly from its forward position with the height sensing member moving beneath the heel portion of the shoe assembly; first control means responsive to the intersection of the length sensing member with the heel portion of the shoe assembly to cause the first powered means to terminate the rearward movement of the slide arrangement, the back-up plate and the heel wiping means; second powered means for applying an upwardly directed force to the heel head in unison with the slide arrangement, the back-up plate and the heel wiping means; means for actuating said second powered means subsequent to the termination of said rearward movement to cause the heel head in unison with the slide arrangement, the back-up plate and the heel wiping means, to move upwardly from said lowered position; second control means actuable in response to the intersection of the height sensing member with the bottom of the shoe assembly to cause the second powered means to terminate the application of the upwardly directed force to thereby stop the upward movement of the heel head, the slide arrangement, the back-up plate and the heel wiping means, said length sensing member and height sensing member being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means from its retracted position to its advanced position through a heel wiping stroke to wipe the heel portion of the upper margin against the insole, said means mounting the back-up plate to the slide arrangement enabling the heel wiping means during the heel wiping stroke to conform precisely to the plane of the heel portion of the shoe assembly bottom.

38. The apparatus as defined in claim 37 wherein the means mounting the back-up plate to the slide arrangement comprises: means enabling the back-up plate to have movement with respect to the slide arrangement about two axes that are at right angles to each other and that extend in directions that are substantially parallel to the plane of the heel wiping means.

39. The apparatus as defined in claim 37 wherein the means mounting the back-up plate to the slide arrangement comprises: a brace pivotally mounted to the slide arrangement for swinging movement about an axis that is transverse to the direction of movement of the heel wiping means in its heel wiping stroke; a strap located forwardly of the brace above the slide arrangement; means pivotally mounting the back of the back-up plate to the brace and the front of the back-up plate to the strap for swinging movement about an axis that extends longitudinally of the direction of movement of the heel wiping means in its heel wiping stroke; and spring means interposed between the slide arrangement and the back-up plate and strap for floatingly mounting the back-up plate to the slide arrangement.

40. The apparatus as defined in claim 37 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

41. The apparatus as defined in claim 40 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

42. The apparatus as defined in claim 37 wherein the height sensing member is constituted as a heightwise extending pin; and further comprising: a heel rest mounted to the slide arrangement for movement therewith; means mounting the height sensing pin for heightwise movement in the heel rest; spring means for yieldably urging the height sensing pin upwardly of the heel rest to a position wherein the top of the height sensing pin is above the top of the heel rest; and wherein the application of said upwardly directed force to the heel head causes the height sensing pin upon its engagement with the insole to move downwardly with respect to the heel rest against the force of the spring means with the heel rest bearing against the heel portion of the insole; and wherein the second control means is so constructed as to be actuated in response to said downward movement of the height sensing pin with respect to the heel rest; whereby the heel rest is enabled to support the heel portion of the shoe assembly during the heel wiping stroke.

43. The apparatus as defined in claim 42 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest and the height sensing pin for heightwise movement in the slide arrangement; means for initially maintaining the heel rest and the height sensing pin in a upper position with respect to the slide arrangement in which position the height sensing pin is caused to move into engagement with the insole and the heel rest is caused to bear against the insole; means, operative after the heel wiping means has commenced its heel wiping stroke and has moved under the insole, to lower the heel rest and height sensing pin from the insole thereby causing the spring means to again urge the height sensing pin upwardly of the heel rest; and means responsive to the urging of the height sensing pin upwardly of the heel rest to cause the second control means to resume the application of the upwardly directed force to the heel head, the slide arrangement and the heel wiping means so that the heel portion of the shoe assembly is held between the heel hold-down and the heel wiping means.

44. The apparatus as defined in claim 43 further comprising: brace means connected to the slide arrangement to partake of the rearward and upward movement of the slide arrangement; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

45. The apparatus as defined in claim 37 further comprising: a heel clamping pad mounted to the back-up plate above the heel wiping means; means for intially maintaining the pad in an open position so located as not to engage the heel portion of the shoe assembly during the upward movement of the heel head; and means, operative after the upward movement of the heel head has stopped and prior to the heel wiping stroke, to cause the pad to close on and bear against the heel portion of the shoe assembly.

46. A lasting apparatus as defined in claim 37 wherein said length sensing member constitutes a rearwardly directed pin; further comprising: means mounting the length sensing pin to the back-up plate for forward and rearward movement with respect to the back-up plate; yieldable urging the length sensing pin rearwardly with respect to the back-up plate; and a control member, that is actuable in response to forward movement of the length sensing pin against the force of the yieldable means in response to engagement of the length sensing pin with the heel portion of the shoe assembly, for actuating said first control means.

47. The apparatus as defined in claim 37 further comprising: an upwardly directed heel rest located rearwardly of the heel wiping means in its retracted position and mounted to the slide arrangement for movement therewith, said heel rest being so constructed and arranged as to bear against the heel portion of the insole upon termination of said upwardly directed force and thereby support the heel portion of the shoe assembly during the heel wiping stroke.

48. The apparatus as defined in claim 47 further comprising: a heel hold-down located above the shoe assembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the slide arrangement; means for initially maintaining the heel rest in an upper position with respect to the slide arrangement in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, the slide arrangement, the back-up plate and the heel wiping means so that the heel portion of the shoe assembly is held between the heel hold-down and the heel wiping means.

49. The apparatus as defined in claim 48 further comprising: brace means connected to the slide arrangement to partake of the rearward and upward movement of the slide arrangement; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

50. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a predetermined plane; a heel head located forwardly of the support arrangement; means mounting the heel head for heightwise movement; a slide arrangement movably mounted in the heel head for forward and rearward movement; a back-up plate located above the slide arrangement; means mounting the back-up plate to the slide arrangement so as to provide for limited universal movement of the back-up plate with respect to the slide arrangement and so as to partake of the forward and rearward movement of the slide arrangement; heel wiping means adapted to lie in a plane that is substantially parallel to said particular plane; means mounting the heel wiping means to the back-up plate for substantially planar movement in a plane substantially parallel to said particular plane between a retracted position and an advanced position; means for initially maintaining the heel wiping means in its retracted position; means for initially maintaining the heel head in a lowered position and the slide arrangement together with the back-up plate in a forward position so that the heel wiping means is in a remote position, out of registry with the heel portion of the insole, that is forward of and lower than the heel portion of the insole; first powered means for moving the slide arrangement, in unison with the back-up plate and the heel wiping means, rearwardly from its forward position; first control means to cause the first powered means to terminate the rearward movement of the slide arrangement, the back-up plate and the heel wiping means; second powered means for applying an upwardly directed force to the heel head in unison with the slide arrangement, the back-up plate and the heel wiping means; means for actuating said second powered means subsequent to the termination of said rearward movement to cause the heel head, in unison with the slide arrangement, the back-up plate and the heel wiping means, to move upwardly from said lowered position; second control means to cause the second powered means to terminate the application of the upwardly directed force to thereby stop the upward movement of the heel head, the slide arrangement, the back-up plate and the heel wiping means, said first and second control means being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means from its retracted position to its advanced position through a heel wiping stroke to wipe the heel portion of the upper margin against the insole, said means mounting the back-up plate to the slide arrangement enabling the heel wiping means during the heel wiping stroke to conform precisely to the plane of the heel portion of the shoe assembly bottom.

51. The apparatus as defined in claim 50 wherein the means mounting the back-up plate to the slide arrangement comprises: means mounting the heel wiping means to the back-up plate for movement about two axes that are at right angles to each other and that extend in directions that are substantially parallel to the plane of the heel wiping means.

52. The apparatus as defined in claim 50 wherein the means mounting the back-up plate to the slide arrangement comprises: a brace pivotally mounted to the slide arrangement for swinging movement about an axis that is transverse to the direction of movement of the heel wiping means in its heel wiping stroke; a strap located forwardly of the brace above the support arrangement; means pivotally mounting the back of the back-up plate to the brace and the front of the back-up plate to the strap for swinging movement about an axis that extends longitudinally of the direction of movement of the heel wiping means in its heel wiping stroke; and spring means interposed between the slide arrangement and the back-up plate and strap for floatingly mounting the back-up plate to the slide arrangement.

53. The apparatus as defined in claim 50 further comprising: toe wiping means located rearwardly of the support arrangement in registry with the toe and forepart portion of the insole; means mounting the toe wiping means for movement between a retracted position out of engagement with the insole and an advanced position beneath the toe and forepart position of the insole; means for initially maintaining the toe wiping means in its retracted position; and means for moving the toe wiping means from its retracted to its advanced position through a toe wiping stroke to wipe the toe and forepart portion of the upper margin against the insole.

54. The apparatus as defined in claim 53 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

55. The apparatus as defined in claim 50 further comprising: an upwardly directed heel rest located rearwardly of the heel wiping means in its retracted position and mounted to the slide arrangement for movement therewith, said heel rest being so constructed and arranged as to bear against the heel portion of the insole upon termination of said upwardly directed force and thereby support the heel portion of the shoe assembly during the heel wiping stroke.

56. The apparatus as defined in claim 55 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest for heightwise movement with respect to the slide arrangement; means for initially maintaining the heel rest in an upper position with respect to the slide arrangement in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, the slide arrangement and the heel wiping means so that the heel portion of the shoe assembly is held between the heel hold-down and the heel wiping means.

57. The apparatus as defined in claim 56 further comprising: brace means connected to the slide arrangement to partake of the rearward and upward movement of the slide arrangement; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

58. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate moveably mounted in the heel head for forward and rearward movement; a back-up arrangement pivoted to the slide plate for swinging movement about an axis that is transverse to said direction of forward and rearward movement and for movement in unison with the slide plate; adjusting means for adjusting the position of the back-up arrangement about said axis; substantially planar heel wiping means; means mounting the heel wiping means to the back-up arrangement for planar movement between a retracted position and an advanced position, said adjusting means serving to locate the heel wiping means in a plane that is substantially parallel to said particular plane; means for initially maintaining the heel wiping means in its retracted position; a rearwardly directed length sensing member mounted to the back-up arrangement and located above the heel wiping means; an upwardly directed height sensing member mounted to the back-up arrangement and located rearwardly of the length sensing member; means for initially maintaining the heel head in a lowered position and the slide plate in a forward position so that the heel wiping means is in a remote position, out of registry with the heel portion of the insole, that is forward of and lower than the heel portion of the insole; first powered means for moving the slide plate, in unison with the back-up arrangement and the heel wiping means, rearwardly from its forward position with the height sensing member moving beneath the heel portion of the shoe assembly; first control means responsive to the intersection of the length sensing member with the heel portion of the shoe assembly to cause the first powered means to terminate the rearward movement of the slide plate, the back-up arrangement and the heel wiping means; second powered means for applying an upwardly directed force to the heel head in unison with the slide plate, the back-up arrangement and the heel wiping means; means for actuating said second powered means subsequent to the termination of the rearward movement of the side plate, the back-up arrangement and the heel wiping means to cause the heel head in unison with the slide plate, the back-up arrangement and the heel wiping means to move upwardly from said lowered position; second control means actuable in response to the intersection of the height sensing member with the bottom of the shoe assembly to cause the second powered means to terminate the application of the upwardly directed force to thereby stop the upward movement of the heel head, the slide plate, the back-up arrangement and the heel wiping means, said length sensing member and height sensing member being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means from its retracted position to its advanced position through a heel wiping stroke to wipe the heel portion of the upper margin against the insole.

59. The apparatus as defined in claim 58 further comprising: a pivotal connection of the rear of the back-up arrangement to the rear of the slide plate; and wherein said adjusting means comprises: a cut-out in the back-up arrangement located forwardly of said pivotal connection; a cap so mounted in the cut-out as to enable the back-up arrangement to swing about said pivotal connection in response to heightwise movement of the cap; and means for effecting heightwise movement of the cap.

60. The apparatus as defined in claim 58 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

61. The apparatus as defined in claim 60 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

62. The apparatus as defined in claim 58 wherein the height sensing member is constituted as a heightwise extending pin; and further comprising: a heel rest mounted to the back-up arrangement for movement therewith; means mounting the height sensing pin for heightwise movement in the heel rest; spring means for yieldably urging the height sensing pin upwardly of the heel rest to a position wherein the top of the height sensing pin is above the top of the heel rest; wherein the application of said upwardly directed force to the heel head causes the height sensing pin upon its engagement with the insole to move downwardly with respect to the heel rest against the force of the spring means with the heel rest bearing against the heel portion of the insole; and wherein the second control means is so constructed as to be actuated in response to said downward movement of the height sensing pin with respect to the heel rest; whereby the heel rest is enabled to support the heel portion of the shoe assembly during the heel wiping stroke.

63. The apparatus as defined in claim 62 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest and the height sensing pin for heightwise movement with respect to the back-up arrangement; means for initially maintaining the heel rest and the height sensing pin in an upper position with respect to the back-up arrangement in which position the height sensing pin is caused to move into engagement with the insole and the heel rest is caused to bear against the insole; means, operative after the heel wiping means has commenced its heel wiping stroke and has moved under the insole, to lower the heel rest and height sensing pin from the insole thereby causing the spring means to again urge the height sensing pin upwardly of the heel rest; and means responsive to the urging of the height sensing pin upwardly of the heel rest to cause the second control means to resume the application of the upwardly directed force to the heel head, the slide plate and the heel wiping means so that the heel portion of the shoe assembly is held between the heel hold-down and the heel wiping means.

64. The apparatus as defined in claim 63 further comprising: brace means connected to the slide plate to partake of the rearward and upward movement of the slide plate; means mounting the heel hold-down for heightwise movement with respect to the brace means; means for initially maintaining the heel hold-down in an upper portion with respect to the brace means; and wherein the heel hold-down is caused to bear against the top of the heel portion of the shoe assembly by the provision of means for lowering the heel hold-down with respect to the brace means.

65. The apparatus as defined in claim 58 further comprising: a heel clamping pad mounted to the back-up arrangement above the heel wiping means; means for initially maintaining the pad in an open position so located as not to engage the heel portion of the shoe assembly during the upward movement of the heel head; and means, operative after the upward movement of the heel head has stopped and prior to the heel wiping stroke, to cause the pad to close on and bear against the heel portion of the shoe assembly.

66. A lasting apparatus as defined in claim 58 wherein said length sensing member constitutes a rearwardly directed pin; further comprising: means mounting the length sensing pin to the back-up arrangement for forward and rearward movement with respect to the back-up arrangement; yieldable means urging the length sensing pin rearwardly with respect to the back-up arrangement; and a control member, that is actuable in response to forward movement of the length sensing pin against the force of the yieldable means in response to engagement of the length sensing pin with the heel portion of the shoe assembly, for actuating said first control means.

67. The apparatus as defined in claim 58 further comprising: an upwardly directed heel rest located rearwardly of the heel wiping means in its retracted position and mounted to the back-up arrangement for movement therewith, said heel rest being so constructed and arranged as to bear against the heel portion of the insole upon termination of said upwardly directed force and thereby support the heel portion of the shoe assembly during the heel wiping stroke.

68. The apparatus as defined in claim 67 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest for heightwise movement with respect to the back-up arrangement; means for initially maintaining the heel rest in an upper position with respect to the back-up arrangement in which position the heel rest is caused to bear against the insole; means, operative after the heel wiping means has commenced its wiping stroke and has moved under the insole, to lower the heel rest from the insole; and means operative concomitantly with the lowering of the heel rest to cause the secured control means to resume the application of the upwardly directed force to the heel head, the slide plate, the back-up arrangement and the heel wiping means so that the heel portion of the shoe assembly is held between the heel hold-down and the heel wiping means.

69. The apparatus as defined in claim 68 further comprising: brace means connected to the slide plate to partake of the rearward and upward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

70. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; a back-up arrangement pivoted to the slide plate for swinging movement about an axis that is transverse to said direction of forward and rearward movement and for movement in unison with the slide plate; adjusting means for adjusting the position of the back-up arrangement about said axis; substantially planar heel wiping means; means mounting the heel wiping means to the back-up arrangement for planar movement between a retracted position and an advanced position, said adjusting means serving to locate the heel wiping means in a plane that is substantially parallel to said particular plane; means for initially maintaining the heel wiping means in its retracted position; means for initially maintaining the heel head in a lowered position and the slide plate in a remote position, out of registry with the heel portion of the insole, that is forward of and lower than the heel portion of the insole; first powered means for moving the slide plate, in unison with the back-up arrangement and the heel wiping means, rearwardly from its forward position; first control means to cause the first powered means to terminate the rearward movement of the slide plate, the back-up arrangement and the heel wiping means; second powered means for applying an upwardly directed force to the heel head in unison with the slide plate, the back-up arrangement and the heel wiping means; means for actuating said second powered means subsequent to the termination of the rearward movement of the slide plate, the back-up arrangement and the heel wiping means to cause the heel head in unison with the slide plate, the back-up arrangement and the heel wiping means to move upwardly from said lowered position; second control means to cause the second powered means to terminate the application of the upwardly directed force to thereby stop the upward movement of the heel head, the slide plate, the back-up arrangement and the heel wiping means; said first and second control means being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means from its retracted position to its advanced position through a heel wiping stroke to wipe the heel portion of the upper margin against the insole.

71. The apparatus as defined in claim 70 further comprising: a pivotal connection of the rear of the back-up arrangement to the rear of the slide plate; and wherein said adjusting means comprises: a cut-out in the back-up arrangement located forwardly of said pivotal connection; a cap so mounted in the cut-out as to enable the back-up arrangement to swing about said pivotal connection in response to heightwise movement of the cap; and means for effecting heightwise movement of the cap.

72. The apparatus as defined in claim 70 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

73. The apparatus as defined in claim 72 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

74. The apparatus as defined in claim 70 further comprising: an upwardly directed heel rest located rearwardly of the heel wiping means in its retracted position and mounted to the slide plate for movement therewith, said heel rest being so constructed and arranged as to bear against the heel portion of the insole upon termination of said upwardly direct force and thereby support the heel portion of the shoe assembly during the heel wiping stroke.

75. The apparatus as defined in claim 74 further comprising: a heel hold-down located above the shoe assembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the slide plate; means for initialy maintaining the heel rest in an upper position with respect to the slide plate in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, the slide plate, the back-up arrangement and the heel wiping means so that the heel portion of the shoe assembly is held between the heel hold-down and the heel wiping means.

76. The apparatus as defined in claim 75 further comprising: brace means connected to the slide plate to partake of the rearward and upward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

77. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; a back-up arrangement adapted to move in unison with the slide plate; heel wiping means adapted to lie in a plane that is substantially parallel to said particular plane; means mounting the heel wiping means to the back-up arrangement for substantially planar movement in a plane substantially parallel to said particular plane in a heel wiping stroke between a retracted forward position and an advanced rearward position; means mounting the back-up arrangement to the slide plate for swinging movement about an upright axis that is rearward of the heel wiping means in its retracted position; adjusting means for adjusting the position of the back-up arrangement together with the heel wiping means about said axis to thereby so position the heel wiping means that its zone of movement during the heel wiping stroke will be symmetrical with respect to the heel portion of the shoe assembly; means for initially maintaining the heel wiping means in its retracted position; a rearwardly directed length sensing member mounted to the back-up arrangement and located above the heel wiping means; an upwardly directed height sensing member mounted to the back-up arrangement and located rearwardly of the length sensing member; means for initially maintaining the heel head in a lowered position and the slide plate in a forward position so that the heel wiping means is in a remote position, out of registry with the heel portion of the insole, that is forward of and lower than the heel portion of the insole; first powered means for moving the slide plate, in unison with the back-up arrangement and the heel wiping means, rearwardly from its forward position with the height sensing member moving beneath the heel portion of the shoe assembly; first control means responsive to the intersection of the length sensing member with the heel portion of the shoe assembly to cause the first powered means to terminate the rearward movement of the slide plate, the back-up arrangement and the heel wiping means; second powered means for applying an upwardly directed force to the heel head in unison with the slide plate, the back-up arrangement and the heel wiping means; means for actuating the second powered means subsequent to the termination of the rearward movement of the slide plate, the back-up arrangement and the heel wiping means to cause the heel head, the slide plate, the back-up arrangement and the heel wiping means to move upwardly from said lowered position; second control means actuable in response to the intersection of the height sensing member with the bottom of the shoe assembly to cause the second powered means to terminate the application of the upwardly directed force to thereby stop the upward movement of the heel head, the slide plate, the back-up arrangement and the heel wiping means; said length sensing member and height sensing member being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means through a heel wiping stroke to wipe the heel portion of the upper margin against the insole.

78. The apparatus as defined in claim 77 wherein the means mounting the back-up arrangement to the slide plate comprises: a plurality of curved slots in the slide plate having a common center of curvature that coincides with said upright axis; a guide member that is movably received in each slot; and means connecting each guide member to the back-up arrangement.

79. The apparatus as defined in claim 77 wherein said adjusting means comprises: a rod located on each side of the back-up arrangement; means pivotally connecting the rear of each rod to a side of the back-up arrangement; drive means actuable to concomitantly move one of the rods forwardly and the other of the rods rearwardly; and stop means to limit the extent the rods may be moved in response to the actuation of the drive means.

80. The apparatus as defined in claim 79 wherein said stop means comprises: a pair of spaced stop elements; a plunger mounted for movement between the stop elements; and means connecting the plunger to the back-up arrangement.

81. The apparatus as defined in claim 77 wherein said adjusting means comprises: a reversible motor located on each side of the back-up arrangement, each motor incorporating a rod that is movable in response to actuation of the motor; means pivotally connecting the rear of each rod to a side of the back-up arrangement; control means for the motors actuatable to cause the motors to concomitantly move one rod forwardly and the other rod rearwardly; a pair of spaced stop elements; a plunger mounted for movement between the stop elements; and means connecting the plunger to the back-up arrangement.

82. The apparatus as defined in claim 77 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

83. The appartus as defined in claim 82 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the fore part and toe of the last.

84. The apparatus as defined in claim 77 wherein the height sensing member is constituted as a heightwise extending pin; and further comprising: a heel rest mounted to the back-up arrangement for movement therewith; means mounting the height sensing pin for heightwise movement in the heel rest; spring means for yieldably urging the height sensing pin upwardly of the heel rest to a position wherein the top of the height sensing pin is above the top of the heel rest; wherein the application of said upwardly directed force to the heel head causes the height sensing pin upon its engagement with the insole to move downwardly with respect to the heel rest against the force of the spring means with the heel rest bearing against the heel portion of the insole; and wherein the second control means is so constructed as to be actuated in response to said downward movement of the height sensing pin with respect to the heel rest; whereby the heel rest is enabled to support the heel portion of the shoe assembly during the heel wiping stroke.

85. The apparatus as defined in claim 84 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest and the height sensing pin for heightwise movement with respect to the slide plate; means for initially maintaining the heel rest and the height sensing pin in an upper position with respect to the back-up arrangement in which position the height sensing pin is caused to move into engagement with the insole and the heel rest is caused to bear against the insole; means, operative after the heel wiping means has commenced its heel wiping stroke and has moved under the insole, to lower the heel rest and height sensing pin from the insole thereby causing the spring means to again urge the height sensing pin upwardly of the heel rest; and means responsive to the urging of the height sensing pin upwardly of the heel rest to cause the second control means to resume the application of the upwardly directed force to the heel head, the slide plate, the back-up arrangement and the heel wiping means so that the heel portion of the shoe assembly is held between the heel hold-down and the heel wiping means.

86. The apparatus as defined in claim 85 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

87. The apparatus as defined in claim 77 further comprising: a heel clamping pad mounted to the back-up arrangement above the heel wiping means; means for initially maintaining the pad in an open position so located as not to engage the heel portion of the shoe assembly during the upward movement of the heel head; and means, operative after the upward movement of the heel head has stopped and prior to the heel wiping stroke, to cause the pad to close on and bear against the heel portion of the shoe assembly.

88. A lasting apparatus as defined in claim 77 wherein said length sensing member constitutes a rearwardly directed pin; further comprising: means mounting the length sensing pin to the back-up arrangement for forward and rearward movement with respect to the back-up arrangement; yieldable means urging the length sensing pin rearwardly with respect to the back-up arrangement; and a control member, that is actuable in response to forward movement of the length sensing pin against the force of the yieldable means in response to engagement of the length sensing pin with the heel portion of the shoe assembly, for actuating said first control means.

89. The apparatus as defined in claim 77 further comprising: an upwardly directed heel rest located rearwardly of the heel wiping means in its retracted position and mounted to the back-up arrangement for movement therewith, said heel rest being so constructed and arranged as to bear against the heel portion of the insole upon termination of said upwardly directed force and thereby support the heel portion of the shoe assembly during the heel wiping stroke.

90. The apparatus as defined in claim 89 further comprising: a heel hold-down located above the shoe assembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the back-up arrangement; means for initially maintaining the heel rest in an upper position with respect to the back-up arrangement in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, the slide plate, the back-up arrangement and the heel wiping means so that the heel portion of the shoe assembly is held between the heel hold-down and the heel wiping means.

91. The apparatus as defined in claim 90 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

92. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; a back-up arrangement adapted to move in unison with the slide plate; heel wiping means adapted to lie in a plane that is substantially parallel to said particular plane; means mounting the heel wiping means to the back-up arrangement for substantially planar movement in a plane substantially parallel to said particular plane in a heel wiping stroke between a retracted forward position and an advanced rearward position; means mounting the back-up arrangement to the slide plate for swinging movement about an upright axis that is rearward of the heel wiping means in its retracted position; adjusting means for adjusting the position of the back-up arrangement together with the heel wiping means about said axis to thereby so position the heel wiping means that its zone of movement during the heel wiping stroke will be symmetrical with respect to the heel portion of the shoe assembly; means for initially maintaining the heel wiping means in its retracted position; means for initially maintaining the heel head in a lowered position and the slide plate in a forward position so that the heel wiping means is in a remote position, out of registry with the heel portion of the insole, that is forward of and lower than the heel portion of the insole; first powered means for moving the slide plate, in unison with the back-up arrangement and the heel wiping means, rearwardly from its forward position; first control means to cause the first powered means to terminate the rearward movement of the slide plate, the back-up arrangement and the heel wiping means; second powered means for applying an upwardly directed force to the heel head in unison with the slide plate, the back-up arrangement and the heel wiping means; means for actuating said second powered means subsequent to the termination of the rearward movement of the slide plate, the back-up arrangement and the heel wiping means to cause the heel head, the slide plate, the back-up arrangement and the heel wiping means to move upwardly from said lowered position; second control means to cause the second powered means to terminate the application of the upwardly directed force to thereby stop the upward movement of the heel head, the slide plate, the back-up arrangement and the heel wiping means; said first and second control means being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the wiping means through a heel wiping stroke to wipe the heel portion of the upper margin against the insole.

93. The apparatus as defined in claim 92 wherein the means mounting the back-up arrangement to the slide plate comprises: a plurality of curved slots in the slide plate having a common center of curvature that coincides with said upright axis; a guide member that is movably received in each slot; and means connecting each guide member to the back-up arrangement.

94. The apparatus as defined in claim 92 wherein said adjusting means comprises: a rod located on each side of the back-up arrangement; means pivotally connecting the rear of each rod to a side of the back-up arrangement; drive means actuable to concomitantly move one of the rods forwardly and the other of the rods rearwardly; and stop means to limit the extent the rods may be moved in response to the actuation of the drive means.

95. The apparatus as defined in claim 94 wherein said stop means comprises: a pair of spaced stop elements; a plunger mounted for movement between the stop elements; and means connecting the plunger to the back-up arrangement.

96. The apparatus as defined in claim 92 wherein said adjusting means comprises: a reversible motor located on each side of the back-up arrangement, each motor incorporating a rod that is movable in response to actuation of the motor; means pivotally connecting the rear of each rod to a side of the back-up arrangement; control means for the motors actuable to cause the motors to concomitantly move one rod forwardly and the other rod rearwardly; a pair of spaced stop elements; a plunger mounted for movement between the stop elements; and means connecting the plunger to the back-up arrangement.

97. The apparatus as defined in claim 92 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

98. The apparatus as defined in claim 97 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

99. The apparatus as defined in claim 92 further comprising: an upwardly directed heel rest located rearwardly of the heel wiping means in its retracted position and mounted to the slide plate for movement therewith, said heel rest being so constructed and arranged as to bear against the heel portion of the insole upon termination of said upwardly directed force and thereby support the heel portion of the shoe assembly during the heel wiping stroke.

100. The apparatus as defined in claim 99 further comprising: a heel hold-down located above the shoe asembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the slide plate; means for initially maintaining the heel rest in an upper position with respect to the slide plate in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, the slide plate, the back-up arrangement and the heel wiping means so that the heel wiping portion of the shoe assembly is held between the heel hold-down and the heel wiping means.

101. The apparatus as defined in claim 100 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

102. A lasting aparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; an adjustment plate pivoted to the slide plate for swinging movement about a first axis that is transverse to said direction of forward and rearward movement and for movement in unison with the slide plate; first adjusting means for adjusting the position of the adjustment plate about said first axis; a back-up plate located above the adjustment plate; means mounting the back-up plate to the adjustment plate so as to provide for limited universal movement of the back-up plate with respect to the adjustment plate and so as to partake of the forward and rearward movement of the slide plate and adjustment plate; heel wiping means; means mounting the heel wiping means to the back-up plate for planar movement in a heel wiping stroke between a retracted forward position and an advanced rearward position, said first adjusting means serving to locate the heel wiping means in a plane that is substantially parallel to said particular plane; means mounting the adjustment plate to the slide plate for swinging movement about a second upright axis that is rearward of the heel wiping means in its retracted position; second adjusting means for adjusting the position of the adjustment plate together with the back-up plate and the heel wiping means about said second axis to thereby so position the heel wiping means that its zone of movement during the heel wiping stroke will be symmetrical with respect to the heel portion of the shoe assembly; means for initially maintaining the heel wiping means in its retracted position; a rearwardly directed length sensing member mounted to the back-up plate and located above the heel wiping means; an upwardly directed height sensing member mounted to the adjustment plate and located rearwardly of the length sensing member; means for initially maintaining the heel head in a lowered position and the slide plate in a forward position so that the heel wiping means is in a remote position, out of registry with the heel portion of the insole, that is forward of and lower than the heel portion of the insole; first powered means for moving the slide plate, in unison with the adjustment plate, the back-up plate and the heel wiping means, rearwardly from its forward position with the height sensing member moving beneath the heel portion of the shoe assembly; first control means responsive to the intersection of the length sensing member with the heel portion of the shoe assembly to cause the first powered means to terminate the rearward movement of the slide plate, the adjustment plate, the back-up plate and the heel wiping means; second powered means for applying an upwardly directed force to the heel head in unison with the slide plate, the adjustment plate, the back-up plate and the heel wiping means; means for actuating the second powered means subsequent to the termination of the rearward movement of the slide plate, the adjustment plate, the back-up plate and the heel wiping means to cause the heel head, the slide plate, the adjustment plate, the back-up plate and the heel wiping means to move upwardly from said lowered position; second control means actuable in response to the intersection of the height sensing member with the bottom of the shoe assembly to cause the second powered means to terminate the application of the upwardly directed force to thereby stop the upward movement of the heel head, the slide plate, the adjustment plate, the back-up plate and the heel wiping means; said length sensing member and height sensing member being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means through a heel wiping stroke to wipe the heel portion of the upper margin against the insole, said means mounting the back-up plate to the adjustment plate enabling the heel wiping means to conform precisely to the plane of the heel portion of the shoe assembly bottom.

103. The apparatus as defined in claim 102 wherein the means mounting the back-up plate to the adjustment plate comprises: means enabling the back-up plate to have movement with respect to the adjustment plate about two axes that are at right angles to each other and that extend in directions that are substantially parallel to the plane of the heel wiping means.

104. The apparatus as defined in claim 102 wherein the means mounting the back-up plate to the adjustment plate comprises: a brace pivotally mounted to the adjustment plate for swinging movement about the axis that is transverse to the direction of movement of the heel wiping means in its heel wiping stroke; a strap located forwardly of the brace above the adjustment plate; means pivotally mounting the back of the back-up plate to the brace and the front of the back-up plate to the strap for swinging movement about an axis that extends longitudinally of the direction of movement of the heel wiping means in its heel wiping stroke; and spring means interposed between the adjustment plate and the back-up plate and strap for floatingly mounting the back-up plate to the adjustment plate.

105. The apparatus as defined in claim 102 further comprising: a pivotal connection of the rear of the adjustment plate to the rear of the slide plate; and wherein said adjusting means comprises: a cut-out in the adjustment plate located forwardly of said pivoted connection; a cap so mounted in the cut-out as to enable the adjustment plate to swing about said pivotal connection in response to heightwise movement of the cap; and means for effecting heightwise movement of the cap.

106. The apparatus as defined in claim 102 wherein the means mounting the adjustment plate to the slide plate comprises: a plurality of curved slots in the slide plate having a common center of curvature that coincides with said second axis; a guide member that is movably received in each slot; and means connecting each guide member to the adjustment plate.

107. The apparatus as defined in claim 102 wherein said second adjusting means comprises: a rod located on each side of the adjustment plate; means pivotally connecting the rear of each rod to a side of the adjustment plate; drive means actuable to concomitantly move one of the rods forwardly and the other of the rods rearwardly; and stop means to limit the extent the rods may be moved in response to the actuation of the drive means.

108. The apparatus as defined in claim 107 wherein said stop means comprises: a pair of spaced stop elements; a plunger mounted for movement between the stop elements; and means connecting the plunger to the adjustment plate.

109. The apparatus as defined in claim 102 wherein said second adjusting means comprises: a reversible motor located on each side of the adjustment plate; each motor incorporating a rod that is movable in response to actuation of the motor; means pivotally connecting the rear of each rod to a side of the adjustment plate; control means for the motors actuable to cause the motors to concomitantly move one rod forwardly and the other rod rearwardly; a pair of spaced stop elements; a plunger mounted for movement between the stop elements; and means connecting the plunger to the adjustment plate.

110. The apparatus as defined in claim 102 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

111. The apparatus as defined in claim 110 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

112. The apparatus as defined in claim 102 wherein the height sensing member is constituted as a heightwise extending pin; and further comprising: a heel rest mounted to the adjustment plate for movement therewith; means mounting the height sensing pin for heightwise movement in the heel rest; spring means for yieldably urging the height sensing pin upwardly of the heel rest to a position wherein the top of the height sensing pin is above the top of the heel rest; wherein the application of said upwardly directed force to the heel head causes the height sensing pin upon its engagement with the insole to move downwardly with respect to the heel rest against the force of the spring means with the heel rest bearing against the heel portion of the insole; and wherein the second control means is so constructed as to be actuated in response to said downward movement of the height sensing pin with respect to the heel rest; whereby the heel rest is enabled to support the heel portion of the shoe assembly during the heel wiping stroke.

113. The apparatus as defined in claim 112 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest and the height sensing pin for heightwise movement with respect to the adjustment plate; means for initially maintaining the heel rest and the height sensing pin in an upper position with respect to the adjustment plate in which position the height sensing pin is caused to move into engagement with the insole and the heel rest is caused to bear against the insole; means, operative after the heel wiping means has commenced its heel wiping stroke and has moved under the insole, to lower the heel rest and height sensing pin from the insole thereby causing the spring means to again urge the height sensing pin upwardly of the heel rest; and means responsive to the urging of the height sensing pin upwardly of the heel rest to cause the second control means to resume the application of the upwardly directed force to the heel head, the slide plate, the adjustment plate, the back-up plate and the heel wiping means so that the heel portion of the shoe assembly is held between the heel hold-down and the heel wiping means.

114. The apparatus as defined in claim 113 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

115. The apparatus as defined in claim 102 further comprising: a heel clamping pad mounted to the back-up plate above the heel wiping means; means for initially maintaining the pad in an open position so located as not to engage the heel portion of the shoe assembly during the upward movement of the heel head; and means, operative after the upward movement of the heel head has stopped and prior to the heel wiping stroke, to cause the pad to close on and bear against the heel portion of the shoe assembly.

116. A lasting apparatus as defined in claim 102 wherein said length sensing member constitutes a rearwardly directed pin; further comprising: means mounting the length sensing pin to the back-up plate for forward and rearward movement with respect to the back-up plate; yieldable means urging the length sensing pin rearwardly with respect to the back-up plate; and a control member, that is actuable in response to forward movement of the length sensing pin against the force of the yieldable means in response to engagement of the length sensing pin with the heel portion of the shoe assembly, for actuating said first control means.

117. The apparatus as defined in claim 102 further comprising: an upwardly directed heel rest located rearwardly of the heel wiping means in its retracted position and mounted to the adjustment plate for movement therewith, said heel rest being so constructed and arranged as to bear against the heel portion of the insole upon termination of said upwardly directed force and thereby support the heel portion of the shoe assembly during the heel wiping stroke.

118. The apparatus as defined in claim 117 further comprising: a heel hold-down located above the shoe assembly; means, operative after the arrival of the wiping means in said wiping position and prior to the heel wiping stroke, to cause the heel hold-down to bear against the top of the heel portion of the shoe assembly; means mounting the heel rest for heightwise movement with respect to the adjusment plate; means for initially maintaining the heel rest in an upper position with respect to the adjustment plate in which position the heel rest is caused to bear against the insole; means, operative after the heel wiping means has commenced its wiping stroke and has moved under the insole, to lower the heel rest from the insole; and means operative concomitantly with the lowering of the heel rest to cause the second control means to resume the application of the upwardly directed force to the heel head, the slide plate, the adjustment plate, the back-up plate and the heel wiping means so that the heel portion of the shoe assembly is held between the heel hold-down and the heel wiping means.

119. The apparatus as defined in claim 118 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

120. A lasting apparatus comprising: a support arrangement for supporting bottom-down a shoe assembly, that comprises a last having an insole located on its bottom and an upper mounted thereon with at least the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a heel head located forwardly of the support arrangement; means mounting the heel head for heightwise movement; a slide plate movably mounted in the heel head for forward and rearward movement; an adjustment plate pivoted to the slide plate for swinging movement about a first axis that is transverse to said direction of forward and rearward movement and for movement in unison with the slide plate; first adjusting means for adjusting the position of the adjustment plate about said first axis; a back-up plate located above the adjustment plate; means mounting the back-up plate to the adjustment plate so as to provide for limited universal movement of the back-up plate with respect to the adjustment plate and so as to partake of the forward and rearward movement of the slide plate and adjustment plate; heel wiping means; means mounting the heel wiping means to the back-up plate for planar movement in a heel wiping stroke between a retracted forward position and an advanced rearward position, said first adjusting means serving to locate the heel wiping means in a plane that is substantially parallel to said particular plane; means mounting the adjustment plate to the slide plate for swinging movement about a second upright axis that is rearward of the heel wiping means in its retracted position; second adjusting means for adjusting the position of the adjustment plate together with the back-up plate and the heel wiping means about said second axis to thereby so position the heel wiping means that its zone of movement during the heel wiping stroke will be symmetrical with respect to the heel portion of the shoe assembly; means for initially maintaining the heel wiping means in its retracted position; means for initially maintaining the heel head in a lowered position and the slide plate in a forward position so that the heel wiping means is in a remote position, out of registry with the heel portion of the insole, that is forward of and lower than the heel portion of the insole; first powered means for moving the slide plate, in unison with the adjustment plate, the back-up plate and the heel wiping means, rearwardly from its forward position; first control means to cause the first powered means to terminate the rearward movement of the slide plate, the adjustment plate, the back-up plate and the heel wiping means; second powered means for applying an upwardly directed force to the heel head in unison with the slide plate, the adjustment plate, the back-up plate and the heel wiping means; means for actuating the second powered means subsequent to the termination of the rearward movement of the slide plate, the adjustment plate, the back-up plate and the heel wiping means to cause the heel head, the slide plate, the adjustment plate, the back-up plate and the heel wiping means to move upwardly from said lowered position; second control means to cause the second powered means to terminate the application of the upwardly directed force to thereby stop the upward movement of the heel head, the slide plate, the adjustment plate, the back-up plate and the heel wiping means; said first and second control means being so constructed and arranged that at the termination of said upward movement the heel wiping means is in a wiping position that is adjacent to the heel portion of the shoe assembly, that is in registry with the heel portion of the insole and that is maintained in a plane substantially parallel to said particular plane; and means for thereafter moving the heel wiping means through a heel wiping stroke to wipe the heel portion of the upper margin against the insole, said means mounting the back-up plate to the adjustment plate enabling the heel wiping means to conform precisely to the plane of the heel portion of the shoe assembly bottom.

121. The apparatus as defined in claim 120 wherein the means mounting the back-up plate to the adjustment plate comprises: means enabling the back-up plate to have movement with respect to the adjustment plate about two axes that are at right angles to each other and that extend in directions that are substantially parallel to the plane of the heel wiping means.

122. The apparatus as defined in claim 120 wherein the means mounting the back-up plate to the adjustment plate comprises: a brace pivotally mounted to the adjustment plate for swinging movement about an axis that is transverse to the direction of movement of the heel wiping means in its heel wiping stroke; a strap located forwardly of the brace above the adjustment plate; means pivotally mounting the back of the back-up plate to the brace and the front of the back-up plate to the strap for swiging movement about an axis that extends longitudinally of the direction of movement of the heel wiping means in its heel wiping stroke; and spring means interposed between the adjustment plate and the back-up plate and strap for floatingly mounting the back-up plate to the adjustment plate.

123. The apparatus as defined in claim 120 further comprising: a pivotal connection of the rear of the adjustment plate to the rear of the slide plate; and wherein said adjusting means comprises: a cut-out in the adjustment plate located forwardly of said pivotal connection; a cap so mounted in the cut-out as to enable the adjustment plate to swing about said pivotal connection in response to heightwise movement of the cap; and means for effecting heightwise movement of the cap.

124. The apparatus as defined in claim 120 wherein the means mounting the adjustment plate to the slide plate comprises: a plurality of curved slots in the slide plate having a common center of curvature that coincides with said second axis; a guide member that is movably received in each slot; and means connecting each guide member to the adjustment plate.

125. The apparatus as defined in claim 120 wherein said second adjusting means comprises: a rod located on each side of the adjustment plate; means pivotally connecting the rear of each rod to a side of the adjustment plate; drive means actuable to concomitantly move one of the rods forwardly and the other of the rods rearwardly; and stop means to limit the extent of the rods may be moved in resonse to the actuation of the drive means.

126. The apparatus as defined in claim 125 wherein said stop means comprises: a pair of spaced stop elements; a plunger mounted for movement between the stop elements; and means connecting the plunger to the adjustment plate.

127. The apparatus as defined in claim 120 wherein said second adjusting means comprises: a reversible motor located on each side of the adjustment plate, each motor incorporating a rod that is movable in response to actuation of the motor; means pivotally connecting the rear of each rod to a side of the adjustment plate; control means for the motors actuable to cause the motors to concomitantly move one rod forwardly and the other rod rearwardly; a pair of spaced stop elements; a plunger mounted for movement between the stop elements; and means connecting the plunger to the adjustment plate.

128. The apparatus as defined in claim 120 further comprising: toe wiping means located rearwardly of the support arrangement in registry with the toe and forepart portion of the insole; means mounting the toe wiping means for movement between a retracted position out of engagement with the insole and an advanced position beneath the toe and forepart portion of the insole; means for initially maintaining the toe wiping means in its retracted position; and means for moving the toe wiping means from its retracted to its advanced position through a toe wiping stroke to wipe the toe and forepart portion of the upper margin against the insole.

129. The apparatus as defined in claim 128 further comprising: means, operative prior to any of said wiping strokes, for stretching the upper tightly about the last in such a manner that the upper is pulled in a heel to toe direction to stretch the upper about the heel of the last and is also pulled downwardly about the forepart and toe of the last to stretch the upper about the forepart and toe of the last.

130. The apparatus as defined in claim 120 further comprising: an upwardly directed heel rest located rearwardly of the heel wiping means in its retracted position and mounted to the adjustment plate for movement therewith, said heel rest being so constructed and arranged as to bear against the heel portion of the insole upon termination of said upwardly directed force and thereby support the heel portion of the shoe assembly during the heel wiping stroke.

131. The apparatus as defined in claim 130 further comprising: a heel hold-down located above the shoe assembly; means, operative after the arrival of the heel wiping means in said wiping position and prior to the heel wiping stroke, to cause the heel hold-down to bear against the top of the heel portion of the shoe assembly; means mounting the heel rest for heightwise movement with respect to the slide plate; means for initially maintaining the heel rest in an upper position with respect to the slide plate in which position the heel rest is caused to bear against the insole; means, operative after the heel wiping means has commenced its wiping stroke and has moved under the insole, to lower the heel rest from the insole; and means operatively concomitantly with the lowering of the heel rest to cause the second control means to resume the application of the upwardly directed force to the heel head, the slide plate, the adjustment plate, the back-up plate and the heel wiping means so that the heel portion of the shoe assembly is held between the heel hold-down and the heel wiping means.

132. The apparatus as defined in claim 131 further comprising: brace means connected to the slide plate to partake of the rearward and forward movement of the slide plate; means mounting the heel hold-down for heightwise movement with respect to the brace means; means for initially maintaining the heel hold-down in an upper position with respect to the brace means; and wherein the heel hold-down is caused to bear against the top of the heel portion of the shoe assembly by the provision of means for lowering the heel hold-down with respect to the brace means.

133. A lasting apparatus comprising: a support arrangement for supporting bottom-down a shoe assembly, that comprises a last having an insole located on its bottom and an upper mounted thereon, with a selected portion of the upper margin extending downwardly of the corresponding portion of the insole in such a manner that said portion of the insole substantially lies in a particular plane; a primary arrangement; a back-up plate located above the primary arrangement; means mounting the back-up plate to the primary arrangement so as to provide for limited universal movement of the back-up plate with respect to the primary arrangement; wiping means adapted to lie in a plane that is substantially parallel to said particular plane; means mounting the wiping means to the back-up plate for substantially planar movement in a plane substantially parallel to said particular plane between a retracted position and an advanced position; means for initially maintaining the wiping means in its retracted position in a wiping position that is adjacent to said portion of the shoe assembly, that is in registry with said portion of the insole and that is maintained in a plane substantially parallel to said particular plane; and means for thereafter moving the wiping means from its retracted to its advanced position through a wiping stroke to wipe said upper margin portion against said insole portion, said means mounting the back-up plate to the primary arrangement enabling the wiping means during the wiping stroke to conform precisely to the plane of said portion of the insole.

134. The apparatus as defined in claim 133 wherein the means mounting the back-up plate to the primary arrangement comprises: means mounting the back-up plate to the primary arrangement for movement about two axes that are at right angles to each other and that extend in directions that are substantially parallel to the plane of the wiping means.

135. The apparatus as defined in claim 133 wherein the means mounting the back-up plate to the primary arrangement comprises: a brace pivotally mounted to the primary arrangement for swinging movement about an axis that is transverse to the direction of movement of the wiping means in its wiping stroke; a strap located forwardly of the brace above the primary arrangement; means pivotally mounting the back of the back-up plate to the brace and the front of the back-up plate to the strap for swinging movement about an axis that extends longitudinally of the direction of movement of the wiping means in its wiping stroke; and spring means interposed between the primary arrangement and the back-up plate and strap for floatingly mounting the back-up plate to the primary arrangement.

136. A lasting appaartus comprising: a support arrangement for supporting bottom-down a shoe assembly, that comprises a last having an insole located on its bottom and an upper mounted thereon, with a selected portion of the upper margin extending downwardly of the corresponding portion of the insole in such a manner that said portion of the insole substantially lies in a particular plane; a primary plate; a back-up arrangement pivoted to the primary plate for swinging movement about a prone axis; adjusting means for adjusting the position of the back-up arrangement about said axis; substantially planar wiping means; means mounting the wiping means to the back-up arrangement for planar movement in a direction transverse to said axis between a retracted position and an advanced position, said adjusting means serving to locate the wiping means in a plane that is substantially parallel to said particular plane; means for initially maintaining the wiping means in its retracted position in a wiping position that is adjacent to said portion of the shoe assembly, that is in registry with said portion of the insole and that is maintained in a plane substantially parallel to said particular plane; and means for thereafter moving the wiping means from its retracted position to its advanced position through a wiping stroke to wipe said portion of the upper margin against the insole.

137. The apparatus as defined in claim 136 further comprises: a pivotal connection of the rear of the back-up arrangement to the rear of the primary plate; and wherein said adjusting means comprises: a cut-out in the back-up arrangement located forwardly of said pivotal connection; a cap so mounted in the cut-out as to enable the back-up arrangement to swing about said pivotal connection in respose to heightwise movement of the cap; and means for effecting heightwise movement of the cap.

138. A lasting apparatus comprising: a support arrangement for supporting bottom-down a shoe assembly, that comprises a last having an insole located on its bottom and an upper mounted thereon with the heel portion of the upper margin extending downwardly of the insole, in such a manner that the forepart portion of the shoe assembly bottom substantially lies in a predetermined location and the heel portion of the shoe assembly bottom extends forwardly of said forepart portion and substantially lies in a particular plane; a primary plate; a back-up arrangement; heel wiping means adapted to lie in a plane that is substantially parallel to said particular plane; means mounting the heel wiping means to the back-up arrangement for substantially planar movement in a plane substantially parallel to said particular plane in a heel wiping stroke between a retracted forward position and an advanced rearward position; means mounting the back-up arrangement to the primary plate for swinging movement about an upright axis that is rearward of the heel wiping means in its retracted position; adjusting means for adjusting the position of the back-up arrangement together with the heel wiping means about said axis to thereby so position the heel wiping means that its zone of movement during the heel wiping stroke will be symmetrical with respect to the heel portion of the shoe assembly; means for initially maintaining the heel wiping means in its retracted position in a wiping position that is adjacent to the heel portion of the shoe assembly, that is in registry with the heel portion of the insole and that is maintained in a plane substantially parallel to said particular plane; and means for thereafter moving the wiping means through a heel wiping stroke to wipe the heel portion of the upper margin against the insole.

139. The apparatus as defined in claim 138 wherein the means mounting the back-up arrangement to the primary plate comprises: a plurality of curved slots in the primary plate having a common center of curvature that coincides with said upright axis; a guide member that is movably received in each slot; and means connecting each guide member to the back-up arrangement.

140. The apparatus as defined in claim 138 wherein said adjusting means comprises: a rod located on each side of the back-up arrangement; means pivotally connecting the rear of each rod to a side of the back-up arrangement; drive means actuable to concommitantly move one of the rods forwardly and the other of the rods rearwardly; and stop means to limit the extent the rods may be moved in response to the actuation of the drive means.

141. The apparatus as defined in claim 140 wherein said stop means comprises: a pair of spaced stop elements; a plunger mounted for movement between the stop elements; and means connecting the plunger to the back-up arrangement.

142. The apparatus as defined in claim 138 wherein said adjusting means comprises: a reversible motor located on each side of the back-up arrangement; each motor incorporating a rod that is movable in response to actuation of the motor; means pivotally connecting the rear of each rod to a side of the back-up arrangement; control means for the motors actuable to cause the motors to concomitantly move one rod forwardly and the other rod rearwardly; a pair of spaced stop elements; a plunger mounted for movement between the stop elements; and means connecting the plunger to the back-up arrangement.

143. A lasting apparatus comprising: a support arrangement for supporting bottom-down a shoe assembly, that comprises a last having an insole located on its bottom and an upper mounted thereon with the heel portion of the upper margin extending downwardly of the insole, in such a manner that the forepart portion of the shoe assembly substantially lies in a predetermined location and the heel portion of the shoe assembly bottom extends forwardly of said forepart portion and substantially lies in a particular plane; a primary plate; an adjustment plate pivoted to the primary plate for swinging movement about a first prone axis; first adjusting means for adjusting the position of the adjustment plate about said first axis; a back-up plate located above the adjustment plate; means mounting the back-up plate to the adjustment plate so as to provide for limited universal movement of the back-up plate with respect to the adjustment plate; heel wiping means; means mounting the heel wiping means to the back-up plate for planar movement in a heel wiping stroke between a retracted forward position and an advanced rearward position, said first adjusting means serving to locate the heel wiping means in a plane that is substantially parallel to said particular plane; means mounting the adjustment plate to the primary plate for swinging movement about a second upright axis that is rearward of the heel wiping means in its retracted position; second adjusting means for adjusting the position of the adjustment plate together with the back-up plate about said second axis to thereby so position the heel wiping means that its zone of movement during the heel wiping stroke will be symmetrical with respect to the heel portion of the shoe assembly; means for initially maintaining the heel wiping means in its retracted position in a wiping position that is adjacent to the heel portion of the shoe assembly, that is in registry with the heel portion of the insole and that is maintained in a plane substantially parallel to said particular plane; and means for thereafter moving the heel wiping means through a heel wiping stroke to wipe the heel portion of the upper margin against the insole, said means mounting the back-up plate to the adjustment plate enabling the heel wiping means to conform precisely to the plane of the heel portion of the shoe assembly bottom.

144. The apparatus as defined in claim 143 wherein the means mounting the back-up plate to the adjustment plate comprises: means enabling the back-up plate to have movement with respect to the adjustment plate about two axes that are at right angles to each other and that extend in directions that are substantially parallel to the plane of the heel wiping means.

145. The apparatus as defined in claim 143 wherein the means mounting the back-up plate to the adjustment plate comprises: a brace pivotally mounted to the adjustment plate for swinging movement about an axis that is transverse to the direction of movement of the heel wiping means in its heel wiping stroke; a strap located forwardly of the brace above the adjustment plate; means pivotally mounting the back of the back-up plate to the brace and the front of the back-up plate to the strap for swinging movement about an axis that extends longitudinally of the direction of movement of the heel wiping means in its heel wiping stroke; and spring means interposed between the adjustment plate and the back-up plate and strap for floatingly mounting the back-up plate to the adjustment plate.

146. The apparatus as defined in claim 143 further comprising: a pivotal connection of the rear of the adjustment plate to the rear of the primary plate; and wherein said first adjusting means comprises: a cut-out in the adjustment plate located forwardly of said pivotal connection; a cap so mounted in the cut-out as to enable the adjustment plate to swing about said pivotal connection in response to heightwise movement of the cap; and means for effecting heightwise movement of the cap.

147. The apparatus as defined in claim 143 wherein the means mounting the adjustment plate to the primary plate comprises: a plurality of curved slots in the primary plate having a common center of curvature that coincides with said second axis; a guide member that is movably received in each slot; and means connecting each guide member to the adjustment plate.

148. The apparatus as defined in claim 143 wherein said second adjusting means comprises: a rod located on each side of the adjustment plate; means pivotally connecting the rear of each rod to a side of the adjustment plate; drive means actuable to concomitantly move one of the rods forwardly and the other of the rods rearwardly; and stop means to limit the extent the rods may be moved in response to the actuation of the drive means.

149. The apparatus as defined in claim 148 wherein said stop means comprises: a pair of spaced stop elements; a plunger mounted for movement between the stop elements; and means connecting the plunger to the adjustment plate.

150. The apparatus as defined in claim 143 wherein said second adjusting means comprises: a reversible motor located on each side of the adjustment plate, each motor incorporating a rod that is movable in response to actuation of the motor; means pivotally connecting the rear of each rod to a side of the adjustment plate; control means for the motors actuable to cause the motors to concomitantly move one rod forwardly and the other rod rearwardly; a pair of spaced stop elements; a plunger mounted for movement between the stop elements; and means connecting the plunger to the adjustment plate.

151. A shank lasting apparatus comprising: a support arrangement for supporting bottom-down a shoe assembly that comprises an upper mounted on a last and an insole located on the last bottom with a shank portion of the shoe assembly including a shank portion of the upper margin extending downwardly of the corresponding shank portion of the insole; a mount located outwardly of said shank portion of the shoe assembly; a shank wiper mounted to the mount for oscillation about an axis that extends toward said shank portion of the shoe assembly and for movement in a shank wiping stroke between an outer position outward of said shank portion of the shoe assembly and on inner position beneath said shank portion of the insole; spring means so constructed as to yieldably urge the shank wiper about said axis to a median position and to enable the shank wiper to oscillate against the force of the spring means to either side of said median position; means for initially maintaining the shank wiper in its outer position; and means for imparting a shank wiping stroke to the shank wiper so that the shank wiper will intersect said portion of the upper and wipe it against said portion of the insole with the spring means enabling the shank wiper to oscillate about said axis and conform to the plane of said insole portion.

152. The apparatus as defined in claim 151 wherein said means mounting the shank wiper to the mount comprises: a wiper support mounted to the mount for oscillation about said axis; and means for movably mounting the wiper to the wiper support for said movement in a shank wiping stroke.

153. The apparatus as defined in claim 152 wherein said spring means comprises: a pair of springs interposed between the mount and the wiper support on each side of said axis.

154. The apparatus as defined in claim 151 further comprising: a bracket; and means mounting the mount to the bracket for yieldable upward movement to a predetermined position, whereby the shank wiper is urged to a level that is above the bottom of the shank portion of the insole and moves downwardly when forced against said portion of the upper during the shank wiping stroke to stretch said portion of the upper downwardly of the last prior to wiping it against said portion of the insole.

155. The apparatus as defined in claim 154 wherein the mount has an upper flange located above the bracket and a lower flange located below the bracket and the means mounting the mount to the bracket comprises: an upright pin secured to the bracket and extending through the flanges; a stop member secured to the pin above the upper flange; and a spring on the pin below the lower flange and bearing against the lower flange to yieldably urge the mount upwardly until the upper flange bears against the stop member.

156. A lasting apparatus comprising: a support arrangement for supporting bottom-down a shoe assembly that comprises an upper mounted on a last and an insole located on the last bottom with a selected portion of the upper margin extending downwardly of the corresponding portion of the insole; a mount located outwardly of said shoe assembly portions; a wiper mounted to the mount for movement in a wiping stroke between an outer position outward of said shoe assembly portions and an inner position beneath said portion of the insole; means for initially maintaining the wiper in its outer position; a bracket; means mounting the mount to the bracket for yieldable upward movement to a predetermined position, whereby the wiper is urged to a level that is above the bottom of said portion of the insole and moves downwardly when forced against said portion of the upper during the wiping stroke to stretch said portion of the upper downwardly of the last prior to wiping it against said portion of the insole; and means for imparting a wiping stroke to the wiper.

157. The apparatus as defined in claim 156 wherein the mount has an upper flange located above the bracket and a lower flange located below the bracket and the means mounting the mount to the bracket comprises: an upright pin secured to the bracket and extending through the flanges; a stop member secured to the pin above the upper flange; and a spring on the pin below the lower flange and bearing against the lower flange to yieldably urge the mount upwardly until the upper flange bears against the stop member.

References Cited

UNITED STATES PATENTS

| 3,130,429 | 4/1964 | Kamborian | 12—145 |
| 3,157,897 | 11/1964 | Morrill | 12—10.5 |
| 3,222,703 | 12/1965 | Broughton et al. | 12—12 |

PATRICK D. LAWSON, *Primary Examiner.*

U.S. Cl. X.R.

12—12

Disclaimer 3,422,474.—*Jacob S. Kamborian*, Boston, *Allen C. Harriman*, Brockton, *Geoffrey T. Jones*, Walpole, and *Karl F. Vornberger*, Tewksbury, Mass. METHOD AND APPARATUS FOR USE IN LASTING SHOES. Patent dated Jan. 21, 1969. Disclaimer filed Apr. 17, 1969, by the assignee, *Jacob S. Kamborian*.

Hereby enters this disclaimer to claims 151 through 154 and 156 of said patent.

[*Official Gazette August 12, 1969.*]